(12) United States Patent
Ananian

(10) Patent No.: US 7,013,290 B2
(45) Date of Patent: Mar. 14, 2006

(54) PERSONALIZED INTERACTIVE DIGITAL CATALOG PROFILING

(76) Inventor: John Allen Ananian, 300-50 Kamiyamae, Aza, Oya, Ogawara-machi, Shibata-gun, Miyagi (JP) 989-1201

( * ) Notice: Subject to any disclaimer, the term of this patent is extended or adjusted under 35 U.S.C. 154(b) by 0 days.

(21) Appl. No.: 10/205,813

(22) Filed: Jul. 26, 2002

(65) Prior Publication Data

US 2003/0028451 A1 Feb. 6, 2003

Related U.S. Application Data

(60) Provisional application No. 60/309,932, filed on Aug. 3, 2001.

(51) Int. Cl.
G06F 17/60 (2006.01)
G06F 7/00 (2006.01)
(52) U.S. Cl. ............................ 705/27; 705/26; 707/102
(58) Field of Classification Search ............ 705/26–27; 707/102
See application file for complete search history.

(56) References Cited

U.S. PATENT DOCUMENTS

| | | | |
|---|---|---|---|
| 5,933,829 | A | 8/1999 | Durst et al. |
| 5,950,173 | A | 9/1999 | Perkowski |
| 5,974,396 | A | 10/1999 | Anderson et al. |
| 5,978,773 | A | 11/1999 | Hudetz et al. |
| 6,055,513 | A | 4/2000 | Katz et al. |
| 6,076,078 | A * | 6/2000 | Camp et al. ................. 705/65 |
| 6,119,048 | A | 9/2000 | Kondo et al. |
| 6,119,101 | A * | 9/2000 | Peckover .................... 705/26 |
| 6,129,274 | A | 10/2000 | Suzuki |
| 6,134,548 | A * | 10/2000 | Gottsman et al. ............ 707/5 |
| 6,253,193 | B1 * | 6/2001 | Ginter et al. ............... 705/57 |
| 6,330,976 | B1 | 12/2001 | Dymetman et al. |
| 6,389,469 | B1 * | 5/2002 | Vekslar et al. .............. 709/226 |
| 6,519,571 | B1 * | 2/2003 | Guheen et al. .............. 705/14 |

OTHER PUBLICATIONS

Business Wire, "NetWaveInc.com Kicks Off QuickBuy Enabling Faster, Easier, Safer E-Business," Oct. 7, 1998, Dialog file 20 #03038927.*
BMS: "Blue Martini Software Announces Version 2.0 of E-Merchandising," Business Wire, Jul. 27, 1999, 4pgs; Proquest #43465862.*
BMS: Internet Archive Wayback Machine; www.archive.org; www.bluemartini.com; Jun. 16, 19-21, 2000; Apr. 8, 2000; Feb. 29, 2000; Mar. 1, 2, 4, 2000; May 10, 11, 2000; 51 total pages.*

(Continued)

Primary Examiner—Robert M. Pond

(57) ABSTRACT

A system and method of interactive cataloging of products and services by end users across multiple sales and marketing channels provide each end user with access to domain-independent catalog data from a plurality of vendor organizations through a catalog server system. Anonymous end user cataloging actions of products and/or services across multiple manufacturing, distribution, and retailing channels create personalized profile instances that are based on stored vendor catalog profile templates in the catalog server system, and stored in the end user's personalized electronic catalog as pre-sale digital receipts. An end user's personalized electronic catalog(s) can be shared with peers using mutual agreement permissions as managed by the catalog server system. Pre-sale digital receipts are used to provide a safe, secure, and convenient method for modifying an end user's actionable cataloged items from a pre-sale status to purchased status when purchased and to provide a traceable audit trail for each cataloged item or purchased item in order to facilitate respective pre-sales channel activities and post-sales channel support and services.

23 Claims, 17 Drawing Sheets

OTHER PUBLICATIONS

PRN: PR Newswire; "IveBeenGood.com Announces Service to Help Web Merchants launch Custom-Branded Online Gift Registry in Hours," Nov. 22, 1999, 3pgs; Proquest #46542208.*

Cohn, Michael, et al.; "Handhelds Get Down to Buinsess," Internet World, Dec. 1, 2000, v6n23p. 56, 11pgs; Proquest #64856493.*

UU: O'Harrow, Jr., Robert; "Private of Not? Behind the Scenes, Web Site Operators are Gathering Information on Their Visiotors, a Practice . . . ," The Washington Post, May 17, 2000, p. G22, 4pgs; Proquest #53844055.*

VV: Woodyard, Chris; "Retailers Invest in Less-Stressful Shopping," USA Today, Nov. 28, 1997, Proquest #23332355.*

WW: Pincince, Thomas; "Extranets: Future Trends and Scenarios," Telecommunications, Jan. 1998, v32n1p. 61, Proquest #25607627.*

Amazon: Paquet, Cheri; "Amazon.com Buys Junglee and PlanetAll," PC World Online, Aug. 5, 1998, Proquest #58947830.*

Amazon: Weil, Nancy; "PlanetAll Keeps Online Masses Organized," PC World Online, Aug. 14, 1998, Proquest #33761930.*

Datachannel: "DataChannel announces DataChannel Server 4.0; DataChannel re-defines Enterprise Information Portals (EIPs0 with Next Generation XML Portal," M2 Presswire, Feb. 9, 2000, 3 pages, Proquest 49332080.*

DataChannel: Coopee, Todd; "Information at Your Fingertips," InfoWorld, Mar. 6, 2000, v22,n10p. 49, 3pgs, Proquest #50834803.*

* cited by examiner

Supply Chain Hierarchy Schematic

IDCP Interactive Television Sample Screen Shots for Web enabled TV

PERSONALIZED INTERACTIVE DIGITAL CATALOG PROFILING

CROSS-REFERENCE TO RELATED APPLICATIONS

This application claims priority under 35 U.S.C. § 119 to U.S. Provisional Application Ser. No. 60/309,932 of John Ananian, entitled "PERSONALIZED INTERACTIVE DIGITAL CATALOG PROFILING," which was filed on Aug. 3, 2001, the entire disclosure of which is hereby incorporated by reference for all purposes.

TECHNICAL SUMMARY

The invention relates to a method of creating an interactive and enhanced digital catalog of products, services, and information that is personalized or personally profiled, to each unique user of the catalog. More specifically, the invention relates to a personally profiled catalog network that intelligently and anonymously captures, stores, manages, and processes self-selected, reusable and "re-distributable" content schemas, for personalization, enhancing, monitoring, tracking, commerce transactions and peer sharing through multiple channels and communication devices, by sophisticated software agents and applications.

BACKGROUND OF THE INVENTION

Introduction

The basic purpose of a catalog is to organize explicit and abstract information, in a standardized format, on a collection of products, services, or information that may be of interest to individuals or groups. Catalogs can be delivered in many forms, such as printed in a paper medium or displayed on a view screen or computer monitor. Catalogs are usually structured lists or itemized displays of titles, course offerings, or articles for exhibition or sale, and often include descriptive information or illustrations relative to the listed items. Catalogs in their more traditional forms include mail order catalogs, retail catalogs, discount catalogs, supplier catalogs, service catalogs, direct mail offerings, bulletins, flyers, posters, etc. Catalogs in their more modern forms are what one would recognize as anything from a single data field of product information up to a several hundred page four color periodical (i.e. a Sears or JC Penney's catalog), or it could be TV or Radio commercial, where the article is presented to the consumer with the relevant key features and buying information, augmented by direct or subliminal lifestyle benefits that could accrue to the buyer.

The advent of the Internet has created new mediums for cataloging digital data, such as Web banners, e-Mail offerings, search engines and directories, e-Brochures, e-Catalogs, and online periodicals. Catalogs can also be thought of as any information service, such as in the media publishing industry, which would include magazines and books whereby a user scans a 'catalog' of headlines in order to locate items of interest. Other examples of catalogs could include entertainment products such as movies, television shows, documentaries, music, radio programs, to name a few. These observations are consistent with the broad purpose of a catalog, which is to organize key data about an aggregation of products, services or information in a structured manner to help facilitate users' commerce transactions or information acquisition needs.

Catalogs

Many people use or review a catalog of some form on a daily basis. The human mind is constantly cataloging, often subliminally. Many make little more than a mental note of items they would like to purchase or recall at a future date. Others keep hand written records, clippings, copies, etc. that often are misplaced or discarded. Long before the Internet, catalogs were the remote-shopping option of choice.

Through the Internet, the catalog has been transformed from a largely printed medium to a digital one, allowing a user to access the cataloged information anytime and from anywhere they may have an Internet connection. The Internet is enabling more efficient product and service cataloging, and personalized commercial transactions by providing a means to orchestrate the interaction between the vendor or provider and the customer; which significantly reduces the time and effort required for making selections and purchases as compared to a conventional retail store environment. This electronic publishing combined with the speed of the Internet has contributed to an acceleration of decision making processes, sometimes placing additional stresses on the industry supply chain as consumer buying dynamics change with more rapidity and unpredictability.

The exponential rise of the Internet has also compounded the problem inherent in any mass media marketing because it has increased the consumers' exposure to unsolicited advertising accordingly. This is an example of how automating a process can rapidly overwhelm an individual's capacity or inclination to absorb the information, which could be a significant contributing factor in the higher consumer resistance evident in the slower-than-predicted adoption of e-Commerce services. Consumer resistance tends to increase as the frequency and amount of unsolicited information is directed towards them; paper junk mail has evolved into electronic junk mail, clogging the e-mail in-boxes of Internet users' globally and raising privacy concerns as email lists are sold to direct marketing agencies and distributed widely to any organization willing to pay for these lists.

What is needed is a restructuring of traditional marketing models that have defined the relationship between the consumer and vendor since the beginnings of modem commerce. This method is static and blind in nature because the interaction between the seller and buyer is based on assumptions derived indirectly from statistical market research, sellers make regarding the desires of the buyer. The relationship is also an adversarial one, whereby marketing companies target and collect information on individuals, and then resell this personal information to any organization willing to pay for it. The buyer is then repeatedly targeted by an array of vendors in an effort to garner their business. With the advent of the Internet, these efforts have reached clandestine proportions, with surveillance 'bug' programs being widely planted on user computers just from visiting Web sites, that report back information on Web activity, file activity, and are even capable of eavesdropping through the microphone or attached video camera. As Internet users become more aware of the extent to which they are losing their fundamental privacy rights, there will be increased litigation and organized public awareness campaigns against vendors that conduct these practices.

There is also no direct connection between the publishing of information, such as on the Web, and a potential customer acquiring a copy of that information. Information is broadcast on e-mail lists, advertising, and direct mail in the assumption that a small percentage of the recipients will be interested enough in the item to respond. An opportunity exists with this invention to transform the current relationships in this regard to a more 'synchronous' one, whereby vendors or advertisers can have more "linkage," on a one-to-one basis, with a group of potential or existing customers.

Presently, digital publishing can be achieved through Web sites and e-mails. E-Commerce, though in its adolescence, is now on the verge of outgrowing catalog sales. Many catalog retailers have experienced remarkable success online—in some cases surpassing the "dot-com pure-plays" and the brick-and-mortar retailers that have since moved to the Internet.

Computer technology has dramatically expanded cataloging. Online catalogs play a vital part in e-Commerce. A significant percentage of retail sales can be attributed to consumer contact through catalogs. However, existing catalog information irrespective of the format, whether printed or digital, is not being exploited or harnessed to its maximum potential. Catalogs represent a large amount of free floating information that, if properly captured and utilized, could be the key to providing smarter and more flexible transactions between vendors and consumers.

The catalog is now employed as a listing of products that can then be purchased on the Internet or by traveling to a nearby retail outlet. After significant lead-time, each printed catalog, typically received by conventional postal mail, quickly outlives its usefulness, and is stacked one on top of the other in a discarded pile. These discarded catalogs, even when recycled, represent a significant waste of production resources and incur ever-growing disposal costs.

The relatively new Web catalog format has begun to address this waste problem, but has created a new one in its place. The vast amount of information available on the Web overloads the consumer with information, reflecting the inherent problem of information broadcasting. There are still several obstacles that prevent the user from effectively and efficiently utilizing the large archive of readily available information on the Web. An effective catalog must be limited to specific and pertinent information about a product or service that fits the profile or interest of the user, then it must be delivered to that specific, targeted consumer. This type of personalized interaction must not only be simple; it must be "meaningful" in the sense that the catalog must be personalized to suit the needs of the user in order to be effective. A critically important issue is not only whether the listed information is in a catalog format, but how it is determined that it should be there and how it is used or not used through a Web service, as denoted with a "preference factor."

Print advertisements are expensive to produce. The retailer or vendor must invest in design, production, publishing and distribution costs to provide the consumer with the delivered information presented through catalogs, brochures, magazines, flyers, billboards, to name a few. All of these costs, including shipping, must be passed on to the consumer. Because of these significant costs, catalogs represent a gamble for manufacturers and distributors—they may or may not recoup the costs through increased sales and profits.

Efficient and effective interaction with catalog content is crucial for all vendors engaged in Internet commerce. Vital product and business information is conventionally represented in the form of a "virtual" catalog, often defined as a simulation, or without physical boundaries and constraints. The virtual catalog plays a vital role in prevailing e-Commerce business models, which include "Web storefronts," with one supplier accessed by many buyers; "e-Procurement," in which one buyer delivers to many suppliers; and "e-Markets," where many buyers interact with many suppliers.

Catalog Management

Despite its mission critical nature, e-Catalog management has been the least emphasized and overlooked area of innovative development with respect to the Internet. There is a need for a universal, global, standardized, interactive cataloging system of providing a customer with personalized product information from any participating Vendor, all in one place, while completely protecting the anonymity of the customer as they utilize this resource. Digital convergence is another factor. The present invention can utilize any device that can interface with the Internet. It is not only applicable for use from a personal computer. Additionally, there is a need for a catalog content management system that effectively places the recipient of the content in the "driver's seat," whereby they choose information at their discretion, rather than be flooded with information against their will. Such a system would enable the vendor to simply make available the data required to "instantly" catalog any product, service or information for selective storage, personalization, enhancement, and peer sharing, while maintaining "on-the-fly" dynamic content management and anonymity.

There are currently three catalog content management approaches: buyer/e-Market managed, supplier managed, and third-party managed. In the early phase of e-Commerce, the "buyer-managed content model" (also called "content aggregation") predominated. This model was characterized by the need to fully or partially replicate product information from multiple suppliers into a single "master" catalog.

"Supplier-managed" content management is a distributed model, relying on a direct connection to catalog content on the suppliers' networks. This model has been supported through Open Buying on the Internet (OBI), an industry standard implementation that enables buyers to remotely access the necessary product, pricing and other information directly from the suppliers' Web storefronts. The advantage of the Supplier-managed model is that it gives suppliers maximum control over data presentation, but it is not flexible enough for customers to allow price or feature comparisons across catalogs. The difficulty of this model is compounded by the fact that in order to be effective, the catalog content must be updateable in "real-time" and transaction-enabled, which is most often not within the scope of suppliers to deliver.

The "third-party managed catalog" content is not yet widely used, but it is expected to steadily grow in acceptance as the Internet diversifies and specializes.

Most vendors underestimate the importance of catalog content and its relationship to timeliness of information. However, "third-party managed catalog content" is becoming the standard by which all e-Commerce initiatives will be measured. E-Commerce initiatives that do not develop strategies to effectively manage and maintain catalog content over time will likely suffer a low level of user acceptance, resulting in lost sales for suppliers, ineffective and costly purchasing decisions for buyers, and reduced traffic for e-Marketplaces. An alternate content management solution is required (a combination of the three catalog models described above is needed, a single/master/global repository, direct multi-vendor control, and anonymously facilitated by a third-party for delivery and management). The dynamic capturing and analysis of transactional information that cannot be processed and transferred instantaneously and simultaneously to every participant in the supply or service chain will significantly and negatively impact enterprise resource planning and day-to-day management.

This trend of third-party content aggregation services for cataloging is being increasing adopted by e-Procurement communities and e-Markets, because the complexities of content-management can be outsourced to technology specialists. The third-party services allow suppliers to publish their catalogs once for multiple distribution scenarios, operating in a similar manner to a "buyer-managed" model with catalogs being developed for specific industry or product segments.

Existing models, however, do not provide the interactive and intelligent filtering of profiles for enhancement and interoperability, as well as, the protection of anonymity that is needed for confident consumer use of the Internet for commercial transactions.

Most catalog descriptions consist of the common attributes of the product, material or service. This is adequate for speed searching, but it far from guarantees a match. Typically, product differentiation is severely limited, therefore the supplier cannot show why its product is the right fit or the best buy. Additionally, catalog data is often homogenized into the database to fit a limited format. A highly dynamic, personalized and user-driven cataloging system is needed that showcases the vendor's products and efficiently highlights features and options in response to the user's profiles and lifestyle activities. This leads to another need, whereby once the catalog is acquired and held by the user, it represents a channel between the user and the vendor, providing the foundations for a new, collaborative relationship that can evolve over time. It also needs to allow for comparison of one vendor's product to that of a competing vendor's product irrespective of the geographic location of the vendor. A system that can enhance and augment cross-vendor catalogs irrespective of existing or pre-defined vendor relationships by way of Web services is also needed.

Information Extraction

Conventional search engines in and of themselves are not powerful nor advanced enough to effectively search out scattered disparate information across a worldwide landscape of Web servers. One technology that is coming of age with respect to online catalog management is information extraction (IE) technology. IE is automating e-Catalog management by aggregating dissimilar information using advanced machine learning and artificial intelligence (AI) techniques. It is a key ingredient and part of any successful e-Catalog management system. Simply put, IE assists by extracting information from documents in heterogeneous formats (PDF files, email messages, Web pages, etc.) and converts it to a single homogeneous form. It accomplishes this by examining the hidden structure of text. There are two predominant approaches, the natural language process (NLP) and the wrapper induction. Both determine relevant content and pull it from documents and text through various linguistic algorithms, and document structures and patterns. IE technology is an important tool for populating databases. Online catalogs or e-Catalogs rely on exploiting customer-centric databases to maintain timely information. More and more Web sites are adopting IE technology to enhance the quality and scope of their search tools. Two search methods that are greatly aided by IE are natural language and parametric. The goal of e-Catalog construction is to provide a unified view of information from multiple data stores dynamically. IE technologies are contributing to this by producing a new class of catalog-management tools that access and aggregate information through intelligent mining, extraction and classification of disparate product information. Highly scalable automated solutions that classify and extract information will substantially assist the building and maintaining of e-Catalog productivity across multiple vendor data stores.

Expert Cataloging

An expert system for searching out data should be seen as the first step toward unlocking and exploring additional information. Personalization, lifestyle enhancement, and mobility are key components that could benefit from an expert catalog profile repository. An Internet-based intelligent cataloging system that can provide such expert assistance in the presentation and use of catalog content to a user would be very desirable. Catalog networking can be facilitated through multiple locations and mediums, such as ITV, Internet, print and brick-and-mortar retail outlets. It would also be desirable to easily and efficiently share selectively-cataloged information with peers (a.k.a. viral marketing), resulting in a higher "saturation" rate than conventional e-mail and other Internet enabled technologies.

However, an integrated, Internet-based application that provides anonymous personalized cataloging in real-time is not currently available. First, the vendor or supplier must rely on intrusive and often inaccurate user tracking methods to obtain information on individual user activities and preferences, ranging from Web site session monitoring and vendor forecasting to bias marketing surveys and focus groups. And, the vendor (i.e. retailer, distributor or manufacturer, etc.) must expend inordinate amounts of time and money performing market research and statistical sampling, which is known to be inaccurate. Secondly, the threat to the privacy of individuals on the Internet is a legitimate one, especially with the ever-increasing competition for the attention and patronage of the Internet consumer. This invasion of privacy has been widely documented by industry experts, stating that it is a substantial threat to the future growth of e-Commerce. Vendors of consumer goods believe they must know and maintain personally identifiable demographic data specific to each of their consumers, who may be accessing their site so that they can customize their site to the needs of that individual. Most commercial transactions also require specific and personal information to fulfill the consumer's request, raising the need for greater consumer control over the use and dissemination of their personal information.

Information Publishing

The Internet has revolutionized the publishing world by allowing consumers to access newspapers, magazines, and television through their home PC. Although paper-based publications and broadcast media are still prevalent, increasingly the consumer is adopting the online model for accessing these channels. Delivering information via the Internet represents a significant leap in efficiency over more conventional distribution methods.

However, online information is not consistently or effectively packaged, resulting in an almost infinite array of information formats and taxonomies. What is needed is a consistent, convenient method for users to find and acquire the information they want, when, how and where they want it.

Database Management Systems and Data Mining

Many static database management systems (DBMS) are being used by manufacturers, retailers and service providers to identify potential purchasers of their products and or services. A key DBMS feature is its ability to manage these relationships. These same DBMS services use traditional sources to obtain prospective client information (including name, address, age, employment, income levels, home ownership, gender and race). Then a market research survey is performed to focus on learning what those prospective consumers might buy; this data is then forwarded to the appropriate vendors who subscribe to the DBMS information systems.

Traditionally, even with the use of the sciences of statistical analysis and psychographics, supported by the collected demographics, and refined by geographical/regional influences, have a built-in margin of error of 3% to 7% either side of the focus question. The reason for this margin of error is due to the unpredictability of what the consumer will actually do when making a purchasing decision.

List management, list brokerages, and special interest marketing services are choice locations for marketers interested in a specific interest group. These presently static databases are typically updated on a regular basis, such as monthly or bimonthly. They are assembled through a variety of means, and organized for statistical presentation of households or individuals as polled in relation to magazines, reader services, and sweeps information, for example. These statistics are primarily used for circulation, enhanced list rental, database mining and advertiser programs. They are often referenced against InfoBase™. Acxiom Corp. (www.axicom.com) is an international provider of comprehensive information management solutions using customer, consumer and business data. InfoBase is believed to offer the most accurate and comprehensive consumer, business and contact data available. It obtains its data from lists composed of change of address, U.S. Census, driver's license, and credit application stats. CircBase™ is a publishing cooperative database comprised many publications sharing their subscription purchase data. Under this model, no one can be aware of which publication the data is associated with, only that the requesters are magazine readers. All of these organizations rely on historical demographical information; and, latent, or post-transaction consumer data.

There are a number of problems plaguing market research systems and services. Estimating the ROI for these types of businesses can be very challenging and an approximate at best. There is no real-time relationship with the consumer/end-user. Privacy issues are neither fully enforceable nor controllable under current database architectures. The data is often not trustworthy; it must be tested routinely for duplicate records and inaccuracies. Latency is another problem that compounds the current models; the transactional information is almost always untimely, since it is provided days, weeks or even months after the consumer's activities were completed. A method of delivering highly accurate pre-transaction intentions as well as real-time transaction analytics through a user-driven utility is needed.

A radical departure from the current model is needed. The ideal system would no longer require the cumbersome task of managing names, addresses, and personal contact information. This would greatly reduce duplicate data issues, unsolicited direct mailings, and flagrant privacy breaches. Today, customer information is driving product and marketing decisions in unprecedented ways. The vendor can no longer assume to know what their consumers want. The consumer must be asked, without violating their privacy.

Network Environments

A key to this new model is the increasing use of "secured" networks. A secure network is a private network that employs standard Internet protocols and the public telecommunication system to securely share part of a business's information or operations with suppliers, vendors, partners, customers, or other select businesses. A secured network (Extranet) may be viewed as part of a company's Intranet, or internal network that is extended to users outside the company over the public Internet. It has also been described as a "state of mind," in which the Internet is perceived as a way to do business simultaneously with other companies (B2B) as well as creating the medium to sell products to consumers.

A secure network can facilitate privacy for all participants. Currently, these types of networks rely upon firewall server management, security transport protocols, the issuance and use of digital certificates/IDs or similar means of user authentication, encryption of messages, and the use of virtual private network (VPN) technology to securely connect participants through the public Internet. A secured network is needed that intrinsically provides a protected and controllable environment for Users and Vendors, while accelerating business transactions, minimizing the possibility of fraudulent activities and business abuses; and, most significantly, keeping users' identities anonymous.

Web Services

"Web services" are interoperable Web-based software services that can be subscribed to by Users, either on a payment or free-use basis. The interoperability aspect means that, at the direction of a User, one Web service can access another Web service. A Web service may combine several applications or architectures that a user needs, from any platform. For the consumer or end-user, the entire set of services will appear as a single, integrated service.

Currently employed protocols to which Web Services are especially suited include UDDI (Universal Description, Discovery, and Integration), XML (Extensible Markup Language), SOAP (Simple Object Access Protocol), and WSDL (Web services description language). An important benefit of these standards is that client applications based on one vendor's software will be able to communicate with Web services even if they are based on differing software from another vendor. More recently, application service providers (ASP), organizations that host software applications on its own servers within its own facilities, are expanding their services to non-commercial users with browser-based PCs across the Internet. Customers rent the use of the application and access it over the Internet or via a private line connection. Although hosted applications are basically a parallel strategy to Web services, the mere hosting of an application does not encompass the potential for Web services. It is predicted that Web services will eventually become seamlessly interoperable with one another, and soon all leading e-Business platforms will support at least the basic Web services infrastructure.

A leading example of a Web-based development platform is .Net™ from Microsoft®. This technology includes tools to develop and deploy Web-based applications that can be accessed from anywhere, including browsers, handheld devices and smart phones. .NET provides a complete development infrastructure that enables programming languages to be compiled into a Common Intermediate Language (CIL) that is executed on-the-fly, or compiled into machine language by the Common Language Runtime (CLR) software in the target computer. This is similar to Java's intermediate "bytecode," except that Java is one programming language, whereas Microsoft is allowing all programming languages to be compiled into the intermediate code. .NET applications can run on Intranets as well as public Web sites, thus .NET is an all-inclusive software platform for both internal and external use. Microsoft browsers and upcoming versions of Windows are expected to include .NET code, which will take greater advantage of .NET-based applications. Microsoft has enhanced its programming languages to support the .NET platform, in such products as Visual Studio.NET. It has also introduced the .NET-enabled C Sharp (C#) programming language. .NET also supports existing Windows components, such as .DLLs and .COM objects.

Fortunately, a number of technology initiatives are under way to create an infrastructure for linking Web services. At the forefront of this effort are technologies such as XML, UDDI, and SOAP. These still-emerging technologies and standards are being packaged into competing suites of services and tools from Microsoft® on the one hand, and from companies such as Sun® Microsystems, IBM®, BEA®, Oracle®, and Hewlett-Packard® that support Java™ on the other.

Intelligent Agents

Users want personalized interactivity, not just mass-market e-Commerce. Users also want to interact with data more intelligently as it relates to their specific needs. Personalized data is information that is specifically tailored for the User such as their attribute and lifestyle preferences, which can be represented in a "profile."

To further aid the personalization of online data, expert assistants or "intelligent agents" can be employed. "Intelligent Agent" (IA) is a term applied to a general category of software entities that act on behalf of a user or another program to achieve preset objectives. The entity must have a certain degree of autonomy in order to be classified as an IA. Further, the IA must have the ability to perform tasks without the need for constant human instruction or interaction.

As new technology just coming of age, IAs may offer hope for the fulfillment of many wishes. For instance, those who utilize personal assistants or secretaries often seek an individual who understands their needs and preferences, and can be conditioned to think the way they do. Just as with a human friend or associate, over time the IA assistant would gradually acquire the patterns and practices of the individual served. Once taught, it could function on its own with an occasional "check-in" with the trainer or owner of the IA for unclear or new situations.

From the idea that patterns of behavior can be identified and described, it follows that if these patterns can be described, they can be learned. If one can describe how to recognize a certain kind of pattern, then a goal of an IA program is to recognize the pattern after a few occurrences, hopefully with the aid of users to help automate the patterns. The IA is therefore potentially a tool for analyzing systems and data stores. Essentially, an IA is a system situated within an environment that senses its own activities and acts upon them, in pursuit of its own pre-set yet potentially evolving agenda.

All existing software IAs are programs, but not all programs are IAs. On the Internet, an IA is typically a program that regularly gathers information or performs some other service without a user's immediate presence. Conventionally, an IA program uses parameters provided by the user in a search of all or some part of the Internet, gathers information of interest to the user, and presents it to the user on a regular basis. Other IAs have been developed that personalize information on a Web site based on registration information and usage analysis.

Any IA program must have a degree of autonomy in order to be classified as an Intelligent Agent. This enables the program to act without constant human intervention. This means the IA has control over its own actions and internal state, enabling itself to perform tasks without the need for constant instruction, which is typically given by a user. IAs must act in such a way to achieve their goals through communicating with other agents, systems or people, and automatically applying specialized logic to situations encountered.

IAs are already being integrated into many typical computer programming applications. There is a large market for such agents, especially when looking toward the future, because people are always seeking more ways to work more efficiently. As these types of IA software entities are further embedded into fundamental applications, marketers and certain types of businesses must consider IA alternatives to improve their business practices in order to succeed and survive in the increasingly competitive Information Age business landscape.

Several technologies can be used in the design of IAs. These technologies include statistical operations, artificial intelligence, machine learning, inference, neural networks, and information technologies. IAs can learn over time, and rapidly improve in their performance as they adapt to the user's needs. Although some expert agents are currently available, they are too simplistic, unrealistic, misapplied, ineffective without excessive user oversight and monitoring and unprotected from threats to privacy.

IAs are now common elements of many new software tools that are a blend of existing technologies, essentially converging on a more unified or common operational framework. However, the term "convergence" involves more than just grouping multiple technologies together. True convergence is achieved when multiple technologies are blended into a single new product with forethought on how the technologies interact. Converged technology must showcase a new and improved package that is more efficient, streamlined, powerful and easier to use; essentially, "greater than" the sum of its component parts. Most importantly, users must actually have a need for the product or service that the converged technology provides.

Supply Chain Relationships

The supply chain is every sequential step or process that brings the product or service from its most basic form, or most raw material, to finished or consumer packaged goods (CPG) ready for market. According to the Ernst & Young, the basic Supply Chain Process consists of five functions; plan, buy, make, move, and sell, with suppliers at one end, and customers at the other. The participants in the supply chain typically include the raw material extractor or producer, the material transporter, the manufacturer, marketers, distributors, retailers, advertisers, transporters, financiers or bankers, the government and the consumer. A current trend for e-Commerce is to reduce overhead by minimizing contact with the "middleman" such as the retailer, wholesaler or marketer, striving to make this contact instantaneously and simultaneously. E-Commerce is facilitating this new business model that more efficiently bridges, or shortens, the inherent distance between the consumer, and the seller, who may be a manufacturer or producer. The reason it has not been very well received in both the business and consumer sectors is that it still performs sequentially.

In addition to the chained relationship arrangement, retailers, manufacturers, and their supply chain members need access to transactional information as rapidly as possible to utilize their limited resources to the most efficient levels. Every product or service can be broken down to its most basic structure or component attributes, and information related to fulfilling any of those parts can be made available to any supply chain participant, instantly once the need is known.

Even with the Web's technology, and its ability to network information, it does not solve "real-time" information flow dilemmas. Currently, the process of production requires that information flow up and down the supply chain in sequential steps. The terms "just-in-time" and "real-time" presently imply that every affected part of the supply chain knows simultaneously what is happening above and below them. This is simply not true. Information conventionally flows in a sequential stream and only when the information providers decide to forward it, or are requested to do so. "Latency of information flows" are delays that are increased or decreased by the speed of which sequential decisions and or requests are made. This time and process delay affects production, inventory, and financial decisions of the supply chain participants; and wastes significant amounts of resources, unnecessarily.

An intelligent supply chain model presumes all participants involved in the process are both customers and suppliers. The intelligent model relies on shared knowledge and it applies quality initiatives and technology to the supply chain process. Dynamic data exchanges of product attributes, prices, and availability must become instantaneous. For real-time supply chain status processing, proactive information systems must be integrated across the supply chain—including the end customer for whom it ultimately serves.

Trade Shows, Exhibitions and Expos

Industry leaders in the publishing field are using the Internet combined with venues like tradeshows to accurately move information simultaneously to interested parties while lowering their advertising costs. The anonymous nature of the data transfer benefits the vendor for tracking trends, consumer desires, etc. The permission-based information collected via this method is used to connect the vendor or publisher to individual consumers as a target audience. Nevertheless, everyone else in the supply chain is ignored; or may receive their information in some sequential interval of time.

Trade show and exposition organizers are increasingly challenged to justify to exhibitors their "return on investment" (ROI). Across nearly every industry, exhibitors are buying more space and show organizers are bringing in more revenue, while net paid square feet and total gross revenue continues to climb at double-digit rates. However, there are signs the expo industry may be slowing with respect to attendees. One possible reason for the decreasing number of attendees could be attributed to an overall dissatisfaction of the process, as it currently exists. Breakthroughs in technology, including computer registration, smart cards, magnetic stripe badges, Softstripe badges, and Web-based lead generation applications, have drastically changed the way tradeshow organizers manage events. New advancements such as these have made it possible for organizers to address the needs of both exhibitors and attendees more efficiently. Despite all of these improvements, a more efficient and effective way to acquire, store, exchange product interests and catalog exhibitor information is still needed.

Enhanced TV and Set-Top Devices

Enhanced TV is a technology that allows a consumer to receive both television broadcasts and Internet access across the same screen at once. It was originally introduced by NCI (now called Liberate Technologies) in 1997. Consumers need a more personal and convenient system for interacting with television content. To meet this need, an intelligent television response system is required that somehow tracks and facilitates consumers' interests, without revealing the viewer's identity or privacy. Consumer advocacy groups are warning that TV viewers will soon be subject to the same threats that are being faced by Internet users with respect to their privacy. The ITV industry is creating a new TV infrastructure designed to capture tremendous amounts of personal information about ITV subscribers that will be used for variety of marketing purposes. The current methods for filtering and tracking consumer interaction are not sufficient to address the growing demands of personalization and privacy safeguards. Set-top manufacturers are also being asked to address these concerns by integrating privacy technology into their products. The consumer's demands will need to be addressed in a way that gives the personalized convenience they need, while providing network operators, broadcasters, and sponsors with the required tracking of information in "real-time," while yet maintaining the privacy, anonymity and security of the viewer/subscriber.

TV Advertising and Technology

With the advent of personal video recorders (PVR), the advertising industry and all those who generate revenue through selling TV advertising slots have seriously begun reassessing better ways to reach their targeted audiences and protect their interests. PVR technology allows viewers to zap commercials, making TV content free, for all intents and purposes. With revenue streams being undercut and advertising rates going down, an alternative method of advertising through TV is required. Networks believe the PVR model will assist their efforts because the ads they do sell can be better targeted. The notion is that viewers will be less inclined to avoid commercials if they feature products that interest them. There are several new technologies arising that propose to build and capture individual viewer profiles for just this purpose. It is going to be a legal as well as a technical challenge for content providers to avoid the looming privacy issues that relate to the processing and storing of personally identifiable information of millions of viewers. Just as with Web advertising, TV advertisers may find themselves paying for "eyeballs." A more convenient and cost effect system of targeting individuals through ITV is needed. More particularly, it must avoid privacy pitfalls and efficiency restraints while serving all participants equitably. It must also introduce a new format and platform for advertisers.

Marketing

Manufacturers and service providers attempt to analyze consumers' needs, wants, desires, and trends through an expensive process called statistical "market research." This research includes statistical sampling and trends analysis in various regions of the national and international marketplaces. Also, manufacturers and producers are required to develop multiple styles, types and variations of a single product to ensure they reach the broadest number of consumers. This means that there are numerous product variations manufactured on either side of the bell curve, which are not consumed or bought. This wastes inordinate amounts of scarce raw materials, energy sources, labor efforts, and financial capacities for the manufacturer and its "supply chain." Accurate data that could be provided in a "real-time" and "synchronous" environment would narrow the bell curve base. Furthermore, the information relating to the production process does not allow for information to be instantly and simultaneously exchanged between the user, the manufacturer, and the other members of the supply chain.

Database marketing in the publishing field is still in its infancy. Editorial and advertising departments lack the understanding and skill set to properly explore the value of digital marketing data (not convenient). Many smaller companies must partner with a particular advertiser on a cooperative database. Designing and running a marketing database is a significant task, and most internal systems are not built to handle complex marketing analysis. Therefore, a company needs to enlist a dedicated database-marketing vendor and make it a partner in the process. Currently, a typical corporation uses dozens of databases to drive customer and vendor information. The next step is to centralize the process into a primary corporate marketing database, which isn't easy with existing systems. For example, a fulfillment database is primarily used to capture subscriber information, which then drives the delivery of an issue or drives the process of billing and then renewing that subscribing customer. There are elements in that process that do not easily incorporate into the current marketing database environment. A name is in play in so many places in the list market, and names are duplicated in many lists. The more places the name is found, the less likely it is to get valuable marketing information back about how the name was used.

Market Examples

In the present "Digital Age," turning business data into useful asset is a critical component for any organization to be successful. Several technologies and services are presently available to help the consumer capture and manage data for commercial purposes. The following technologies exemplify market examples that provide traditional client/server networking models to automate and enhance consumer services: Barpoint.com provides information gathering and e-Commerce through barcode identification. Quecat.com also provides information gathering and e-Commerce through a proprietary code scanning technology. Qode.com is a UPC indexed product database available to the general public where users can opt to remain anonymous if they so choose. Highpoint.com provides "in-store" e-Commerce technology via a personal digital assistant (PDA) or a consumer, hand held scanner. Edgegain.com provides comparison-shopping via the user's Web-browser based toolbar. ClickTheButton.com includes comparison-shopping on a client-side application running with the user's Web-browser. At GizmozNetworks.com, a rich, media merchant messaging system is provided that operates through e-mail and client-side programming. SOSMarketPlace.com provides selection management of products through personal accounts. OTSNet.com is a virtual tradeshow portal of sorts, complete with vendor booths e-Commerce services. Magaseek.com features a wireless application-based store locator and e-Commerce service that operates by a user's entry of the volume/issue, page number(s), and price range, as found within periodicals. StreetBeam.com provides an interactive advertising medium for retrieving and saving valuable information. WideRay.com and adAlive.com like BeamStreet.com offer methods that address contextual marketing through a variety of consumer devices.

Some of these examples simply are a repackaging of old concepts that do little more than offer a new mode of transmission. However, none of these services actually address the life cycle management of information from a consumer-centric perspective adequately. They lack the internal architecture required to assimilate new methodologies affecting the ever-changing landscape of market research, statistical analysis, and commerce both online and offline across multiple channels and devices. They have not factored the importance of allowing the consumer to create personalized catalog profiles over an e-Catalog network. They also do not properly address the information life cycle associated with products and services. The present invention directly sources and links the packaged information to its respective owner or vendor for dynamic updates, targeted promotions, custom services, and facilitation of supportive applications designed to take full advantage of the cataloged content.

The BuyLink.com marketplace is a catalog distribution network that creates connections between retailers and specialty item vendors. The core technology offers a centralized meeting place for retailers, reps, and vendors by way of a "Desktop Catalog" software application for communicating Live Market Data®. Desktop Catalog® software, installed on BuyLink™ retailers' computer desktops, allows them to browse catalogs, order, and communicate without the need to visit any web site. Desktop Catalogs are remotely updated. They are distributed over a P2P network and e-mail. They do not facilitate anonymous cross-profiling of customer-centric catalogs for contextual applications.

MindArrow.com is another example of a current service that does not provide the user with the needed personalization and the efficiency of dynamic catalog management. However it does provide personalized e-brochures (via e-mail) using HTML, video, audio, animation and graphics. A user's response to the e-brochure is then tracked, whether the user "clicks through," or makes a purchase, or forwards the information on to another user. However, this too falls short of providing users with the needed personalization and privacy as discussed above.

U.S. Pat. No. 6,216,129, as implemented by Expanse™ Networks, Inc., covers a privacy-protected method and software for targeting advertisements to consumers based on their purchase habits. The technology described in the patent suggests that companies could target broadcast advertisements to introduce new products to brand-loyal customers, or even target their competitors' customers to raise market share. Jovio.com is yet another example of viewer profiling, ad ordering and ad insertion engines, which captures and creates detailed viewer profiles, and then delivers targeted TV commercials. Jovio Inc. makes software that enables any cable or satellite television operator to profile its viewers and deliver highly targeted commercial advertisements to them. However, these technologies simply offer targeted television advertising. A direct method that is intrinsically anonymous is needed for interrelating with the TV viewer/subscriber, while exclusively maintaining the viewers' control to acquire data on products, information and services instantly at their discretion across multiple mediums. At the same time this transactional information is produced, it must be instantly related to the affected participants of the supply chain.

Eye2Buy™ Technology Co. offers a tracking mechanism, to complement the strategy of product placements in movies and television programs, whereby the decision, selection and purchase actions of a viewer from initial interest through to a purchase can be captured. The technology requires special digital encoding applied during the entertainment product's post-production phase. This would allow the viewer to open an overlay window that lists products that are associated with the broadcast or release. The viewer could then explore a link that holds a complete catalog of the item or product line. Then, if desired, a purchase may be made. There is also the ability to tie in additional links such as production-related information, interactivity with fan clubs or official show Web sites. Although this approach offers convenience and flexibility, it does not provide anonymity through a catalog server system nor does it facilitate the delivery of e-Catalog profiles for further enhancement by Web service applications.

Multi-channel marketing, profile analytics, decision support, e-Customer intelligence are just some of the phrases being used to describe a new era in marketing and sales. Such companies as Personify®, Engage®, Coremetric®, and NetGenesis® too name a few are focused on creating solutions that help businesses leverage their customer information assets through a variety of personalized Internet technologies. The present invention solves unaddressed issues of control on the part of the User by providing a co-managed e-Catalog network.

SUMMARY OF INVENTION

Introduction

The present invention provides a universal interactive and enhanced digital catalog server system for products, services and information. The present invention allows any User of the system to anonymously and instantly catalog any item they view in a store or trade show, off a Web site or television program, or from a periodical or brochure to name a few, meaning they can personally acquire and manage relevant catalog information for later use and sharing. The present invention enables the User/Consumer to instantly catalog information, as a transaction request, from these mediums and venues with a range of devices including Smart (cellular) phones, portable PCs, personal digital assistants (PDA), Internet-enabled set-top devices (ITV), card readers and scanners, standard landline telephones, portable scanners, and Internet-enabled game consoles, to name a few. These transaction requests are processed through a catalog server system by creating a User requested catalog entry to the respective User account.

The User then accesses these catalogs through a Web-based interface for managing, profiling, sharing with peers, or for use in a Web service. At any time the User can delete the catalog(s) items, and at no time while the User is in the system is the User's personal identity stored or revealed anywhere or to anyone. The anonymity of the User is an important feature of the system of the present invention.

The present invention broadly defines the User as "any recipient or consumer of the transactional information created by the cataloging, profiling, enhancement or buying actions, whether a single individual or a group." The present invention provides a novel and unique form of interactive digital marketing and sales.

For the present invention, the Vendor is broadly defined as someone in the supply chain, such as a retailer, distributor, manufacturer, reseller or anyone who can populate a catalog profile template (CPT). The Vendor can easily use (for use with the present invention) an existing product or inventory code system such as a UPC, ISBN, ISSN, SKU or any other tracking or search code, which may be standards-based or proprietary to function as Identifier IDs that directly or indirectly reference a CPT through a unique Catalog ID (C-ID).

The present invention is configured to provide pre- and post-purchase, transaction-based catalog information instantly and simultaneously, to any other member of the supply chain or channel. The present invention uniquely combines this real-time information with a novel method and approach of interactively and intelligently profiling of products, services and information groupings from a networked data store, referred to hereafter as a Catalog Sever System (CSS), also referred to in this patent in its broader context as the "Interactive Digital Catalog Profiling" (IDCP) Network. This method enables the creation of an entirely new composite profile of each User, whose personal identity is not known or stored within the CSS. The system also allows the User to store multiple profiles of instantly cataloged information for themselves or others, such as those people on a User's Christmas gift list.

The present invention provides the User with the ability to create and securely explore a catalog network of products, services, and information contextually tailored to their own unique environment. Web services operating internally (in the system) and externally (third-party) can be permitted to access individual catalog accounts to anonymously assist and facilitate a context-specific task or service intuitively and spontaneously. Through the selective cataloging of multi-vendor products, services, and information captured from ITV, print, the World Wide Web, and other IDCP User accounts (businesses, colleagues, friends, and family), an IDCP User is able to fully control, personalize, and share, any catalog item. The User is not exploring the Internet (a.k.a. "surfing the net"); rather, the User anonymously creates their very own controllable experience through a personalized Catalog Server System.

A key distinction between the present invention and the public Internet is the concept of a secured, protected ("buffered") environment, whereby Users employ an "assistant" program so that the User can interact anonymously with Vendor catalog information, which is also in the buffered environment. This is like having a greater extranet populated with smaller extranets that protect and give individual User's control of their catalog selections. They remain anonymous to the Vendors when operating under the anonymity guidelines of the Catalog Server System (CSS). The CSS ensures a buffered environment, which is operated on a secured basis. The Catalog Server System therefore provides a protected area for Users (consumers) to interact with Vendors in a secure, anonymous manner, without fear of surveillance or invasion by malevolent virus programs. Another aspect of this "buffered relationship" is the dynamic communication (Vendor Channel), which can be maintained between the Vendor and the User/consumer, allowing a continual stream of information such as updated pricing, availability, and special offers to flow discreetly for as long as the User retains the catalog item(s). One of the fundamental differences between current user profiling services and the present invention is that the IDCP Vendor Channel never remains idle or static, but rather is continually mapping or auto-profiling the active interests of the User. Most multi-channel marketing and profiling services only work when the customer visits and directly interfaces with a Web site or a Web application service. The Catalog Server System is a 24/7 dynamic model that never ceases processing catalog transactions for the User. Even when Users are not directly cataloging items through the variety of available venues' mediums, and peer sharing (a.k.a. viral marketing), and task oriented autonomous agents may initiated catalog transactions without the conventional boundaries such as, time zones, geography, politics, economics, and cultural factors due in part to the buffered environment.

The Vendor also is able to view cataloging activity in the aggregate, meaning that any individual cataloging action would not be traceable by individual account to any single User, but the activity as a whole can be reported on. This is not a statistical sampling, but rather a true representation of each User by way of highly defined aggregate views (or catalog profiles). These aggregate views facilitate the anonymous communication and exchange between Vendors and Users also referred to as the Vendor Channel.

The implications of IDCP are far reaching in both scope and depth because it redefines the manner in which Vendors of products, services, and information interact with Consumers of those goods and services. Instead of the current 'adversarial' model where every consumer is tracked, identified, surveyed, and profiled, and then inundated with direct marketing information in all forms, the IDCP Network creates a new environment with the ability to create a cooperative, mutually beneficial exchange of information between Vendors and Consumers to support and enhance e-Catalog marketing, distribution and e-Commerce.

The system of the present invention permits a balance of the control of information acquisition between the User and the Vendors while protecting the rights of the consumer's anonymity, and the rights of the Vendor to obtain and control critical marketing data in an efficient and timely manner. The IDCP system allows for a reduction in industry's reliance on mass mailings by creating a balanced medium whereby Vendors can publish catalogs profiles of any type, consumers can acquire this information anonymously, and aggregate market buying intentions can be monitored without revealing any personally identifiable information. Most importantly, this IDCP environment can become the precursor to commerce transactions because it can support the buyer's research and decision-making process, in a completely anonymous way, right through to the execution of the transaction. In addition, any cataloging activity is readily available to all participants in the supply chain, instantly and simultaneously. This allows, for the first time, the ability to bring the Customer into the supply chain as a proactive participant, and it provides a window into the mind of the Consumer before a purchase is made, while viewing them as a completely anonymous influence. When the User is ready to make a purchase, the IDCP Network provides a direct link to the Vendor to execute the transaction.

The Catalog Server System (CSS) also can serve as an ongoing repository of asset information after the purchase is made. When a User catalogs an item, its status is maintained as "pre-purchase." At the discretion of the User, the Vendor can authorize/validate the purchase status at the point-of-sale (pre-sale vs. purchased) of a CPT digital receipt (issued by the CSS as a pre-sale digital receipt resulting from a cataloging action). The item is simultaneously cataloged and validated through one process. IDCP generates, communicates and archives digital receipt requests for validating warranty support, returns, store credit (via coupons/vouchers), and promotions to name a few post-purchase activities/ services. The purchase status, item, quantity, logistics and demographics are the only information revealed to the Vendor when querying User profiles aggregately. Vendors are required to maintain a record of the Digital Receipt ID to facilitate post-purchase customer services. User's who make payment in cash are not required to disclose personally identifiable information. Vendors will obtain no additional advantage through the IDCP Network if they choose to capture personally identifiable information at the point-of-sale. Users can view and manage their digital receipt assets from within the ICA "Account" view.

The IDCP Network is also an ideal environment to store post-transactional information, such as digital receipts and digital rights management. In fact, Users will have the option at the point-of-sale to catalog the item, so it can be referenced for asset management (hard goods), re-order management (perishable goods), receive targeted promotions, personalize product profiles, and monitor purchasing habits/patterns. The IDCP Network can be configured with a Digital Receipt operational data store for filing and processing digital receipts anonymously.

EXAMPLES

Media Providers

Media providers may use Web services in conjunction with the IDCP Network to create new revenue models. IDCP interactive scripting enables Vendors to create promotions that would link selective catalogs or marketing campaigns to media programs, publications and broadcasts. This would allow at least a two-tier revenue model. The media provider could include the Vendor's catalog in a particular broadcast, and the Vendor could analyze any sales activity derived from catalogs acquired during the event. This could evolve into a scenario whereby broadcast commercials would no longer be needed. Catalogs can be associated to more than one media program at a time. Users/Customers can browse the Sponsor/Vendor list as shown in FIG. 7 at D, to acquire and filter catalog selections from any of the participating Vendors. This is of tremendous value to Vendors, because they can then identify and track the effectiveness of their advertising expenditures accurately and in "real-time." It also facilitates a direct channel whereby they can maintain communication long after the marketing campaign has finished.

Marketing

The present invention redefines the traditional relationship between Buyer and Seller. Buyers are no longer tracked, categorized, and sold to direct marketers in this marketing model. The concept of re-engineering how Buyers and Sellers relate to each other is not a trivial one, since it will require retraining the marketing industry and "undoing" technology apparatuses that are made to target and track individual persons. It is believed that by restructuring the nature of this relationship with IDCP technology, a wide range of benefits can be garnered by both parties that is impossible in the current state of affairs.

IDCP allows the interconnectivity of related, unsolicited, information to be profiled and enhanced at the discretion of the User. The IDCP environment introduces a completely new approach to marketing management. The planning, execution and tracking of marketing campaigns can be re-engineered to take advantage of the IDCP architecture. The planning phase can include analysis of anonymously collected data on buying or cataloging habits from a current or historical perspective, surveying of User preferences across target audiences in any mix of geographic areas. Instead of relying on historical data analysis to project possible future buying behavior, marketing management can view the effect of campaigns, product releases, promotional events, and advertising by monitoring IDCP Network activity.

IDCP technology also supports the notion of 'synchronous' marketing communications. Even though Users are completely anonymous to the Vendor in IDCP, their aggregate activity can be monitored in real-time, providing a "feedback loop" in response to advertising and promotions. Currently, the only feedback available to Vendors is the actual sales transactions arising out of a promotion campaign. The IDCP Network can provide not only feedback on the number and general "geographics" of catalog acquisitions in real-time, but it can also track the 'viral' progression of catalog distribution as people peer-share catalogs with friends, acquaintances, and associates. In fact, entire promotion campaigns can be designed with the 'viral' aspect in mind, reflecting a more close relationship to how news and ideas traditionally progress through human society—via word-of-mouth.

The direct feedback and control of the following measurements and services could include, but are not limited to: Price, frequency, monetary, purchase parameters, viral marketing, interest analysis, trend analysis, spending patterns, budget analysis, on-the-fly promotional controls, brand analysis, product analysis, inventory analysis, infinite up-sell and cross-sell opportunities, subscription analysis, and retention controls.

The IDCP Network provides a type of link between the User storing a cataloged item, and the Vendor (manufacturer, distributor, retailer) of the product that has been cataloged. This gives rise to new ways of handling discontinued products or closeouts, and for minimizing the effect of supply chain bankruptcies at the distributor and/or retail level. For instance, as a product nears the end of its lifecycle and the supply chain is preparing to clear the old inventory out of the fulfillment pipeline to make way for new products, users can be informed via the link that the item they've cataloged is now available at a clearance price, and special purchase procedures can be communicated. In the case of a bankruptcy of a retailer or manufacturer, the accumulated goodwill is not lost due to privacy restrictions placed on the customer data, which prevents the reassignment of that list to other entities without proper consent and disclosure. Because the channel between the IDCP Users and the Vendors is anonymous, the manufacturer can reassign those users to another retailer or manufacturer by simply assigning a new Vendor link. The same could be done if the retailer and/or distributor chooses to replace the manufacturer. All parties benefit from the anonymity.

IDCP allows the interconnectivity of related, unsolicited, information to be profiled and enhanced at the discretion of the User. The IDCP environment introduces a completely new approach to marketing management. The planning, execution and tracking of marketing campaigns can be re-engineered to take advantage of the IDCP architecture. The planning phase can include analysis of anonymously collected data on buying or cataloging habits from a current or historical perspective, surveying of User preferences across target audiences in any mix of geographic areas. Instead of relying on historical data analysis to project possible future buying behavior, marketers can view the effect of campaigns, product releases, promotional events, or advertising by monitoring IDCP Network activity.

IDCP provides the opportunity for direct access to the User, accurate daily, and even minute-by-minute statistical analysis, without expensive "validating" and "preference analysis" through focus groups, and surveys. A dynamically managed Vendor Channel would replace the database list management model, as it is commonly known. Extracting aggregate statistical analysis intelligently and anonymously from a user's ICA will prove to be far more accurate, efficient, and cost effective. The direct feedback and control of the following measurements and services could include, but are not limited to: Price, frequency, monetary, purchase parameters, viral marketing, interest analysis, trend analysis, spending patterns, budget analysis, on-the-fly promotional controls, brand analysis, product analysis, inventory analysis, infinite up-sell and cross-sell opportunities, subscription analysis, and retention controls.

The IDCP Network also extends the value of print, Web and broadcast advertising, because it allows the consumer, with the simple entry of a number, scanning a label or the click of a remote or mouse, the ability to acquire their own personalized copy or instance of the advertising Vendor's catalog that is associated with the ad. Today, once an ad has been broadcast or distributed on paper, if the potential consumer doesn't copy down or remember the information, the value is lost. However, with the convenience and control of the IDCP system, the User can quickly acquire catalog information according to their personalized profile and preferences.

Many market "segments," or categories, such as Web, print and television related Vendors could immediately benefit from the technology inherent in the present invention. Example market categories include home building, remodeling and decorating, twenty-four hour home shopping, infomercials and commercials, apparel and fashion, travel, financial services, entertainment programming, food, "edutainment" and real-estate, to name but a few. Literally any industry, any subject, or any category that offers the potential for Users to aggregate a library of catalog information can be adapted for use with IDCP Network. The User can easily capture information relating to public announcements, talk shows, documentaries, printed media publications and news features, providing the Vendor with a ready forum for their specific products, which may be purely informational in form.

The use of the system of the present invention will create a revolutionary change to the conventional business model by creating an anonymous relationship managed by both parties. The IDCP Network creates a data interchange that ensures the Vendor and User exchange "real-time" data of true value. Due to the anonymous nature of this model, Users are more willing to provide valid information. Through IDCP the cataloged information, when published by the Vendor, is instantly updated, as profiled by the User, to meet their specific needs and desires. This transactional information is available instantaneously and simultaneously to every member of the affected supply chain.

The IDCP method of cataloging information is an active digital interchange of information that can utilize static digital publishing, also known as "network publishing." Digital publishing is characterized by the consumers' accessing Vendor's Web sites directly for catalogs and other information, which in turn may develop into a new buyer-seller relationship.

IDCP and the Privacy Issue

For the present invention, each User has permission-based controls over privacy of what is disclosed. With the anonymous tracking abilities of the present invention, by way of the Vendor Channel, the Vendor can concede the tracking of every individual customer by identity. With the services of the Catalog Server System (CSS), the Vendor can aggregate all aspects of market research and deliver highly customized promotional services, such as rebates, discounts, and coupons, without having to personally identify the User by name, address, or any type of contact information. The IDCP Network solves the problem of delivering personalized Vendor/User interactivity while maintaining total anonymity. The Vendor controls the distribution and content, and the User controls and manages the personalization and usage for each item cataloged. The User stores and manages personalized copies or instances of cataloged products, services, and information with the aid of a user interface referred to in this invention as the Instant Catalog Assistant (ICA). In this sense, the CSS acts as a secure hub that can be accessed both by the User and the Vendor.

Permission controls are multi-layered in that selected information or groups of information can be shared with selected others.

Typically, the tools that conventional Web sites employ to provide online shopping are "shopping carts" and "online order forms." Neither of these conventional methods can offer the option of instantly cataloging a specific item or items, for personalizing, enhancement and networking, as provided by the IDCP Network of the present invention. Most e-Commerce sites allow Users to create personal accounts where selections may be stored, typified by a "wish list," or with a "my folder," or even a "my catalog" as examples. The latter simply being a saved listing of products, which are not characterized as interoperable or dynamically manageable, as demonstrated with the present invention. Most such sites also offer the option to e-mail a selection to a friend. Some sites will even go as far to offer group services for Users of specific categories or classes. These services conventionally require some form of membership. Most conventional e-Commerce sites only offer a "buy" link. These same sites usually do not require membership to "window shop," or browse through the site. However, once the User decides to check out with their purchase, they are required to disclose personal and financial information. This leaves them vulnerable to various e-Commerce tracking systems. Even if the User decides to leave the site without buying anything or applying for a membership, an identifying tag or "cookie" is saved on the User's system to recall their most recent actions. These activity records are typically saved for tracking and personalizing a User's return session to the site. Although cookies offer convenience, increasing numbers of Users are becoming concerned about this method of tracking User's actions and potential misuses of private information (including e-mail) that could result from the tracking of cookies. In addition, savvy users are disabling cookies or using anti-cookie software, which reduces the vendors' intended use of any cookie-based statistics. The current invention avoids the need to rely on "cookies" as utilized by existing e-Commerce sites, and therefore avoids the invasion of privacy issues.

Microsoft has recently implemented a technology standard called Platform for Privacy Preferences (P3P), derived from the W3C standards body, which will be embedded in the next release of Internet Explorer. This is a step towards enabling a user to create a higher level of anonymity and protection than currently exists. The present invention is distinguishable from P3P and significantly improves and furthers the privacy protection for the User.

The CSS tracks aggregated demographic, geographic, psychographics, and behavioral patterns without the need to collect or target personally identifiable information of the individual User. In the present invention, Vendors are not required to collect or process personal information in order to target the desired demographic group or maintain a direct line of communication; Users are completely anonymous. The IDCP User account information, within the User Account Data Store (UAD), is isolated and protected by a unique account number and a changeable PIN. In one embodiment of the invention, the User has the option of removing himself (via an opt-out control) completely from the aggregate reporting facility, thus disabling his participation in any aggregate view. The CSS does not store any personally identifiable information (name, address, or contact information), including e-mail.

The IDCP Network of the present invention restricts the use of cookies. Such cookies are limited to general status or place saving operations. These types of cookies are essentially anonymous in that they do not track a User's browsing activities nor do they save IDCP account PINs.

In one embodiment of the invention, the IDCP Vendor is able to issue promotional services (rebates, discounts, coupons, etc.) At the option of the User, the Vendor can fulfill a request for a digital receipt at the point-of-sale for a product, service, or for an information item cataloged and purchased. The digital receipt is a record of a transaction, without requiring a copy on paper. The IDCP digital receipt, as stored in a digital receipt database, provides a safe, secure, and convenient method for modifying the catalog status from pre-purchased to that of purchased (as shown in FIG. 13, the digital receipt database is the User Catalog Data Store that stores pre-sale digital receipts as a result of cataloging actions). Additionally, the present invention can provide automatic archiving of receipts so an ongoing, traceable audit trail could be maintained for every purchase the consumer makes allowing for later transfer into tax, bookkeeping and other programs that can utilize this type of data. The presence of an archive of receipts could, for example, aid in the resolution of warranty issues, support roll-outs of promotions or coupons for a sales campaign, or it could include the personalized profile and specifications of products for ongoing Customer Relationship Management (CRM) applications. This would complement current efforts by companies such as Compaq to create an extensible point of sale (XPOS) digital receipt system allowing for retailers to speed up in-store lines and transactions by using infrared, Internet, wireless and hand-held devices to reach customers, headquarters, sales partners and suppliers. Digital receipts can be issued to an IDCP member at point-of-sale, stand-alone kiosks, via phone orders, fax orders, and online orders. Vendors are required to have an authentication vehicle, such as a Digital Certificate to verify that the message was indeed fulfilled by the authorized Vendor, a Digital Certificate/ID, issued by a certification authority such as VeriSign, Inc., would be employed in the present invention. Two examples of how Digital Receipts can be verified and fulfilled (pre-sales and point-of-sale) are shown in FIG. 12. The User could swipe their IDCP member card and enter their security PIN at a point-of-sale or a stand-alone kiosk. A unique digital receipt ID (DR-ID) is automatically generated by the User Catalog Manager (UCM) and returned to the Vendor without disclosing the User's account number or PIN to the Vendor (this prevents Vendors from mapping personally identifiable information). The Digital Receipt awaits User review and acceptance by way of the Digital Receipt Manager (located in the ICA "Account" view). For this case the User is not manually passing the DR-ID from the User's Digital Receipt Manager. A second method for generating a DR-ID can occur when ordering by phone, fax or online. The ICA "Buy" view displays the auto-generated DR-ID biased on rules specified through a "Commerce Profile." The UCM generated DR-ID must match the Vendor's returned copy to negotiate a valid transaction. The Vendor uses the DR-ID to return the digital receipt; this is all the Vendor requires since the DR-ID is unique to the User's account. The digital receipt does not contain personally identifiable information. Only the raw transaction information and logistics of the transaction are provided, all personally identifiable information and or financial information are never passed or stored in the CSS. The User may accept or decline it from within the ICA Digital Receipt Manager. Once accepted, the same DR-ID cannot be issued or activated again. The User must accept the DR-ID before it can be activated. The same is true when the User purchases an item online. The online vendor can provide a place during the online checkout procedure for the User to enter, paste or pass the DR-ID. The IDCP Network can play a vital role in preserving security and anonymity for both parties of a payment transaction.

Initially, the IDCP Network can act as a decision-support tool for a shopper by enabling searches, enhanced analysis, and comparisons of selectively cataloged items before the sales transaction, and then after the transaction, change its role in regards to the purchased item, to a repository of its information profile.

IDCP as Indicators

The ability to aggregately monitor Consumer cataloging activity could have a significant impact on pre-sales forecasting, since the IDCP Network can provide Vendors with minute-by-minute customer-centric analytics on item cataloging, including how the Users are classifying their catalog selections contextually, and thus revealing the intent and motivation associated with the purchase. This obviously provides a more accurate multi-dimensional view of the Consumers' buying habits. The latency issues are also minimized by accommodating many touch points. It also addresses a major concern marketers have been struggling with of how to integrate Internet advertising efforts with the rest of a traditional company's marketing and CRM initiatives.

Today, companies rely on surveys and historical seasonal fluctuations to create their sales forecasts, which, for publicly traded companies, are carefully reviewed by stock market investors and analysts. The sales forecast, coupled with a company's historical ability to meet their forecasts, can have a direct effect on their share price. Stock market analysts also use a series of mathematical formulas to chart the various dynamics of a company's share performance, often taking into consideration price, volume, and momentum.

The IDCP Network can play an important role in raising the quality of sales forecasting in the immediate, short term, and long term, because aggregate consumer interest in a product line can be constantly monitored. In addition, IDCP data can provide the foundation for an entirely new set of analytical formulas that could prove to be significantly more accurate in charting a given company's fortunes than any tool developed to date.

Web Services

The present invention can integrate any one of a number of technology initiatives currently under way, or later developed, to create an infrastructure for linking varied Web services. At the forefront of this effort are technologies such as "XML," "UDDI," and "SOAP." These emerging technologies and standards are being packaged into competing suites of services and tools from forefront companies such as Microsoft™, Sun Microsystems™, IBM™, BEA™, Oracle™, and Hewlett-Packard™. The present invention is well suited for accommodating the Web Services model, as specifically outlined by Microsoft. An example of a Web-based development platform is Microsoft's .Net, which includes tools to develop and deploy Web-based applications that can be accessed from anywhere, including browsers, handheld devices and smart phones.

In the future, developers will pay much more attention to how seamlessly a Web site can be integrated with another Web site. Currently, developers are mostly concerned with integrating applications with known quantities on their particular site. In the future, with the aid of the emergent Web services, developers can expect to integrate any new application with existing applications to create a greater set of services. This "next generation Internet architecture" is an excellent platform for the IDCP Network of the present invention, and the Web services model, especially as outlined by Microsoft and others. In the present invention, Intelligent Agents (IA) are essentially applications that are designed specifically to work with and enhance the Instant Catalog Assistant (ICA) and other supportive data stores. They intelligently process, analyze and augment e-Catalogs. IAs can work with other IAs as well as third-party Web service applications to create a seamless aggregate result.

Content Management System

A content management system (CMS) is a comprehensive toolset and environment that allows non-technical users across multiple departments of an organization to create, approve and publish web content on public or private networks. The users do not have to have any HTML or JavaScript skills; generally, if they are proficient with a common word processor, they can create content for a web site.

CMS technology also generally provides "workflow" tools that enable the construction of approval lists, for instance, that would reflect a chain of management approval steps necessary for any particular type of document. In this way, corporate policies and procedures can be embedded into the CMS as business rule logic. The use of pre-defined templates also ensures consistency with the design and appearance standards required by most organizations.

Content Management Model

For conventional content management, there are three typical models. The buyer may "pull" content in the e-Market. Alternatively, the supplier may "present" content to the User, thereby directly managing what the User sees and may interact with. Lastly, a third-party may manage the interaction, with commercials or promotions inserted in the content. Each of these methods has inherent problems that the present invention addresses, while utilizing the virtues of each method for the mutual advantage of the User and Vendor.

IDCP Content Management

The CSS and its catalog management method do not specifically fit any of the methods listed above. Instead, an alternative content management method is provided. The approach of the present invention focuses upon a consumer-centric model that places control of the catalog content with the recipient. The Vendor simply empowers the User by making available a way to catalog product, service or information groupings for selective storage, personalization, enhancement, and peer sharing, while maintaining dynamic content and anonymity at all times.

In one embodiment of the present invention, catalog content is categorized and normalized to support relational database development. The CSS profiles every catalog entry using the Catalog Profile Template (CPT) which may be an XML schema, designed for the Vendor's particular product type(s) and industry. Only a minimum data set is required. However, the Vendor can provide a richer data set, which does not exceed the preset range. The CPT is capable of being expanded or customized. For example, with extensible programming languages, programmers can add new control structures, statements or data types. Those with administrative privileges, such as the Vendor, authorized supply channel partners via Vendor Catalog Administrator (VCA) that provides services such as account administration, Catalog Profile Template (CPT) management and information extraction, transactional reporting, interactive script creation and management, affiliate management, supply chain account management, to name a few. IDCP technical administrators can perform administrative selective CPT and maintenance tasks. For cataloging to take place, publishing of catalog templates to the IDCP Item Data Store (IID) is required. The IID is the master data store where all the Catalog Profiles are stored.

EXAMPLES

Although none of the currently available applications provide the cataloging features of the present invention, many "third-party" technologies and components are addressing legacy information extraction, intelligent search routines, and e-Catalog classification just to name a few. All of which could be integrated into the present invention.

Using technology from WIZNET®, raw data from the Vendor can be converted from paper to digital format for export to the IID. WIZNET is a useful tool for moving the Vendor's data from an unabridged format to a query able digital document format for use with the present invention.

Another industry example of potential use is the Cuesta® Online Catalog System as provided by Cuesta Technologies. Cuesta provides customizable online catalogs and searchable databases for business and e-Commerce Web sites. The Cuesta Web development system uses state-maintenance programming without cookies, to provide programmable, dynamically generated Web pages with database extensions.

The Cuesta Catalog System is a Web database application created with OpenPages™ that provides the most comprehensive system for deploying online catalogs on the market today. The Cuesta Catalog system uses the "OpenPages" Data "Bus," which is a flexible, extensible, and modular data interchange mechanism that allows data from any source. Database programs, such as Oracle®, FiledMaker® Pro or Microsoft® Access spreadsheet applications, which can include text files are used and incorporated into the Web site. This feature makes it easy for Cuesta catalogs to work with virtually any legacy data the company may have.

Mercado® Software, Inc. (www.mercadosw.com) adaptable search Framework (IntuiFind™) combines the leading intuitive, parametric, and category search methods into a comprehensive, flexible search solution for large and complex online catalogs. By combining parametric search with categorical search techniques into a single query interface, users are able to find catalog items by defining specific product attributes that are important to them. Parametric searching is simply retrieving content by textual attribute or feature. For example, an online wine merchant could permit end users to access information by vintage, color, name, price, and the like. Books can be retrieved by author, title, subject heading, year of publication, publisher, and so forth.

Mercado's XML-based product classification and attribute extraction technology (UniClass™) can integrate with existing databases and e-Catalog commerce systems. It unifies unclassified or inconsistently classified product data into the aggregator's preferred classification system. These are example methods for automating the construction, and dynamic management of content-rich structured data.

Customer Relationship Management (CRM)

An integrated information system that is used to plan, schedule and control the pre-sales and post-sales activities in an organization. Although the dividing lines are not crystal clear, CRM generally does not include the marketing function and could be said to be enterprise relationship management (ERM) without the marketing component.

The clear objective for CRM is to enable a customer to interact with a company through various means including the Web, telephone, fax, e-mail and snail mail and receive a consistent level of quality service. The integration of all activities means that an order placed by phone can be tracked on the Web and vice versa.

IDCP can play an important role in the CRM field by dramatically altering and expanding the relationship between Buyer and Seller. By equalizing the nature of the relationship through a buffered, anonymous environment, and transforming it from one that can include harassment and coercion to one of respect and consensual interaction, both parties will enjoy the benefits of enhanced cooperation. Consumers today are tracked, investigated and categorized to unprecedented levels because marketers believe they must "own" their customers. These aggressive techniques are having a growing counter-productive effect, however, as more and more consumers are either surfing the web in a more limited manner, or simply turning off their machines.

IDCP requires a completely different approach, because it employs a universal catalog database, aggregately created by multiple vendors and their respective supply channels. Consumers can pull packaged content in virtually any situation and with any device, even a plain piece of paper, a pencil, and an ordinary telephone. Once the consumer has cataloged items from a particular vendor, an anonymous vendor channel is created, which is the medium through which entirely new CRM capabilities can emerge.

Enterprise Relationship Management

Enterprise Relationship Management (ERM) is an integrated information system that serves the "front office" departments within an organization, which are sales, marketing and customer service. When sales functions are integrated with marketing and customer service, it is known as "enterprise relationship management."

IDCP can enhance ERM capabilities through the instant cataloging and the dynamic vendor-channel that is created.

Enterprise Resource Planning

Enterprise Resource Planning (ERM) is an integrated information system that serves all departments within an enterprise. Evolving out of the manufacturing industry, ERP implies the use of packaged software rather than proprietary software written by or for one customer. ERP modules may be able to interface with an organization's own software with varying degrees of effort, and, depending on the software, ERP modules may be alterable via the vendor's proprietary tools as well as proprietary or standard programming languages.

An ERP system can include software for manufacturing, order entry, accounts receivable and payable, general ledger, purchasing, warehousing, transportation and human resources. The major ERP vendors are SAP®, PeopleSoft®, Oracle®, and J.D. Edwards®. Lawson Software® specializes in back-end processing that integrates with another vendor's manufacturing system.

IDCP can provide monitoring services for vendor catalogs that reveal buying intentions of the public utilizing the service. These buying intentions can be tracked by geography, gender, and other variables, all in "real-time," which is a way of peering into the mind of consumers without having to ask them explicitly. Complementary tools and web services will be offered through the IDCP service that enable people to plan purchases ahead of time, for example in the case of a wedding plan or a Christmas shopping list, which can also be analyzed by the IDCP system and instantaneously shared by the supporting supply chain for that product or service. IDCP therefore can provide a sound, reliable sales forecasting system, in effect, bringing customers themselves into the supply chain information loop.

DETAILED DESCRIPTION

Overview

Instant Cataloging

Figure 1:
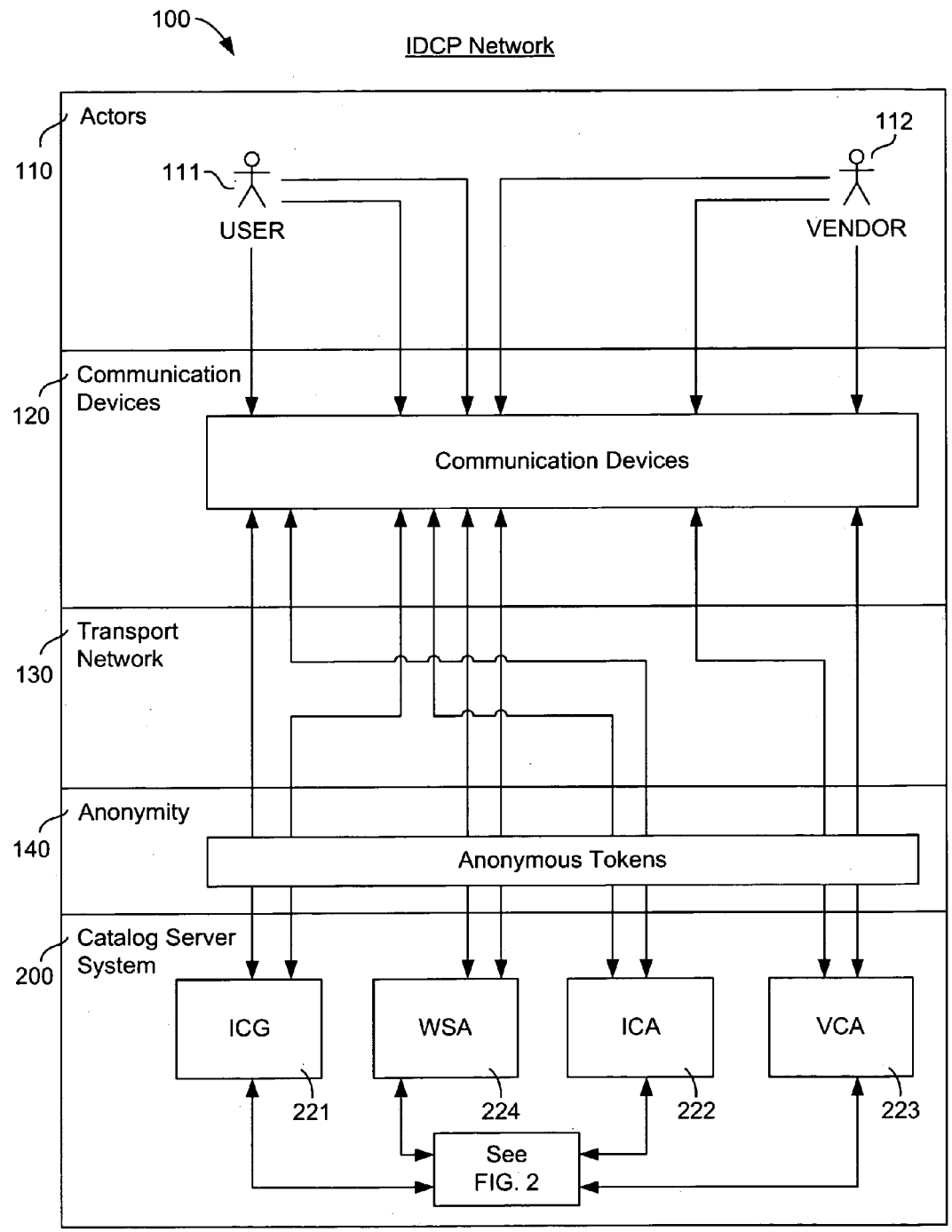
FIG. 1 is a schematic diagram showing an overview of the present invention according to an embodiment of the present invention.

The present invention is an Interactive Digital Catalog Profiling (IDCP) Network 100, as shown in overview in FIG. 1. The primary purpose of the IDCP Network is to provide an intermediary environment for the Actors 110 in the network whereby a User 111 and a Vendor 112 can interact in a consistent, anonymous manner for sharing digitally cataloged and personalized information profiles on products, services and information, and for both parties to acquire useful aggregated data resulting from their mutual participation.

Figure 4A:
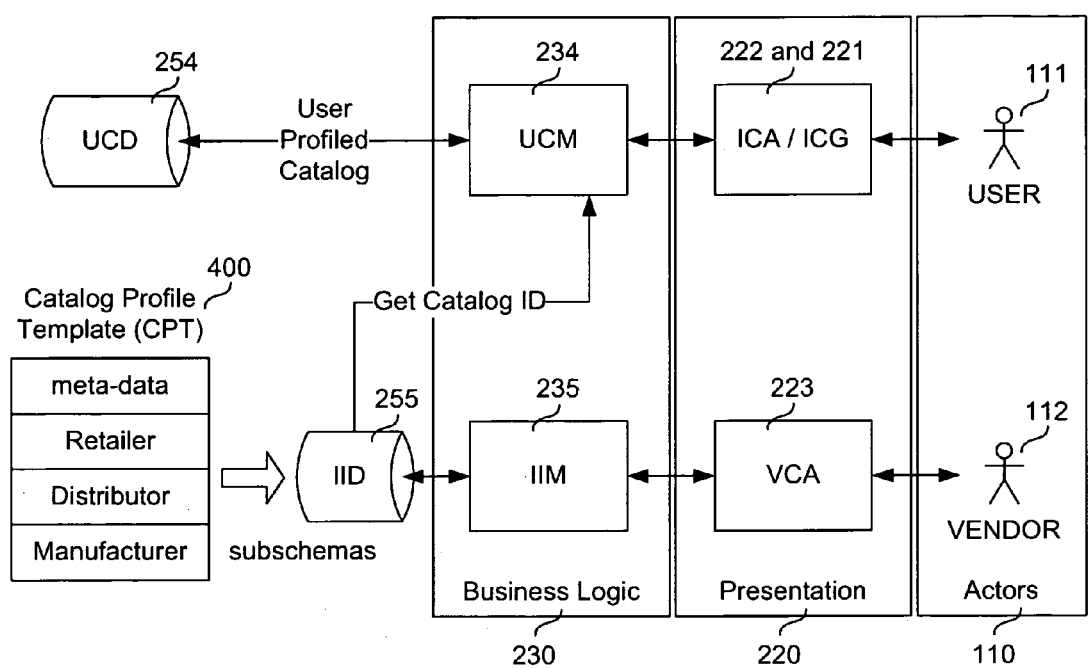
FIG. 4a is a schematic diagram detailing a portion of the present invention, according to an embodiment of the present invention.
Figure 4B:
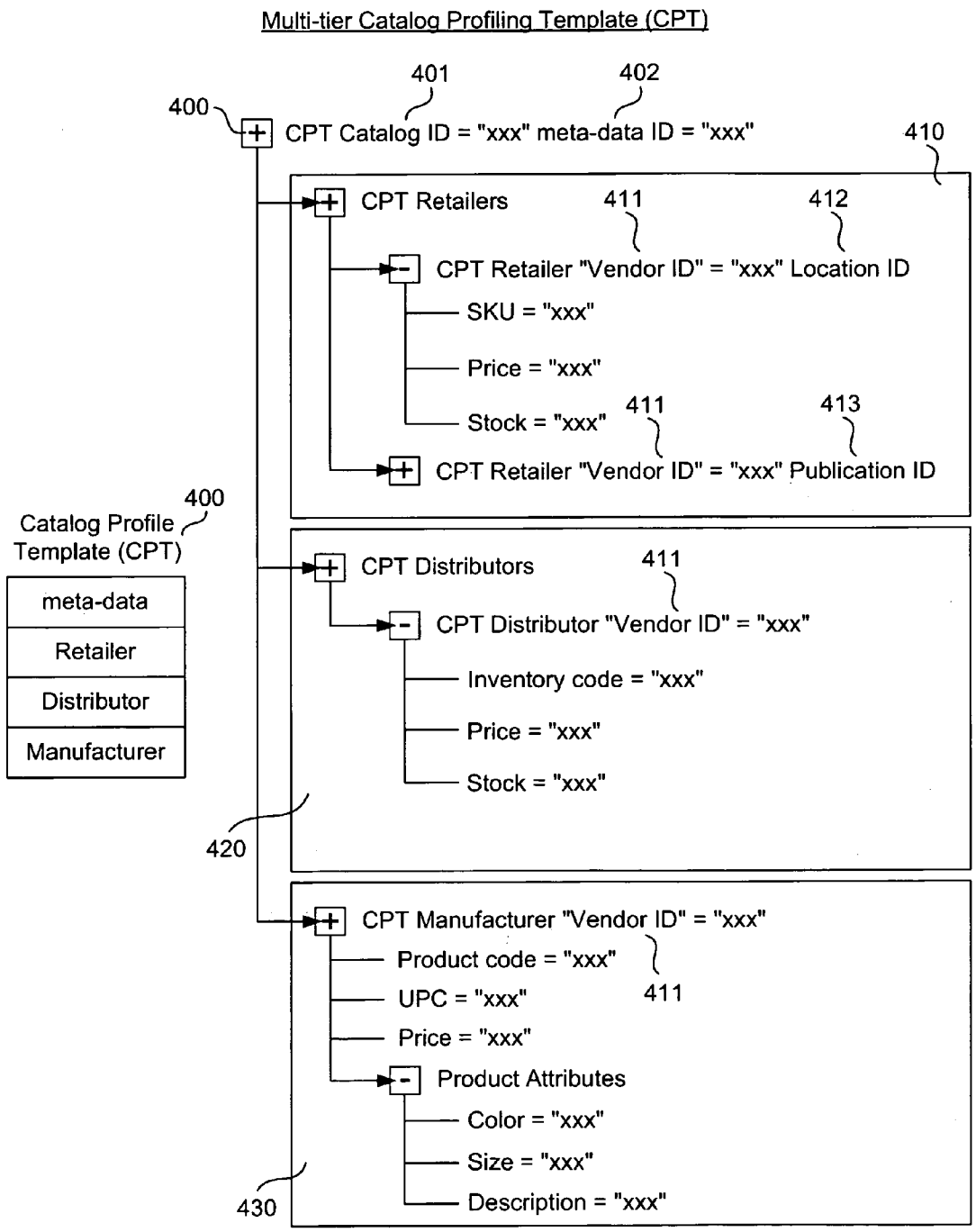
FIG. 4b is a schematic diagram detailing a portion of the present invention, according to an embodiment of the present invention.

The primary dynamic involved in the IDCP Network 100 is the concept of "instant cataloging," whereby a User 111 of the present invention, can acquire a personalized copy or instance of one or more catalogs from a Vendor 112 by simply referencing a Catalog ID 401, as shown in FIG. 4b, through one more associated identifiers, along with the appropriate authentication factors to authorize the transaction. This initiates the delivery of a catalog ID or a scripted cluster of catalog IDs (as defined by the Vendor) to the account of the User, all within the protected environment of the Catalog Server System 200. Instant cataloging allows any User 111 of the system to acquire the cataloged items as information packages, rather than having to search, locate, and download disparate pieces of information, to their own machine, from the Internet, which constantly exposes the User to malevolent programs such as viruses, "worms" and "Trojan Horses."

For the present invention, a retailer, distributor or manufacturer, or entity in the business of representing products, services or information for both profit and non-profit purposes, typifies the Vendor 112, and the User 111 is typified by individuals who could be either consumers or participating members of the "supply chain," which is every intermediary in the path of a product or service. For instance, a User could be a purchasing agent in a company acquiring information from an industrial supply catalog, or a User could be a shopper in a retail store cataloging an item or a vendor product line.

The IDCP Network 100 facilitates a "buffered" environment that creates a protected space separate from the public Internet allowing the User 111 to anonymously select cataloged information from a universal, integrated catalog database, which is populated and updated by the participating Vendor community. This permits both the User and Vendor 112 to remain in direct control of their environment at all times, yet in a decoupled manner. It also "levels the playing field" between the Vendor and the User, by equitably distributing the responsibility that both parties need for successful, private and secure communications and transactions. This is a buffered peer-to-peer model that is third-party managed and fortified.

The IDCP Network 100 provides multiple ways for the Vendor 112 and the User 111, to interact in the selective cataloging of products, services, and information through a global network of converging technologies. The present invention employs "smart" application services to intelligently personalize and enhance catalog "clusters," or groupings of catalogs, to explore reusable information in true real-time for many purposes. These self-selected catalog groupings can be presented in three forms: products, services or information.

The IDCP Network 100 is an intelligent catalog aggregation and distribution platform, providing "instant cataloging" for Users to personalize, enhance, and peer share within a secured environment. It also provides simultaneous sharing of the cataloging activity with every participant in the supply or service chain, while maintaining complete anonymity of the User.

As shown in FIG. 1, the IDCP Network 100 includes a Catalog Server System (CSS) 200, which encompasses the necessary interfaces, processes and data stores to carry out the instant catalog functions. The entire IDCP Network is comprised of four main layers: the Actors 110, which include the User 111 and the Vendor 112; the Communication Devices 120 including landline telephones, portable devices, smart phones, card reader and scanner devices, Internet-enabled browsers, Web applications or services, ITV set-tops and Digital TV; the Transport Network 130 which connects the Communication Devices 120 to the CSS through anonymous tokens 140 utilizing the Internet. The CSS houses the applications and data stores that implement instant catalog functionality.

When the User 111 uses the present invention to perform a transaction through the input device, interacting with the Instant Catalog Gateway (ICG) 221 process within the CSS 200, the associated information triggers a cataloging "action" to the User account. The User account does not actually generate a new copy of the cataloged item(s), but rather a customized 'view' or instance of it as personalized by the User.

Upon cataloging an item(s), the User 111 can access and manage the attribute profile through the Instant Catalog Assistant (ICA) 222. The ICA provides a simple, intuitive interface, such as through a Web browser, that allows the User 111 to review, share, store, profile, and enhance the catalog data, while retaining complete anonymity because all of the data stores and processes take place within the secure CSS 200 environment.

Vendor 112 maintains and monitors its e-Catalog profiles in the CSS 200 through the Vendor Catalog Administrator (VCA) 223. The VCA provides services such as account administration, Catalog Profile Template (CPT) 400 management and information extraction, transactional reporting, interactive script creation and management, affiliate management, supply chain account management, to name a few.

The Vendor—Consumer Relationship

Current Web-enabled organizational databases exist and are maintained "behind" the Web site by applications programs, often called Enterprise Resource Planning (ERP) applications for larger firms, and known as simply business applications for smaller and medium sized firms. These databases are queried by Web users through an intermediate layer of software to enable online shopping and ordering.

The advantage of the present invention lies in the relationship that is created by the User/potential customer and the Vendor, enabled by the ability to automatically update product catalogs in the CSS 200 at whatever time frequency desired by the Vendor as changes are made to the master database. When the CSS receives the update, all Users simultaneously receive the updates in their personal 'view' of the cataloged item(s), for as long as they hold the cataloged item(s). This, in effect, creates an ongoing channel of communication between the Vendor 112 and the User 111 that is created simply by the act of the User acquiring catalog items from one or more Vendors.

Supply Chain Implications

The IDCP Network 100 will not only dramatically alter the accessibility of information; but also the concepts of transaction time, whereby latent demand of information is shared simultaneously rather than sequentially amongst the many participants in the "supply chain." Certain key features of the present invention, as discussed further herein, as shown in FIGS. 1 through 17, include: instant catalog storage, personalization, catalog content enhancement, and peer sharing—all accomplished anonymously with the aid of multiple converging technologies. These quickly emerging communication devices 120 and technologies include the use of ITV by way of an Internet-enabled a set-top box, digital TV or gaming console, an Internet-enabled browser, Web application or service for PC use, a portable storage device, or any Internet appliance or device that can connect to the Internet. The growing proliferation of these technologies, especially ITV, will fuel new personalization technologies worldwide, allowing consumers to instant catalog their own personal assortment of interactive products, services and information with the assistance of thematically based, task-specific Web services.

Acquisition by the User 111, enhancement, and peer sharing of catalogs from the Vendor 112, is a strong indicator of buying intentions on the part of the User, therefore if that activity is viewable by the Vendor(s) supplying the catalogs in a "real-time" format, reliable deductions can be made regarding future demand. The IDCP Network 100 is designed to incorporate Vendor catalog structures that are jointly maintained by any or all key participants of a supply chain, therefore all participants can be made aware of the cataloging activity and timely actions can be taken to optimize the flow of goods to market, such as in a "Just-in-Time" production/inventory control system, in a significantly higher degree than is possible today with statistical sales forecasting models.

The IDCP Network 100 of the present invention implements a process that instantaneously shares information with every other potentially affected user of that information. This means that when a User 111 initiates a request for certain information on a product or service, the entire supply chain of that product or service is made aware of the request. The supply chain typically consists of the raw material supplier, manufacturer; distributor, and retailer. In addition, other players may exist in the chain at any one or all of these levels, including but not limited to marketer, advertiser; salesman, installer, contractor, administrator, historian or accountant. Monitoring acquisitions of catalogs on an aggregate basis in real-time could allow the supply chain to prepare for demand fluctuations by analyzing instant catalog pre-transaction activity, in what could be thought of as "latent" demand patterns. Latent demand patterns could be organized and monitored in the same manner as stock indices, allowing Vendors 112 to track live consumer responses to product promotions and marketing campaigns. This information can also provide more realistic sales forecasting information because buying intentions are revealed before transactions take place. "Viral" marketing patterns will also emerge as Users peer share their catalogs, indicating rapidly growing consumer interest in a product or service promotion. In fact the effects of "viral" marketing can become a measurable factor in the success of a promotional campaign.

Figure 5A:
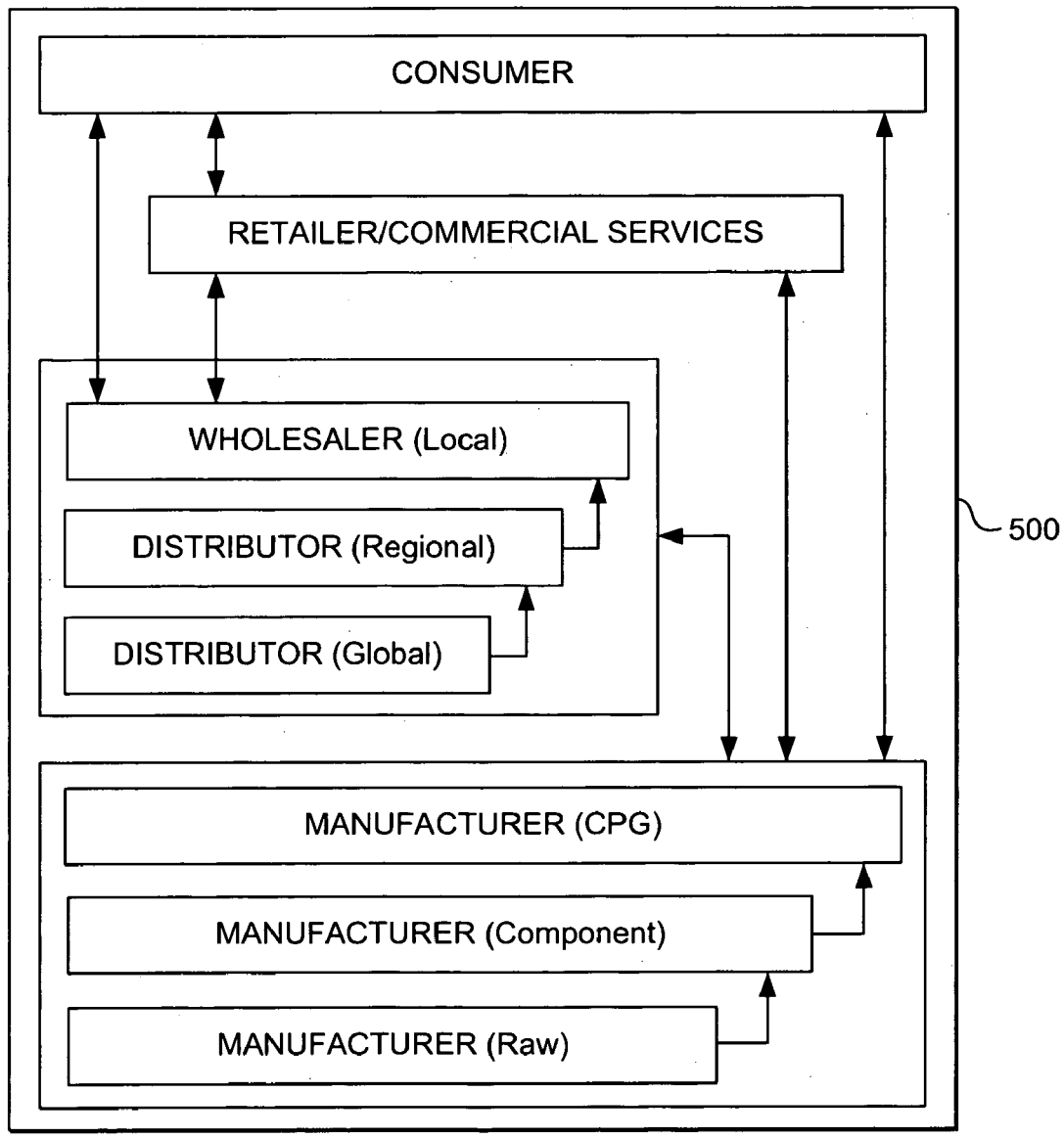
FIG. 5a is a schematic diagram detailing a portion of the present invention, according to an embodiment of the present invention.

The hierarchal relationship between the industry supply chain 500 and the present invention is graphically depicted in the FIG. 5a. Within the present invention's CSS there are interactions between the consumer (User) and the retailer (Vendor); as well as between the retailer (Vendor) and the manufacturer (CPG). There may even be direct interactivity between the consumer (User) and the manufacturer (CPG). Those subsidiary manufacturers who provide the raw materials, goods, services or components interact with the primary manufacturer (CPG). The primary manufacturer (CPG) may provide or request information, distribution services and/or inventory warehousing through various distributors and wholesalers in their supply chain. The wholesaler stores and moves products, goods and services through to the retailer (Vendor). In some instances the wholesaler may become the Vendor, directly interacting with the consumer/end-user.

This Supply Chain Hierarchal Schematic (FIG. 5a) describes the interrelationships of the supply chain and its relationship to the consumer. The present invention enables the incorporation of the consumers' pre-purchase intentions and post-purchase history into the supply chain in a dynamic and real time manner, such that every participant in the supply chain receives instantaneous feedback according to their permissions, position and role.

Figure 5B:
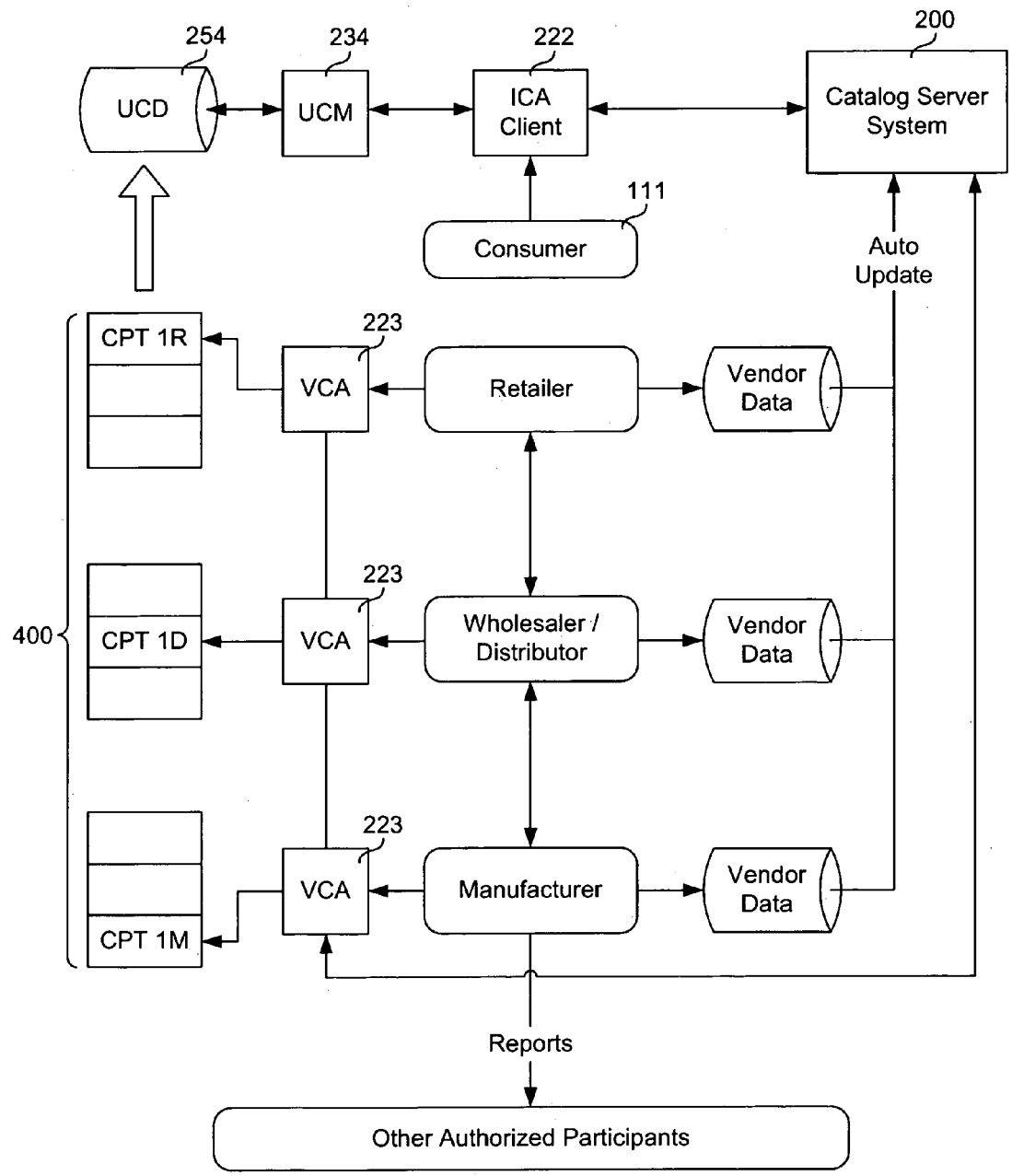
FIG. 5b is a schematic diagram detailing a portion of the present invention, according to an embodiment of the present invention.

The present invention provides for a flexible implementation of the multi-tier Catalog Profile Template (CPT) 400 to support the Supply Chain Hierarchy depicted in FIGS. 5a and 5b. The best-case "ground-up" scenario involves the CPG Manufacturer initiating a multi-tier template for a unique product, incorporating the necessary distribution levels according to their actual selling channels to the ultimate end-user. However, a "top-down" scenario could also be implemented, whereby a Retailer initiates a template for a product that is not yet registered in the CSS. The Retailer can then offer the template to the supplier of the product for them to contribute their information, to participate in managing their portion of the template, and to receive the benefits of the information reporting available in the VCA 223. This "top-down" sharing can result in an ongoing cascade effect whereby each level "sponsors" each level below until the actual manufacturer of the product is brought into the template definition. The flexibility of this model, however, can be demonstrated by the fact that any participant underneath the Retailer may only desire the benefits of the activity reporting; in this case, the supply chain member would not have to contribute information to the template, but would simply sign up as a Vendor to access the reporting information via the VCA. The multi-tier template therefore creates a structure for all supply chain participants to interact with each other in a synchronistic way through a unified interface toolset in the VCA as depicted in FIG. 5b. At the consumer's discretion it can also establish an active link into the supply chain so there is information continuity regardless of changes in the participants in the hierarchy.

The present invention can also include multiple IDCP Networks 100, implemented by licensed service providers and organizations, which would utilize the technology described in this patent to fully interconnect to all other Catalog Server Systems. This would allow a User 111 to obtain a catalog from any CSS, regardless of their location. These marketplaces would operate in a similar manner to credit cards; a single credit card number is recognized by any financial institution in the world supporting that card's standard, such as Visa or MasterCard. The IDCP User account number would be 'universal', and is referenced against a master index or registry to route an instant catalog request to the User's uniquely configured ICA 222. This would be achievable anywhere in the world.

The present invention provides a method that equitably balances the control of information acquisition between the User 111 and the Vendor 112, while protecting the rights of the consumer's anonymity, and the rights of the Vendor to obtain critical marketing data. IDCP Network cataloging will reduce industry's reliance on mass mailings by creating a balanced medium, whereby Vendors can publish catalogs of any type, consumers can acquire this information anonymously, and aggregate market-buying intentions can be monitored without revealing any personally identifiable information. The IDCP environment can become the precursor to any or all e-Commerce transactions because it can support the buyers' research and decision-making process, in a completely anonymous way, right up until the execution of the transaction. And any part of the transaction of profiling and or purchasing is readily available to everyone in the supply chain, instantly and simultaneously.

Catalog Server System

The Catalog Server System 200 of the present invention employs the Internet to interact with each User 111 of the IDCP application. The invention, through the unique application and use of the CSS, and the anonymous nature by which personalization of catalog parameters is achieved, will dramatically reduce the number of complaints, lawsuits and agency challenges regarding the privacy of the user's personal information. Each User will, in effect, have their very own "personalized Internet" environment to anonymously process, explore, enhance, and peer share selectively chosen catalog item(s).

The CSS can protect company communication and data resources against unauthorized access, and authenticate communication to verify the sender's identity. Unlike the Internet, which is open to almost anyone, the CSS maintains controlled, password-protected access. Such security can be multi-layered and encrypted using any current or future encryption technology. The CSS can also help a customer obtain needed product and service information that can include updated technical specifications, pricing, reports and inventories. Additionally, restocking and inventory replenishment procedures can be accurately monitored, and users of the system can perform powerful 'parametric' searches. The CSS creates a mutual advantage for both the Vendor 112 and User 111. The present invention provides a User-managed e-Catalog system that enables anonymous, real-time transactional information feedback and information to Vendors, and every participant in the supply and service chain instantaneously and simultaneously.

The personalized, CSS 200, as provided by the IDCP Network 100, can enrich the Web experience for the individual User 111 in a secure environment where the demands for personally identifiable information are no longer required prior to purchase. At the same time, the overwhelming supply of information available is trimmed to the profiled needs of the User. From the Vendor 112 or supplier side of the system, only business critical transactional information will be available for use. This anonymous exchange of data ensures a level of integrity not yet evidenced on the Internet. In addition, the Instant Catalog Assistant (ICA) application can greatly enhance the Users' ability to acquire desired information by automating the query dialog that currently exists in today's 'manual' model whereby Users' have to personally interrogate Web sites and wade through vast numbers of search results. This type query dialog is best suited in a controlled, secured, and standardized environment.

Figure 2:
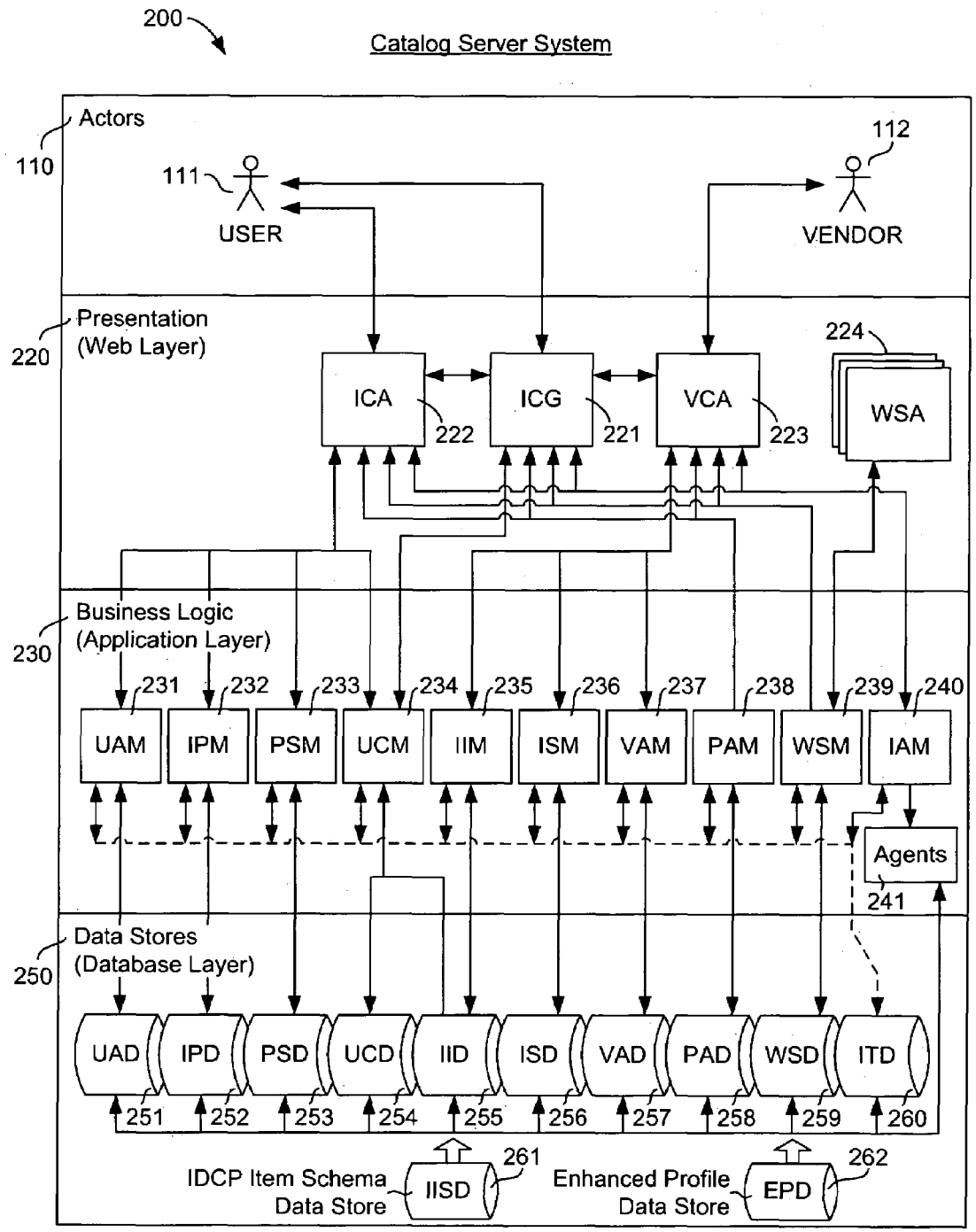
FIG. 2 is a schematic diagram detailing a portion of the present invention, according to an embodiment of the present invention.

As depicted in FIG. 2, the CSS 200 is comprised of an Actor 110 layer, which includes the parties interacting with IDCP, and three main layers: Presentation 220, Business Logic 230, and Data Stores 250. The Presentation layer 220 includes the programs that interact with outside Actors, including the ICG 221, ICA 222, VCA 223 and the WSA 224. The Business Logic layer 230 includes the supporting processes for these presentation programs, applying the business logic to the data according to the application requirements. The foundation of the CSS is the Data Store layer 250, which comprises all of the interrelated databases. In addition, there are Intelligent Agents (IA) 241, which are programs that operate independently on behalf of the User 111 or Vendor 112 to accomplish a variety personalized tasks.

The following discussion outlines an example deployment of the invention, but is not in any way intended to limit the present invention to this particular system architecture.

Actors Using the System

The Actors 110 layer includes the User(s) 111 and the Vendor(s) 112. The User represents any individual accessing the CSS 200 for the purpose of acquiring and managing the personal use of e-Catalogs. The User could be a retail consumer, accessing the system for shopping or information acquisition purposes, or a business user who may be utilizing the system as a business-to-business purchasing tool. The Vendor represents any organization that contracts with the IDCP Network 100 operating company to publish and replicate their e-Catalogs in the CSS.

Presentation Layer Functions

As depicted in FIG. 2, the User calls up the Instant Catalog Assistant (ICA) 222 via an Internet connection 130. The User is required to anonymously authenticate into the ICA 222, and is shown an Instant Catalog Index Review (ICA "Review" view), which is a list of new catalog items, arranged in a manner similar to an e-mail in-box. The User can then store the catalogs in various folders (ICA Folder View), and view them individually. The User has the option to print one or more catalog items, view the purchase information from the vendor using the Commerce Profile (ICA "Buy" view), or share the item with one or more peers.

Instant Catalog Assistant (ICA)

As depicted in FIG. 2, the Instant Catalog Assistant (ICA) 222 includes a profile parameter engine that intelligently personalizes and enhances the item cataloged to complement the User's lifestyle. The ICA captures, stores, manages and shares User 111 selected catalog items for other Web services to explore, analyze, augment, and enhance when required or requested.

The ICA 222 is the default User 111 interface for the present invention. It is accessible through a variety of existing Internet appliances and devices such as the set-top box or digital TV, PC, PDA, Web tablets, portable storage devices, or any other appliance or device that can connect to the Internet and interact. The ICA may take on a different user interface depending on the device, but the core functionality will, for the most part, remain intact. A Web-based application using a browser to interface is one embodiment of the present invention, however a stand-alone or client-side application running on the User's hardware can also be utilized.

Through the ICA 222, the User anonymously accesses the vendor catalogs through the Business Logic 230 layer. To generate a User-personalized catalog profile for every cataloged item that requires it, the User 111 must begin acquiring items through the IDCP Network for configuration by way of the ICA "Profile" view. Profiling becomes more automated over time as the ICA builds a common profile to draw from. This could include, for example, a matching of shoe size to the individual's profile setting. The personalized catalog profile parameters are viewed and managed through the ICA "Profile" view. The User may choose to personalize the catalog profile before sharing or categorizing it for future interaction by storing it away. Personalization is highly dependent upon the profile attributes associated with each item cataloged. The more a User catalogs, the smarter the common profile becomes due to the learning abilities of the IAs 241 employed by the present invention.

Additionally, in one embodiment, the present invention utilizes a Web-based graphical interface to communicate with the User 111. The User interface (UI) for the ICA 222 is preferably consistent in form from User to User. However, other UIs can be provided for specific Web services that operate through a separate browser window or client application.

Instant Catalog Gateway (ICG)

ICG 221 is the interface through which the User 111 acquires catalogs through various communication devices 120. The ICG has several functions; it collects data transmissions from client programs on devices such as, but not limited to PDAs and PCs; it acts as the server for directly interfacing with Web enabled devices to collect instant catalog requests; and it interfaces with an external Private Branch Exchange (PBX) for collecting instant catalog requests from the landline telephone network.

Vendor Catalog Administrator (VCA)

The Vendor Catalog Administrator (VCA) 223 is the administration interface that enables subscribed Vendors to maintain and view their account profiles, interactive scripts, promotional controls, catalog bundles, supply chain services, commerce profiles, multidimensional reporting, to name a few.

Web Service Applications (WSA)

Web services applications (WSA) 224 represent additional functionality that complements and enhances the instant catalog repository by offering Users 111 and Vendors 112 useful Web-based tools and services. WSA applications could be implemented within the IDCP Network 100 or externally by third-party ISVs. Since Web service applications may be external to the CSS 200, they are shown as a launch item connected to the Web Service Manager (WSM) 239 in FIG. 2.

IAs 241 and Web Service Applications as illustrated in FIG. 2 may remotely invoke the ICA 222 to search for and manage catalogs. As an example, a "Home Manager" Web service application could invoke the ICA to search participating peers and Vendors for additional products, services and information without requiring the User 111 to manually launch and engage the ICA directly. Any selections cataloged through Web service applications would remain managed by the ICA.

Business Logic and Databases

User Account Manager (UAM)

The User Account Manager (UAM) 231 provides the logic that manages the setup and maintenance tasks in relation to the User 111 account information, interfacing to the User through the ICA 222.

User Account Data Store (UAD)

The User Account Data Store (UAD) 251 stores all User 111 account related information such as, but not limited to account numbers, PIN, parental accounts, order lists, usage history, member card account numbers, user ratings, etc. In keeping with the anonymous nature of the IDCP Network, the UAD does not store any personally identifiable information (PII), such as name, address, phone numbers, e-mail address, social security number, etc. The present invention does not need to merge or map catalog profiles with external marketing databases for supplementing PII.

IDCP Personalization Data Store (IPM)

The IDCP Personalization Manager (IPM) 232 provides the logic that manages the personalization parameters in relation to the IPD, interfacing to the User through the ICA 222.

IDCP Personalization Manager (IPD)

The IDCP Personalization Data Store (IPD) 252 stores personalized preferences for catalog items, peer sharing, commerce profiles, promotional offerings, search options, parental controls, etc.

Peer Share Manager (PSM)

The Peer Share Manager (PSM) 233 provides the logic that manages all of the setup and maintenance tasks in relation to the PSD, interfacing to the User through the ICA 222.

Peer Share Data Store (PSD)

The Peer Share Data Store (PSD) 253 stores all information on the User's peers, such as, but not limited to peer nicknames, peer account numbers, peer shared folders and permissions, peer shared items (sent by the User 111), logs of peer shared catalogs received, and peer sharing history.

User Catalog Manager (UCM)

The User Catalog Manager (UCM) 234 provides the logic that manages all User interaction with their catalog information through the ICA 222 and the ICG 221.

User Catalog Data Store (UCD)

The User Catalog Data Store (UCD) 254 stores catalog reference IDs acquired directly by the User 111 through instant cataloging or indirectly via peer sharing. The UCD stores item references to the Vendor Catalog, which reside in the IDCP Item Data Store (IID) 255. The UCD also stores the catalog profile information.

IDCP Import Manager (IIM)

The IDCP Import Manager (IIM) 235 provides the logic that manages the setup, which involves "schema mapping" between the IDCP Catalog Profile Template (CPT) and the Vendor's catalog template, and the maintenance of the IDCP Data Store through the importing of Vendor catalog files.

IDCP Item Data Store (IID)

The IDCP Item Data Store (IID) 255 stores all of the Vendor catalogs for use by the IDCP Network. The IIM interfaces to the Vendor 112 through the VCA 223.

Interactive Script Manager (ISM)

Figure 6:
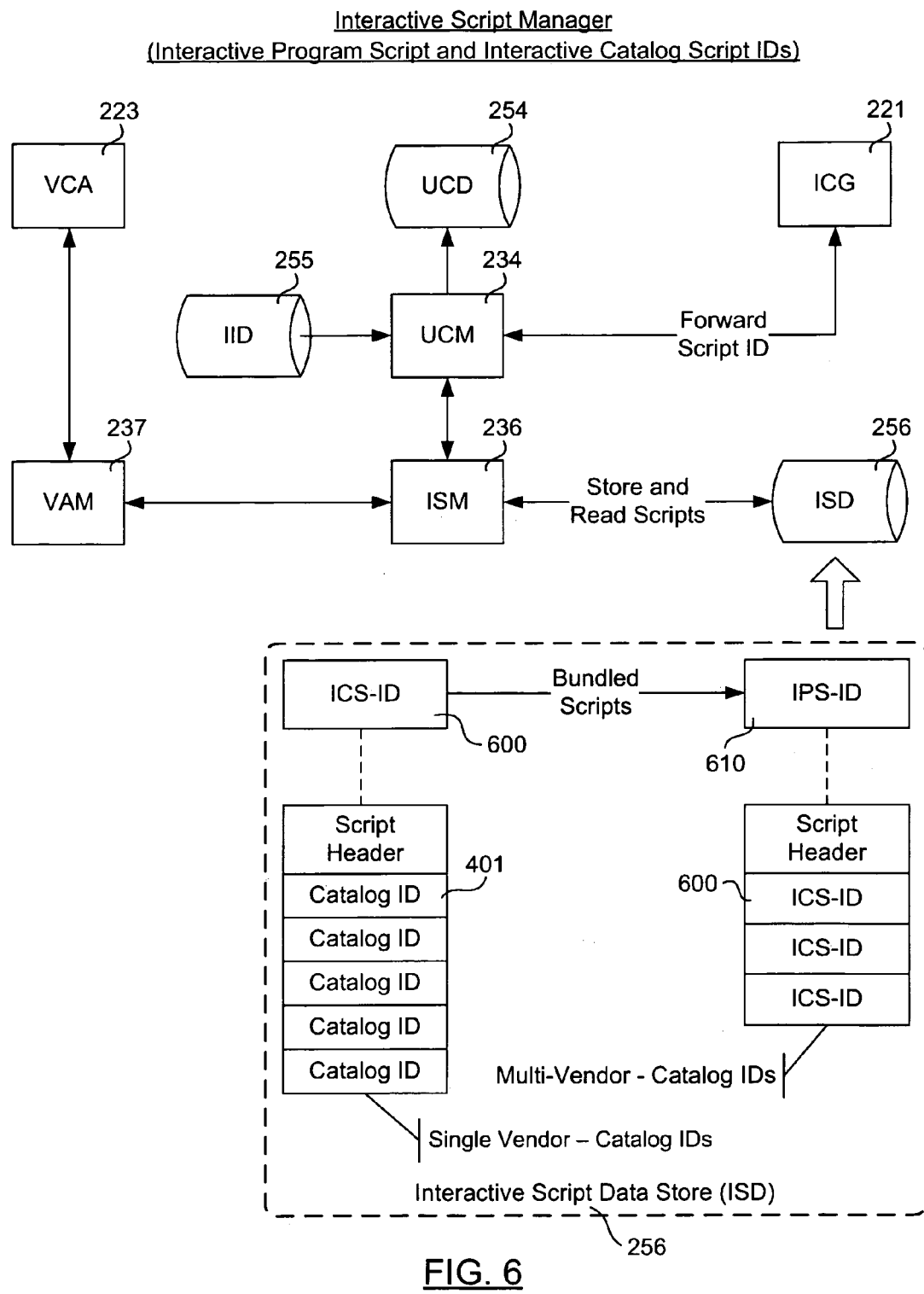
FIG. 6 is a schematic diagram detailing a portion of the present invention, according to an embodiment of the present invention.

The Interactive Script Manager (ISM) 236 as shown in FIG. 6 is the process that manages the setup, maintenance and processing of ICS-ID 600 and IPS-ID 610 scripts.

Interactive Script Data Store (ISD)

The Interactive Script Data Store (ISD) 256 stores all of the Vendor 112 scripts relating to the promotion of their instant catalogs. This includes bundling items together for promotion, presentation in mediums such as, but not limited to ITV and print publishing. These scripts can also be combined within in a master script, such as when a Broadcaster would bundle multiple vendor catalogs together for a program utilizing the Interactive Program Script 610.

Vendor Account Manager (VAM)

The Vendor Account Manager (VAM) 237 provides the logic that manages the setup and maintenance of the vendor account information in the VAD, interfacing to the Vendor 112 through the Vendor Catalog Administrator (VCA) 223.

Vendor Account Data Store (VAD)

The Vendor Account Data Store (VAD) 257 stores general vendor account data such as, but not limited to vendor registration information, account information, supply chain information, and commerce profiles for catalog items.

Personal Asset Manager (PAM)

Figure 13A:
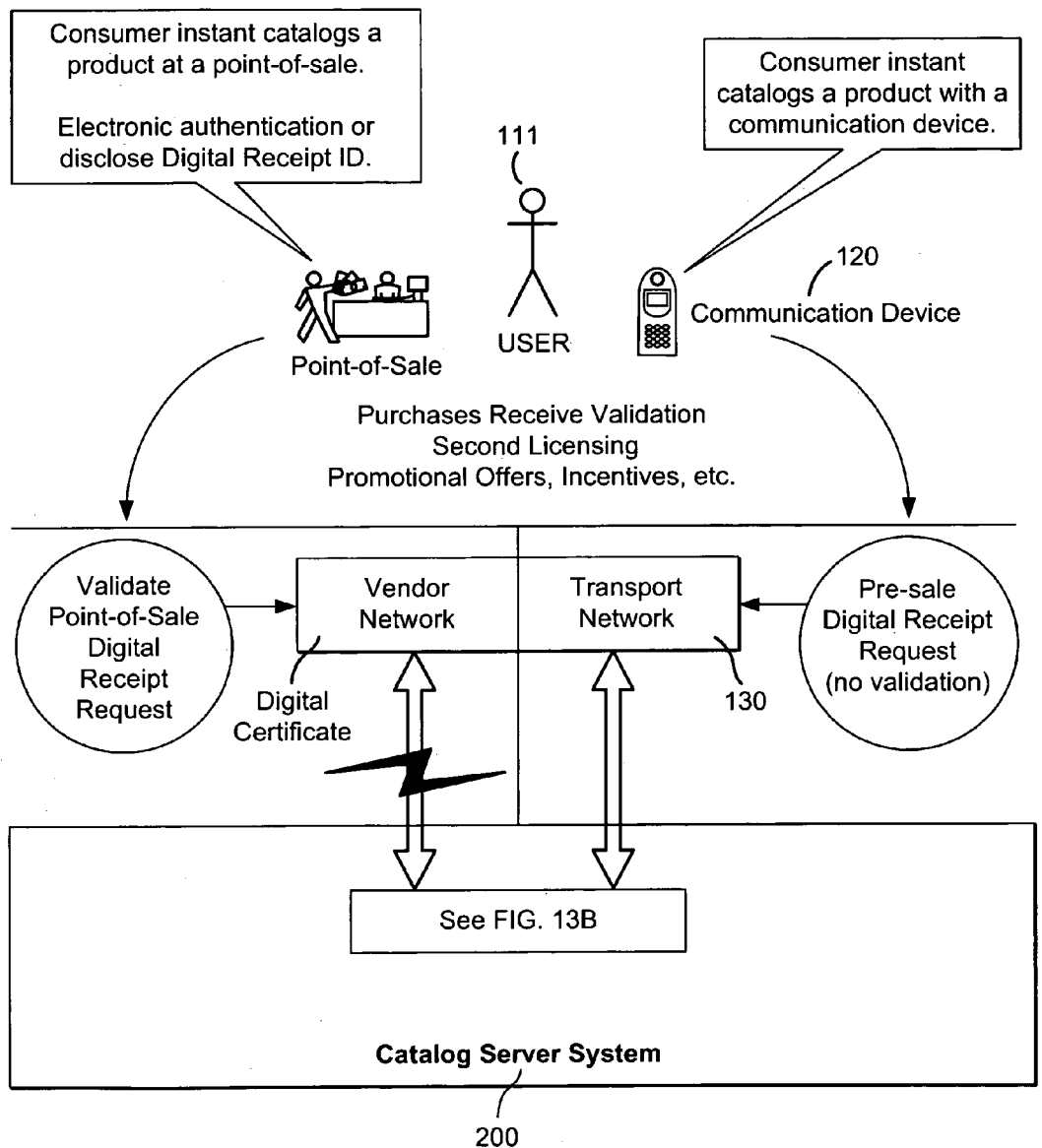
FIGS. 13a and 13b are schematic diagram detailing a portion of the present invention, according to an embodiment of the present invention.
Figure 13B:
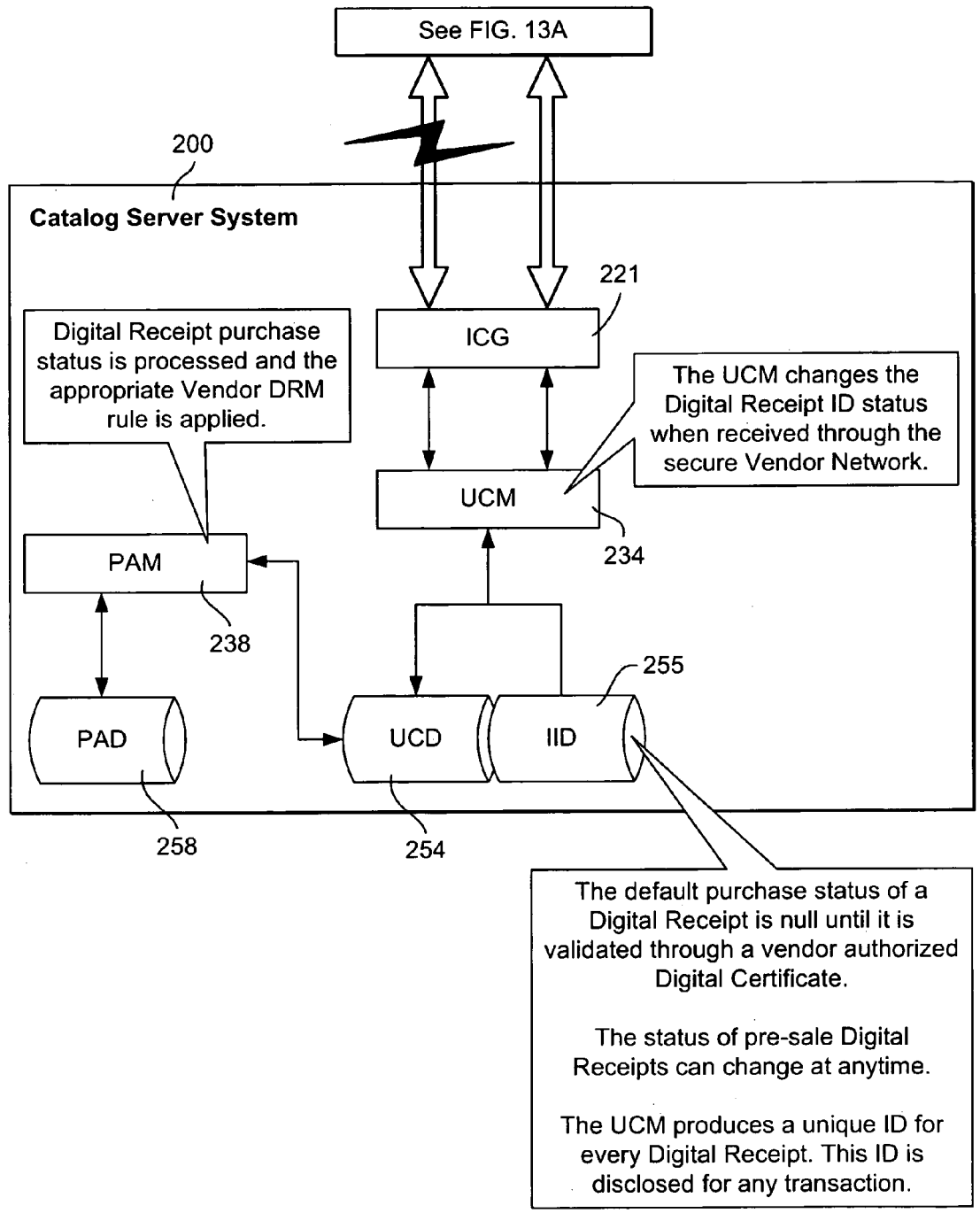

The Personal Asset Manager (PAM) 238 manages purchased catalog instances by way of Digital Receipts (DR) for Digital Rights Management (DRM) as shown in FIGS. 13a and 13b, asset management, reorder management, upsell, cross-sell, rain checks, comparison-shopping, promotional offerings, Web services, etc.

Personal Asset Data Store (PAD)

The Personal Asset Data Store (PAD) 258 stores Digital Receipt (DR) transactional parameters.

Web Service Manager (WSM)

The Web Service Manager (WSM) 239 can validate launch subscriptions and pay-per-use functions, interaction with third-party Web services such as, but not limited to data retrieval, exchange, usage and activity logs. The Web Service Manager also manages the anonymity of the users when they launch and setup Web service applications.

Web Service Data Store (WSD)

The Web Service Data Store (WSD) 259 stores data to support and facilitate IDCP-based Web services, such as User 111 validation and usage data in the case of third-party Web services, and all supporting data for internal IDCP Web services.

Intelligent Agents Manager (IAM)

The Intelligent Agents Manager (IAM) 240 provides the logic that manages the setup, activities, and maintenance tasks of one ore more Agents 241 in relation to the User 111 and Vendor 112 account information, across all servers, applications and data stores.

Agents

Intelligent Agents (IAs) 241 are broadly defined software entities that act on behalf of a User 111 or another program to achieve preset objectives. The CSS 200 can implement existing IA components, and adapt them for use in the IDCP Network 100. IA technologies can broadly include statistical operations, artificial intelligence (AI), machine learning, inference, neural networks, and information technologies. Agents can learn over time and improve in their performance as they adapt to the needs of a particular user and to the kinds of information they navigate. Existing IAs provided by third party Vendors, can be customized and incorporated into the present invention. The use of ready to implement IA components greatly minimizes the expenses and debugging problems that are typically encountered in the start-up of a complex computer based application. Off-the-shelf tools that could be used to implement agent-based analysis include, but are not limited to, Neugents™ and Autonomy™. These IA based applications can be modular in architecture and can be utilized independently or in aggregate to achieve a desired result.

The IAs of the IDCP Network 100 are conventionally utilized to filter and direct the available IDCP catalog data to formulate a personalized result in the form of rich interactive views, listings or aggregate reports. For instance, a User 111 could instruct the search agent ICA 222 to watch for category-specific, products, services or information on a particular topic, subject or item of interest to be automatically cataloged. Although some expert agents are currently available, they are too simplistic, not realistic, misapplied or ineffective without excessive user oversight and monitoring. The CSS 200 provides the type of architecture that normalizes the exploration and parsing of catalog profiles so that IAs can achieve their maximum effectiveness. It also provides a convenient arena for interoperability to take place between multi-vendor catalog groupings as directed by IAs of the CSS and third-party Web services.

IDCP Transaction Data Store (ITD)

An IDCP Transaction Data Store (ITD) 260 maintains history and transaction logs, in both individual instances and/or in aggregate form, for all activity in the IDCP Network 100. All of the process activity is recorded here for reporting purposes. Agents access the ITD to perform various functions such as data mining and knowledge management, to name a few. Agents can operate on behalf of Users 111 or Vendors 112.

IDCP Item Schema Data Store (IISD)

The IDCP Item Schema Data Store (IISD) 261 stores all of the Catalog Profile Templates (CPT) for vendor catalogs used within the IDCP Network. When a vendor exports catalog data to the IDCP Network 100, the appropriate CPT schema is selected from the IISD.

Enhanced Profile Data Store (EPD)

Complex profiles such as the entire structural and dimensional details of a building and all its component parts would be stored in the Enhanced Profile Data Store (EPD) 262. 241 and Web services applications (WSA) 224 are employed to intelligently analyze and process CPT's that are linked/associated to complex profiles to produce/fulfill and enhanced output.

IDCP-XML Parameters

A mechanism for the data translation or parameter formulation for the schema function of the CSS 200 of the present invention employs "XML" (Extensible Markup Language) in any of its dialects. XML is preferable over "HTML" (Hypertext Markup Language) because it is not a fixed format like HTML. XML is designed to enable the use of "SGML" (Standard Generalized Markup Language). SGML is a system for organizing and tagging elements of a document. SGML manages large documents that are subject to frequent revisions and need to be printed in different alternative formats over the World Wide Web. XML is not a single, predefined markup language, but a "meta-language" that can be utilized to describe other markup languages. Predefined markup languages, like HTML, define a way to describe information in a single specific format of documents. XML permits the definition of customized markup languages for different classes of informational arrays or templates as found in typical databases or documents.

The primary task of the IDCP-XML is to create and employ a common method for identifying and tagging the imported data from the Vendor 112, as required for XML-based processing by the CSS 200. The Vendor's database can be exported in its default schema, as a CSV (comma separated value) file format, for example, from a relational database. Under direction of the IDCP Import Manager (IIM) 235, the incoming data files are converted into XML according to the associated CPT for the product(s), and stored in the IDCP Item Data Store (IID) 255. This data set can be a minimal set that is "bare-bones," or an expandable "rich set" that includes extensive information on the elements or fields within. Unstructured data can also be imported, for automatic classification and attribute extraction using third-party information extraction technologies.

Anonymous Reporting

The Vendor 112 may view reports on aggregated activities of the User 111, as maintained in the IDCP Transaction Data Store (ITD) 260. Anyone in the supply chain, who has the requisite permission, may view the information simultaneously with the Vendor. This data is preferably processed in "real-time" to track the anonymous activities of aggregate grouping of Users through highly specific and dynamic queries using multidimensional analysis. The VAM 237 can anonymously report trends and compiled User profiles and information back to the Vendor via the VCA 223, or anyone else in the supply chain. In this way, groups of catalogs can be summarized and compiled for the convenience of the Vendor without creating invasion of privacy issues, due to the anonymous nature of the data reported and fed back to the Vendor and to others in the supply chain. There is no personally identifiable information to expose to the Vendor, because the User is an anonymous entity within the CSS 200, in one embodiment of the present invention.

Non-Anonymous Networks

The CSS 200 is completely anonymous. However, as an alternative, the IDCP Network 100 could be configured for private networks to accommodate operation in a non-anonymous mode. This would require the ICA 222 to contain details on the User 111, and both internal and external Web services would be able to recognize and interact with the User on that basis. An application that demonstrates this use of IDCP technology could be a corporation setting up a private network to maintain profiles on employees and their business interactions.

Multi-Tier XML Catalog Profile Template

The catalog data is stored in a multi-tier XML template, as depicted in FIG. 4b. The Vendor 112 exports their data into the CSS by way of the IIM 235, which imports the data set(s) into the Catalog Profile Template (CPT) 400, which may be an XML schema, designed for the Vendor's particular product type(s) and industry. The XML data is saved in the IID 255 data store.

The CPT 400 is multi-tiered because the supply chain often has more than one participant. Typically, the manufacturer will create the product template according to the product-marketing plan, which may include one or more distributors and retailers. In FIG. 4b, the example structure shows one retailer 410 and one distributor 420 in the chain, in addition to the manufacturer 430. Each supply chain member adds their particular information such as, but not limited to pricing, descriptions, attributes, product codes and lookup codes to name a few. Therefore, the CPT is a collaborative multi-tiered template that spans the supply chain, which is necessary for real-time activity reporting.

When a User 100 performs an instant catalog transaction, the Catalog ID 401 is verified in the IID 255, and the User specific profile is applied by the UCM 234 and stored in the UCD 254 as a pre-sale digital receipt. The information stored in the UCD relates to the User's personal and/or enhanced profile, which filters the full data set stored in the IID according to the User's needs.

Data Conversion to XML

Participating Vendors 112 can export their own data through a standard "comma separated value" CSV file format for scheduled delivery to the IDCP Item Data Store (IID) 255. The Vendor's data may likely be in a pre-XML or "legacy" format. XML or Extensible Markup Language is a universal programming language and appears to be a standard that is emerging as a unifying language. However, legacy applications and legacy data formats are those that have been inherited from languages, platforms, and techniques earlier than current technology. Most established enterprises that use computers have legacy applications and databases serving critical business needs. Currently, many companies are migrating their legacy applications to new programming languages and operating systems that follow open or standard programming interfaces, such as XML. Open standards should make it easier to update applications in the future, without having to rewrite the current application. In general, legacy applications must continue to run on the platforms for which they were developed.

One currently available product that can greatly speed up the data conversion process is WIZNET™, which can be utilized in the present invention to assist Vendors 112 through "open imaging technologies" (OIT). OIT enables the rapid and automated extraction of structured and unstructured content from multiple data sources and formats. These significant in-house data-acquisition resources enable WIZNET to image catalog pages and other paper-based documents into an open database rapidly and cost effectively with minimal manual intervention. With WIZNET, the Vendor's original content (i.e. books, articles, documents) can be converted from paper to digital format for export to the IID 255. The Vendor 112 must still maintain control over the original content, for example, utilizing a relational database before exporting to the IID. WIZNET could serve useful for moving the Vendor's data from an unabridged format to a "query able" digital document format for use with the present invention.

User Profiles

Several necessary parameters are required to complete a single Catalog Profile Template (CPT) 400 utilized in the IDCP Network 100 of the present invention. Each of these template profiles, exemplified in FIG. 4b, includes master catalog data and meta-data 402. Each CPT is stored in an IDCP Item Schema Data Store (IISD) 261, as shown in FIG. 2. Each CPT is designed to work with multiple profiles. The parameters are fulfilled by a variety of sources, including input from the User 111, which can include both "common" and "instance" profiles.

A "common" profile is what could be considered the "default" profile, meaning the profile that is set up by the User 111 and applied automatically to catalog data. An "instance" profile is an auxiliary profile that can be created by the User for various purposes. The User maintains their personal profiles through the Instant Catalog Assistant (ICA) 222. The master catalog data together with all other data stores are pooled to create a multi-tiered multi-profile instant catalog.

Identifier IDs

"Reference Identifiers" refer to identifier IDs, including any printed or digital code a User 111 might use to perform a cataloging action. For the present invention, these IDs could include, but are not limited to a Vendor Product/Inventory code, such as a UPC code, an ISBN, an ISSN, a Stock Keeping Unit (SKU), an Order No., a Search ID, a Vendor ID, a Publication Code (E.g. magazine, journal, newspaper, etc.), a telephone number, and Interactive Script IDs (IPS-ID or ICS-ID).

When used in a specific manner, such as a Publication Code combined with a Product Code, it represents a unique reference to an IDCP Catalog ID (C-ID) 401, which is then processed through the IDCP Network 100 to deliver the selected catalogs to the User's 111 account.

The Vendor's IDCP Item Data Store (IID) 255 includes a data set that is currently relatable to the Catalog ID (C-ID) 401 by way of the appropriate Identifier ID and or other Identifiers. By entering, reading or activating the Identifier ID, the User 111 is associating it with an IDCP Reference, which is the Catalog ID 401. An Identifier ID is associated to a product, service or information Catalog Profile Template (CPT) 400, as shown in FIG. 4b. The present invention does not require a Vendor 112 to create a new coding method to identify its products, services or information, or to actively employ the Interactive Digital Catalog Profiling (IDCP) Network 100 service.

IDCP Interactive Script Management

FIG. 6 illustrates how script management can be performed for the present invention. The Interactive Script Manager (ISM) 236 is an administrative tool used to create Interactive Catalog Scripts (ICS-ID) 600 and Interactive Program Scripts (IPS-ID) 610, which reside in the Interactive Script Data Store (ISD) 256. The ICS scripts are for creating groupings of Catalog IDs 401 that will be delivered to the User 111, enabling a Vendor 112 to bundle multiple catalogs with a single identifier ID.

Vendors 112 maintain the scripts through the VCA 223 interface, which creates an inter-process dialog between the VAM 237 and the ISM 236. The ISM stores the completed scripts in the ISD 256.

When the User 111 creates an instant catalog request through the ICG 221, the UCM 234 interacts with the ISM 236 to read the appropriate script from the ISD 256. The UCM then reads the catalog item(s) from the IID 255 and then stores an instance or copy as a pre-sale digital receipt in the UCD 254.

IDCP Interactive Scripts and Interactive Television (ITV)

Figure 7:
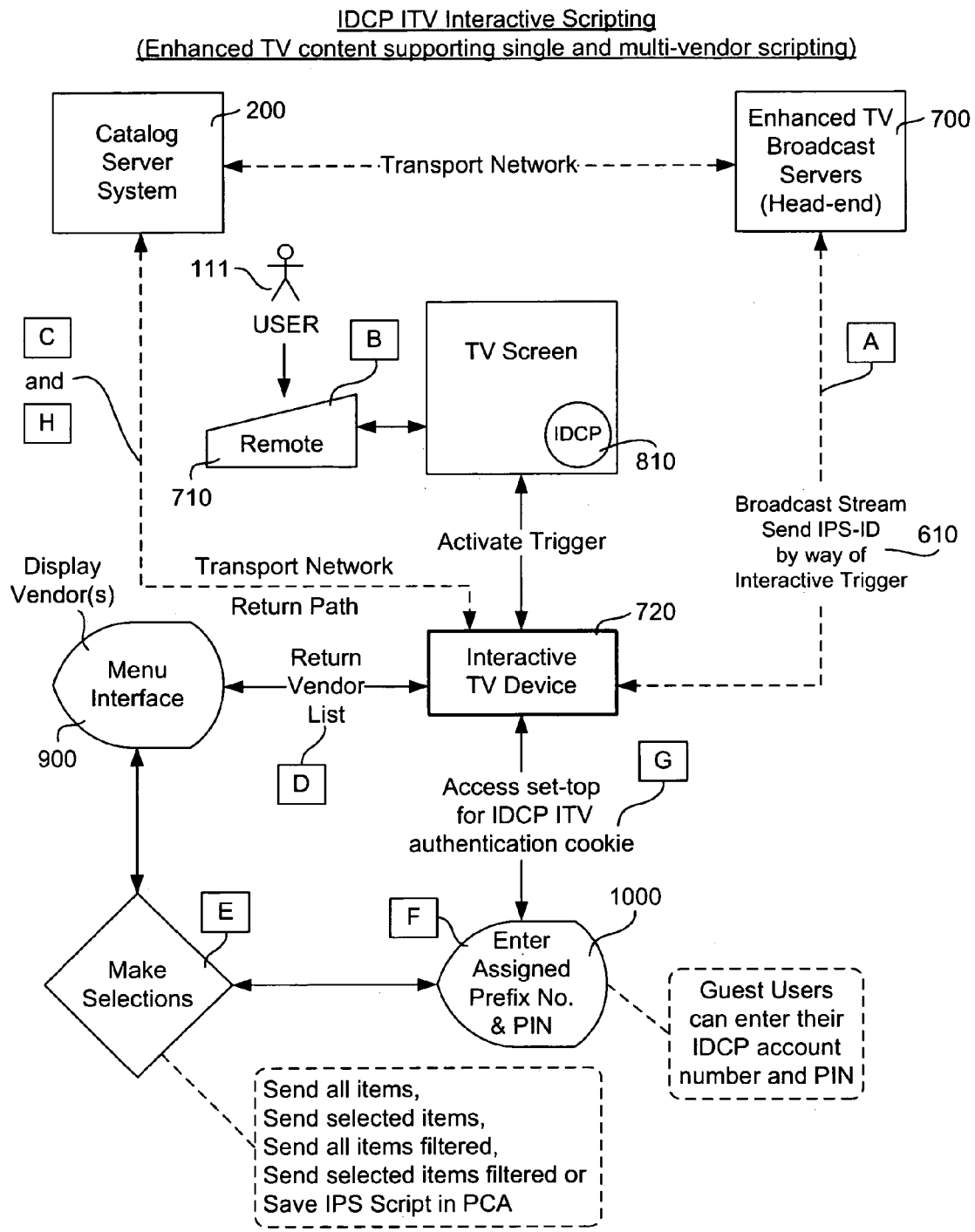
FIG. 7 is a schematic diagram detailing a portion of the present invention, according to an embodiment of the present invention.

The IPS-ID's 610 may be used for integration with ITV technology. A Broadcaster utilizes an IPS-ID within a given program slot that requires bundling one or more ICS-IDs 600 from one or more Vendors 112 for presentation to the User/Viewer 111 as shown in FIG. 7 at A. The availability of the catalogs is signaled to the viewer through a 'trigger' mechanism embedded in the broadcast signal, which displays an icon on the User's TV screen as shown 800. When they activate the IDCP trigger link/icon 810, as shown in FIG. 7 at B and FIG. 8, the ITV Communication Device 120 employed presents a vendor index for the viewer to select from as shown in FIGS. 9 and 10.

This above action is achieved through an Enhanced TV Broadcast Server 700, as shown in FIG. 7 from the head-end. Specialized enhanced TV tools and servers are required to complete this particular function. The enhanced TV content can then be transported to both computers and televisions using cable, MMDS, terrestrial, or satellite technologies. The Broadcast servers, located at the head-end, are used to assemble and encode enhanced TV content into the digital signal, and pass them to the set-top box using the HTTP protocol in an analog or digital broadcast stream.

When a Broadcaster "wraps" one or more IPS-IDs and/or ICS-IDs from subscribing Vendors 112 as shown in FIG. 6, they include information about the source of the broadcast so revenue tracking and auditing can occur. As depicted in FIG. 7 at B, when a trigger icon appears, the User 111 triggers the link, which queries the CSS 200 to resolve the scripts available in the IPS "wrapper". The CSS then returns the list of vendors to the User in a format such as, but not limited to HTML, which is displayed on the ITV screen. The User selects one or all vendor catalogs, such as through the use of check boxes as shown in FIG. 7 at E; selected vendor scripts are passed to ISD 256 and references the C-IDs 401, reads the catalogs from the IID 255 and writes the catalog references to the User's UCD 254. The Interactive Script Manager (ISM) 236 processes this portion.

The content of any broadcast stream may be easily enhanced by interactive triggers for employing with the present invention. A content source, such as an enhanced TV broadcast, can be tagged by the IDCP Interactive Script Manager (ISM) 236. The Vendor 112, advertiser, or content developer only needs to assign the ICS-ID 600 or alternatively the IPS-ID 610 to the appropriate medium. These mediums include broadcast slots for ITV, banner ads, Instant Catalog Service Index (ICSI), Web and e-Commerce sites, and also for auxiliary Web services.

Scripts and the Publishing Industry

IPS-ID 610 scripts for printed materials allow publishers of newspapers, books, magazines, and catalogs the opportunity to create an Instant Catalog Service Index (ICSI) listing for subscribers and offers greater integrated advertising opportunities of Vendors 112. Vendors create an ICSI for vendors that are advertising products, services and information, which appear in numerous publications. Using an instant catalog device, such as an Internet-connected PC or Interactive TV, the User 111 is able to catalog the item of interest by entering the Publication Code and corresponding Vendor ID(s) 411. Each ICSI Script will include a Publication Code, which is supplied by the publisher or issued by the CSS 200, employing an administrative function in the VCA 223. The Publication ID 413 functions much like an inventory code and are designated for a specific published volume and issue. The publisher's Publication Code conventionally includes the name, volume and issue of the periodical as a determining factor. The script also includes one or more Vendor IDs 411, which is a unique and permanent Vendor identification number, functioning similarly to the member account.

Other Scripting Venues

Alternatively, banner ads and Web sites with HTTP query strings or links can employ the ICS-ID 600 and IPS-ID 610. The User 111 could use an alternate access, like a "right-click" with the mouse, to choose an "instant catalog" command from the pop-up menu, which would be facilitated by a browser component or "client-side" program. Either method would then process the instant catalog transaction to the IDCP Network 100, which would analyze the Vendor Web site (domain name) and the product lookup identifier string to match to the vendor catalog information stored in the Catalog Server System. The URL provided query string and domain name are seen as a unique Identifier. (E.g. http://www.vendor.com/product/2961035/)

In the case of a User 111 visiting a retail store, a "Location ID" 412 would be required to distinguish where the item was cataloged. For example, if a large store chain wanted to make the IDCP Network 200 available at every location, they would need a unique Location ID 412 assigned to each store for tracking where individual items are being requested, to facilitate and generate revenue sharing and reporting with that particular Vendor 112. The same principle can be applied to any network, as long as the ICG 221 can uniquely track the source from where the catalog was captured, which could include the appropriate combination of any of the following Identifiers: Vendor ID 411, Location ID 412, Publication ID 413, Interactive Catalog Script ID 600, or Interactive Program Script ID 610.

About the ISM

The ISM 236 generates the appropriate ISD 256, regardless of the Communication Device 120 utilized by the User 111, and irrespective of what application that script is employed, such as in a banner ads, a Web sites, or ICSI. There are several existing tools for creating "enhanced" types of triggers, well known to skilled interactive content programmers. The broadcasters and network operators are simply supplied with an administrative tool to receive the scripts. They need only to create the programming index of all the programs that are to be enhanced. This can be done with a Web service application "Interactive TV" Manager, for example. With script management, the Vendor 112 has the ability and option to select which of the various scripts are to be included in any given broadcast by way of the IPS-ID 610. The IDCP Network 100 provides this service index of master scripts through the ISM 236.

Example Use of Multiple Vendors

An example of a multiple Vendor 112 scenario would be an interactive travel program. There could be several Catalog IDs 401, embodied as either ICS-ID 600, or IPS-ID 610 that are collected from each of the Vendor categories represented, such as hotels, airlines, tours, restaurants and ground transportation. Ultimately, a Travel Planner Web service application could collect all instant catalog references dealing with travel for generating an enhanced travel guide and itinerary. The User 111 can utilize any preferred communication device 120 to access the IDCP Network 100. Through ITV, an Internet browser or a WAP device, the User 111 can select a destination and, with the profile information already entered, make decisions potentially relating to every important aspect to the required travel itinerary, from class of fare to meals to smoking preference. This provides the User with a catalog of possibilities for any particular destination. The Interactive Script Manager (ISM) 236 includes the ability to bundle single Vendor, multi-catalog groupings using the Interactive Catalog Scripts (ICS) 600, and the Interactive Program Scripts (IPS) 610 are able to bundle multi-vendor, multi-catalog groupings by scripting one or more ICS-IDs.

Instant Catalog Service Index (ICSI)

As mentioned above, a useful application of the present invention is through an Instant Catalog Service Index (ICSI), which is patterned after the commonly used "Reader Service Number" that magazine publishers use to reference advertisements in their periodicals. The Reader Service Number Index is usually a tear-out card that the reader can use to circle the Reader Service Number associated with any advertisements in which they are interested in acquiring more information. The reader then mails the card to the publisher, which is usually provided, postage-paid. When the publisher receives the card, they pass on the request to the pertinent advertiser(s), who in turn respond to the request by forwarding product information to the reader, or by contacting the reader directly by telephone. However, more publishers are moving these types of reader services to a Web-based format to save money, expedite the process, and promote their presence online.

The present invention can vastly improve the Reader Service Number system by providing the "instant catalog" ID number, which would be provided along with the Publication Code, which references the publisher, publication title, and issue number of the magazine or newspaper. The User 111 can use any instant catalog device to collect the catalogs of any or all advertisers, and review them in their ICA 222 immediately.

The advertisers benefit by avoiding mailing costs, achieving instantaneous delivery of product information to interested readers, measuring actual advertisement response rates in "real-time," and perhaps most importantly, acquiring an ongoing channel to the potential customer through the unique relationship provided by the IDCP Network 100.

The publishers benefit by reduced mailing costs, reduced printing costs because the tear-out cards would no longer be required, and they could participate in a new industry revenue model that is facilitated by the IDCP Network 100, whereby sales arising out of instant catalog transactions, including all catalogs subsequently peer-shared, could result in a commission paid to the publisher.

Example—Magaseek.com

An example of existing technology relating to the interactive uses of magazine advertising is found with ITO-CHU™ Corporation's Magaseek.com plans to utilize PCs and i-Mode wireless Internet links. It allows any user the ability to locate stores selling merchandise shown in magazines and, in some cases, make online purchases. With Magaseek.com, the users can locate a shop or product even when they are traveling. Magaseek.com will also allow magazine readers to search for information on products by entering a magazine page or a price, as well as check if an item is in stock. Magaseek.com goes beyond offering information and purchases by including an interactive service. The readers can send Magaseek.com an e-mail regarding items that are sold out or not available for online sale. Once a sufficient volume of requests is received, Magaseek.com will contact the manufacturer. If merchandise then becomes available, Magaseek.com plans to notify the readers via i-Mode e-mail. With the Magaseek.com system, ITOCHU receives merchandise data prior to a magazine's release. Inventory is then stored under consignment at a distribution facility used exclusively for Magaseek.com so that orders can be filled quickly.

The IDCP Network 100 of the present invention goes further than what is being proposed by Magaseek.com. The User 111 uses a communication device 120, to enter the Publication Code (Name, Volume and Issue) and Vendor ID 411, irrespective of where or on what platform the User happens to be viewing the information. This allows the Vendor 112 and the consumer to remain in direct contact, not through an intermediary who has economic reasons for affecting the relationship.

IDCP Example—Advertiser Index

The Instant Catalog Service Index (ICSI), provided at the back of a periodical would list all the participating Vendors 112 by their unique Vendor ID 411. The Vendor ID would be listed next to the page number that displays the Vendor's products, services or information. The User 111 simply enters the Publication Code and as many Vendor IDs that represent the items in which they wish to instant catalog. All the Catalog IDs 401 associated with the ICSI for that Publication Code and appropriate Vendor ID are forwarded to the User's Instant Catalog Assistant (ICA) 222 for further processing, personalization and enhancement.

IDCP Anonymous Authentication

The User 111 is issued a unique IDCP account number and a User-definable PIN. This is all that is required to sign-on. The IDCP account number is also exchanged with peers to facilitate Peer Sharing.

Instant Catalog Assistant User Interface

Figure 11:
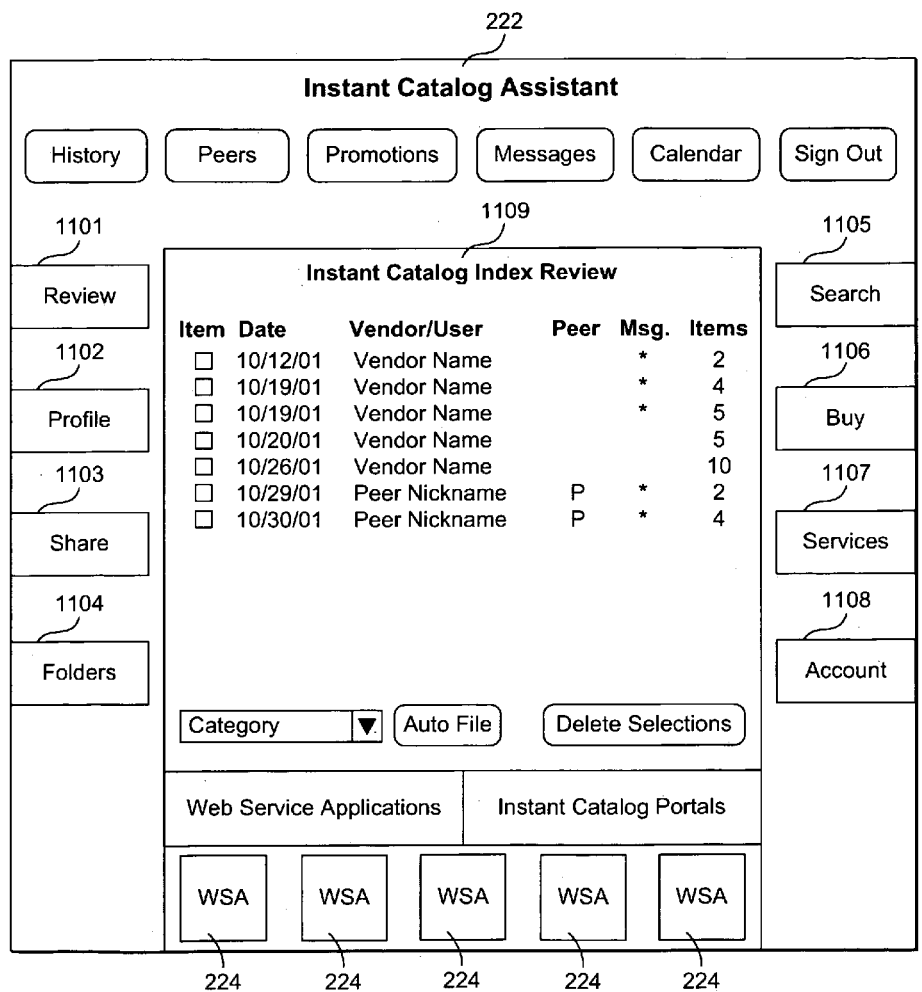
FIG. 11 is a schematic diagram detailing a portion of the present invention, according to an embodiment of the present invention.
Figure 12:
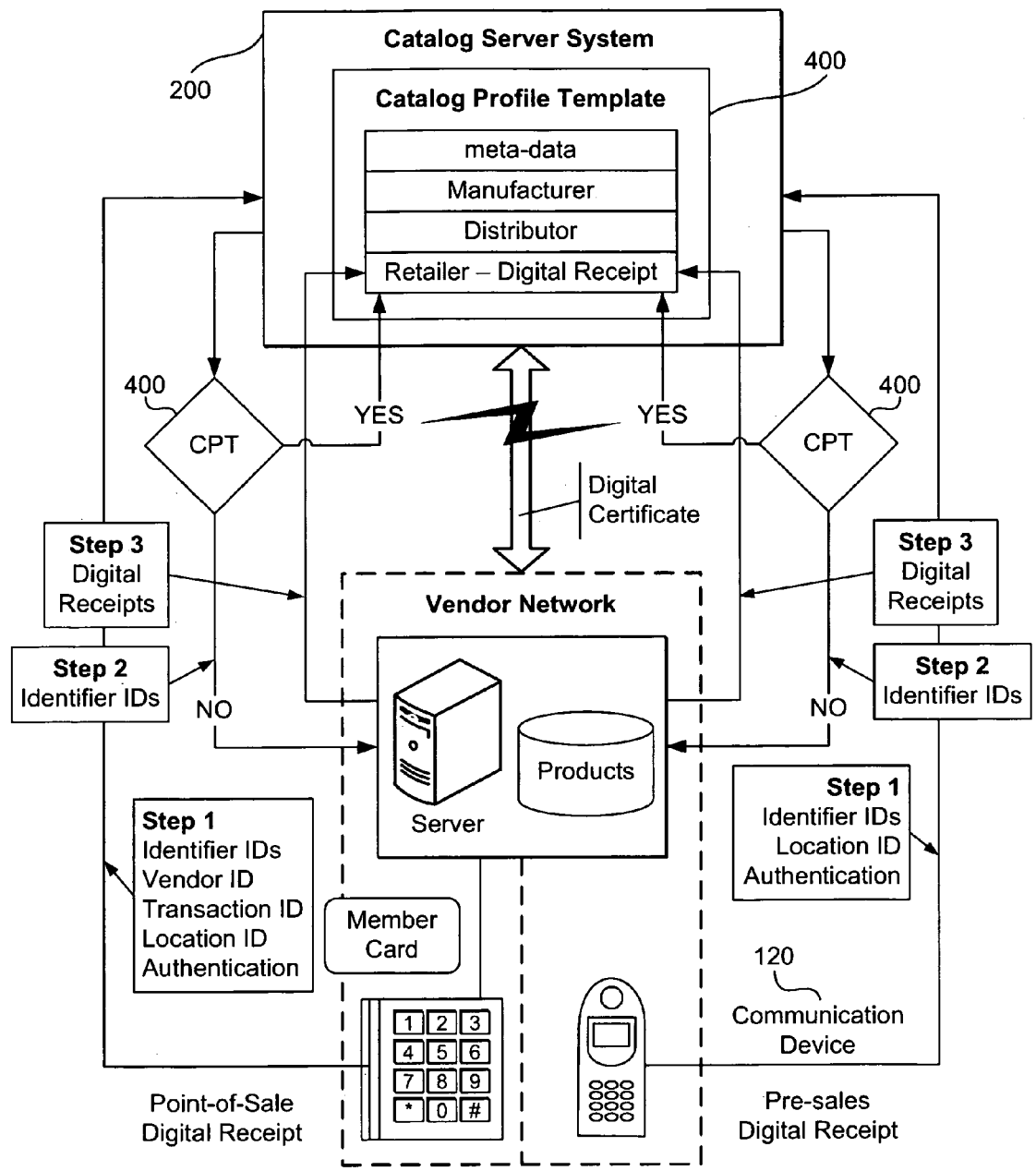
FIG. 12 is a schematic diagram detailing a portion of the present invention, according to an embodiment of the present invention.

The Instant Catalog Assistant (ICA) 222 is the default User 111 application for personalizing, enhancing, peer sharing, cataloging and storing self-selected instant catalog item(s) or groupings. A sample graphical user interface (GUI) layout of the ICA, highlighting the core functions is illustrated in FIG. 11. These screens are merely one example of how the ICA 222 application could be constructed; this discussion is not intended to limit the ICA application to these specific embodiments.

Graphical User Interface (GUI)

In FIG. 11, the Graphical User Interface (GUI) layout features one view of the ICA 222 is shown. The Instant Catalog Index Review 1109 as shown in FIG. 11, is the primary presentation area where information is displayed and where most of the interactivity between the ICA and the User 111 is conducted. If the content being displayed exceeds the dimensions of this pane, navigation buttons appear allowing the User 111 to navigate between tab views. When the User 111 clicks on each tab view, the functionality associated with that tab appears in the primary presentation pane to provide interactivity. A "Sign Out" tab is provided at all times for when the User decides to sign out of the system.

ICA Instant Catalog Index Review

As shown in the embodiment of FIG. 11, the initial view after successful sign-on is a display of instant catalog items, in a form similar to an e-mail inbox list, labeled in this example as the "Instant Catalog Index Review 1109", which is associated with the respective Vendor 112 that has been instantly cataloged by the User 111 or peer shared.

The "Items" column adjacent to the name of the Vendor 112 or peer User 111 designates the number of items processed for review. If there is an accompanying message from the vendor or peer associated with the catalog transaction, a peer indicator will be displayed under the "Msg." column as represented in FIG. 11. Instant catalog details (such as time, date, location, mode, etc.), and Peer/Vendor messages are also available in this view.

The User 111 can choose to automatically direct any or all of the displayed catalog items to a folder by selecting the desired items with the checkbox and choose the "Auto File" function in the Instant Catalog Index Review. Auto File creates and labels the folder based on the CPT 400 meta-data 402 header.

ICA Catalog Item View

To review the corresponding catalog items individually, the User 111 clicks on the line item of interest in the Vendor/User column using a remote control, mouse, or alternative navigational aid, to activate a hyperlink and display the ICA "Item" view. The User may, at any time, select any of the navigation tabs to access various functions in context to the item being actively viewed. The ICA "Item" view mode is an individual view of any item selected. The User can navigate through active catalog items associated to the Vendor 112. The User can return to the "Instant Catalog Index Review" by selecting the ICA "Review" view 1101 at any time as shown in FIG. 11.

The "Image" attribute provides a graphical representation of a catalog item, immediately adjacent to the vendor and product information in the presentation pane. The standard static online image formats are JPEG, PNG, and GIF. However, more dynamic and compelling visualization tools are quickly becoming the norm, exploiting the latest in 3D photo-realism, vector animation, and streaming audio and video technology, which could also be rendered in this pane. One conventional method for providing rich media content such as this achieved with plug-ins, which are third-party software products that extend static Web browsing capabilities. Some typical software applications of this type include Macromedia™ Flash, Adobe® SVG Viewer, BitFlash Reflexis™, Apple® QuickTime™, RealNetworks® RealPlayer™, and Windows® Media Player. A "helper" application provides similar capabilities but runs as an external application and typically launches another window for viewing. Server-side Java Applets such as Kaon™ Interactive's 3D photo-realism applet are Java programs that are downloaded from a server and run from the client-side browser, utilizing the Java "Virtual Machine" that is built into the browser to interpret program instructions. All of these technologies could be incorporated in the ICA "Item" view.

Additional features provided in the ICA GUI example include a "Promotions" link, which would appear if a Vendor is offering a promotion for the item; a "comparison shopping" link; a "Send List" link for adding multiple catalog items to the "Catalog Send List" that appears when the User 111 clicks on the ICA Send tab; a link button to visit the Vendor's Web site; a "Delete Item" button to delete the item; a "Print" button to initiate a print job for the item; and a "Details" button to allow the User to access more information on the item. A Rating Guide for Users is also provided to anonymously register their opinion about the item. The credibility of this Rating Guide tool can be enhanced when used amongst peers by leveraging their mutual relationships and experiences with the cataloged item(s).

ICA Catalog Item View—Details

When the User 111 clicks on the "Details" button in the ICA "Item" view, the ICA "Details" view presents detailed product information, specifications, warranty information, company background, and external links.

ICA Profile View

This view displays all the profile options available. This is where the User can personalize the catalog profile attributes to their requirements as needed.

In some cases, the User will also be able to create or access context-specific Enhanced Profiles (EP), to include, but are not limited to "structural" profiling, "golf skill" profiling and "Nutrition and Health" profiling, to name a few. These Enhanced Profiles work in conjunction with a CPT 400 to relate specific parameters of an individual User 111 to specific parameters of a Vendor product or service.

The ICA "Profile" view 1102 as shown in FIG. 11 also includes profiling functions with the "Apply Profile" drop down menu, a "New Profile" button, and a "Save Profile" button. The profile functions are used to create multiple instances that represent Users or their peers.

ICA Share View

The ICA "Share" view 1103 as shown in FIG. 11 is where the User 111 can forward their catalog(s) to friends, acquaintances, and associates. As an important component of the IDCP Network's anonymity feature, peer-sharing through forwarding requires mutual agreement; one User cannot send a catalog to another User without their approval, which is accomplished by an exchange of account numbers. If the originating User tries to send a catalog to a target User, and the target User has not yet approved the transfer by entering in the originator's account number to their ICA, the transfer will not occur. This is a "handshaking" feature that requires mutual consent for transactions to take place.

The "Share" view has four quadrants; the "Peer Share Accounts" frame, the "Message" frame, the "Catalog Send List" frame, and the "Item Description" frame. The "Peer Share Accounts" frame provides the list of all peers, with check boxes to allow the User to select one or more peers for sharing. The "Message" frame is for the User to create a brief message to accompany the catalog send operation. The "Catalog Send List" frame is where the User selects one or more catalogs for transmission to a peer; this list is populated by clicking on the "Send List" hyperlink. The "Item Description" frame provides a thumbnail description of the catalog item, a selector box to attach a profile with the item, and a selector check box to enable the PIN security feature for the transmission. This would require the User receiving the shared catalog to enter their PIN before viewing it.

There are maintenance buttons at the bottom of the ICA "Share" view; "Remove Catalog" will remove a selected catalog from the "Catalog Send List", and "Remove Item" will delete one or more individual items that are grouped under a catalog Vendor. The "Send" button will initiate the transmission.

ICA Folder View

The ICA "Folders" view 1104 as shown in FIG. 11 is where cataloged items are stored for future reference. Folders can be created using the "Auto File" feature described above in the Instant Catalog Index Review, and are titled automatically by, but not limited to Vendor 112, Category, Peer, or Date according to the User's discretion. Folders can also be created directly by the User with the "Create" button, or modified using the "Edit" button.

A default folder titled "Peers", included in every ICA "Folders" view, is where the User 111 may access all the catalog items, which are shared to them by other peers (friends, family, acquaintances, associates, etc.). By clicking on the hyperlink title "Peers," the folder contents are displayed, allowing the User to view additional sub-folders within each peer folder. Peer sharing is a key function available with peer folders, allowing the User to set view, copy, and modify permissions on each folder for the peer. This means that a User's peer can directly view, copy or modify catalogs in the User's folder according to the permissions assigned. For example, if one User were to peer share their entire "car" catalog, the recipient(s) would find the "car" folder in their peer folder under the appropriate nickname of the User sharing it. The nickname is determined by the recipient. This differs from the ICA "Share" view 1103, because the User can share cataloged items with another peer without manually sending the catalog(s). The peer can then obtain the catalog(s) at their discretion. When a User instantly catalogs an item, prior to storing it in a folder, the User will be prompted to check whether they would like the items they are storing to be made available for others to access at any time. The User could narrow the restriction to only allowing individual items within a peer-shared folder to be shared, if desired. The method of the present invention provides for the storing of catalog products, services and information, and significantly differs from conventional online storage services.

As discussed previously, the "Auto File," function creates and labels the folder based on the category type. For example, if the User 111 were cataloging a door, the system would parse the CPT 400 to determine the category type, as well as whether it is a "meta-data" layer or within a "data dictionary," and use that parameter as the label for the folder.

The result is, for example, that a selected item, such as the particular door, is instantly cataloged and stored in a folder called "doors." Within that folder, the name of the Vendor 112 can be itemized.

Meta-data is data that describes other data, such as data dictionaries and repositories. The "meta-tag" that describes the content of a Web page is called metadata. The term may also refer to any file or database that holds information about another database's structure, attributes, processing or changes. Data dictionary is a database about data and databases. It holds the name, type, range of values, source, and access authorization for each data element in the organization's files and databases. It also indicates which application programs use that data so that when a change in a data structure is contemplated, a list of affected programs can be generated. For the present invention, the data dictionary may be a stand-alone system or an integral part of the IDCP Network 100.

ICA Search View

There are various Web sites that maintain databases about the contents of other Web sites. Most sites are free to the User 111, and are paid for by advertising banners; others charge Users for accessing or utilizing the service. Yahoo!®™ was the first search site to gain worldwide attention, and it differs from most other search sites because its content is indexed by people who create a hierarchical directory by subject. As a result, Yahoo! and similar sites are technically called "directories" rather than search engines. Most other search sites are highly automated, sending spider programs out on the Web around the clock to collect the text of Web pages. Spiders follow all the links on a page and put all the text into one gigantic database, which is what one searches when they use the site. Sometimes, a Web site will offer both search engine and directory capabilities. There are also sites that do nothing but search other sites. These meta-search engines deliver results from multiple search engines at one time and they send search "bots," crawlers or search agents out into the World Wide Web to index sites or categorize using generalized terms and labels.

The ICA "Search" view 1105 as shown in FIG. 11 provides robust functionality, especially when compared to a conventional Web-based search. Within the CSS 200, the Vendor 112 databases are fully exposed to the search agent, enabling a search functionality that can address any combination of any type of field in the CPT 400 data framework. A Web-based search can only view HTML Web pages, because the databases that support e-Commerce sites are typically de-coupled from the Web pages by business logic application programs, and are therefore "invisible" to Web search agents. This is an important benefit of the IDCP Network 100, because in the controlled environment of the CSS 200, all of the databases are fully exposed to intelligent search agents.

ICA Buy View

The ICA "Buy" view 1106 as shown in FIG. 11 accommodates all potential ways for a User 111 to advance the purchasing process. For example, if the Vendor 112 site offers digital wallet services, the appropriate link will be available. If the Vendor does not offer this type of service, a direct link to the Vendor's e-Commerce site will be available, linking them directly to the product in question. Users can alternately create their own order lists "on the fly" that will contain commerce themes, such as, but not limited to, a Christmas list, birthday list, anniversary list, etc. Users may view order lists at any time to order the items collected, and they could contain multiple vendors integrated into each "shopping" list. Other methods of ordering could include a fax order form (in PDF or HTML form for printing), retail store locator, toll-free ordering, etc. This means that it is not even necessary for a Vendor to have a Web site; their commerce profile could indicate a toll free phone number, store location directory, or other contact point necessary to place the order. In addition to various ordering methods, promotional offers in the form of coupons, both digital and printable, can be offered.

Other information that could be included on the Commerce Profile is a "Retail Store" button to provide a list of local or remote store locations/directions; a "Coupon Offer" button could appear if the vendor has a coupon in effect for the product; a "Promotions" link if a promotion is in effect for the product; and a "Send List" link for the User to add the item to the Catalog Send List.

ICA Services View

The ICA "Services" view 1107 as shown in FIG. 11 lists the Web services applications available for enhancing contextual interaction with selective catalog profiles. Each Web service application shows a description and setup screen to modify usage and settings. The User 111 will be able to view the description to evaluate the features and functions of the Web service application before launching it. The setup process can provide a convenient way to pay for Web services applications on a pay per use basis, or by subscription, if required. Alternatively, Web services can be offered free of charge. Users can be given the ability to setup a "favorites" category of all the Web services applications they frequently use.

The present invention can benefit from Web service architecture to exchange information between the CSS 200 and third-party Web services and Web applications, but is not exclusively required to use it. Typical approaches to Web services and Web applications operate in either background or interactive modes for the User. The IDCP framework involves a more User-controlled interplay whereby Web services applications can be called to enhance catalog profiles from a menu list that appears in the ICA "Services" view 1107. The choices displayed to the User are within the context of the currently viewed catalog item, meaning that they are only relevant to that item.

ICA Account View

The ICA "Account" view 1108 as shown in FIG. 11 provides access to a variety of settings and options available to the User 111. Setting up and monitoring peer accounts, language options, viewing order history, editing such items as their account information, and viewing Web service fees, if applicable. The ICA "Account" view also accommodates additional profiles that assist the User in filtering or pre-screening catalog groupings before entering the ICA. The User can easily "opt-out" of aggregate demographic, geographic, and psychographic monitoring at any time. All account related information and settings are monitored and controlled by User. Digital receipts and coupons are also tracked, managed and archived within this section.

ICA Cataloging

The ICA 222 allows a User 111 to request an instant catalog transaction from within the ICA. It can also store enhanced TV IPS-ID 610 scripts captured from ITV devices using the "save" 910 function as seen in FIG. 9. Trigger links can be processed through the "Instant Catalog Index Review" as shown in FIG. 11 at the User's convenience.

IDCP Instant Catalog Devices and Clients

Interactive Set-Top/Digital Television

In order to create an instant catalog transaction, a User 111 needs to access the ICG 221 through any communication device 120, as depicted in FIG. 1. The interactive TV (ITV) platform is potentially the most significant channel to present cataloging opportunities to Users, since it can be accessed from any living room setting with an Internet-enabled set-top box or digital TV.

The IDCP Network 100 conforms to User platforms, such as: OpenTV™, PowerTV™, WebTV™, MediaHighway™, Liberate™, eNavigator™, PlanetWeb™, and RespondTV™. The IDCP Network also conforms to set-top platforms that enable the generation and capturing of viewer responses. Software for the ICG 221 would be available for set-top boxes and digital TVs with ATVEF-compliant software or any such middleware applications, which can be ported to significant platforms with other possible formats. The IDCP type of enhanced TV programming would be much more economical and efficient to produce than the conventional trend of enhanced TV programming. The ITV content developer of a broadcast network or program could simply employ a listing of any trigger script within the program, leaving the Catalog Server System 200 to facilitate an interactive session with the User 111, as described herein.

The User 111 of the IDCP Network 100 benefits from the present invention with the instant cataloging of products, services, and information all made immediately available while watching TV, shopping online, viewing a paper-based catalog, or shopping in a store. Entries and products in the User's personalized catalog can be enhanced through the Web Service Manager (WSM) 239 in FIG. 2. Different products can be reviewed, and competing Vendor's pricing can be compared. Although the Vendor would receive a report on the product query or cataloging thereof, the actual source of the product query remains anonymous, which is a great benefit to the privacy-sensitive User 111.

As shown in FIG. 7, the User's selection action activates a catalog trigger 810. Once an item is selected by a registered User 111, the selected IPS-ID or ICS-ID are forwarded from the User's set-top device (Interactive TV Device 720) by way of the "back channel," or "return path" as shown in FIG. 7 at C and H, of the television broadcast signal, and forwarded to the User's UCD 254. The Internet enabled set-top device stores a unique ITV authentication token as shown in FIG. 7 at G (created through the ICA 222).

Registration and Authentication

The ITV function of the present invention would permit one or more Users to create a joint authentication account for use with an interactive set-top device from within the ICA "Account" view. Setting up an account through the set-top device first requires that the User 111 fulfills a request for an IDCP account to obtain an ICA 222. Through a simple onscreen set-top form (with aid of set-top keyboard or remote), the User enters the unique ITV authentication token provided through their ICA "Account" view. Upon entering the token and submitting it, the set-top device saves the token to the set-top device itself.

The User 111 enters their ITV prefix number (a unique single digit prefix number assignment, which is 0 through 9) followed by their PIN. The ITV authentication token informs the CSS 200, for processing the unique IPS-ID as shown in FIG. 6. The PIN is required every time to prevent non-authorized use. The option to turn this level of protection off for a child account is at the discretion of the parent or legal guardian of the minor.

Online Instant Cataloging

Figure 8:
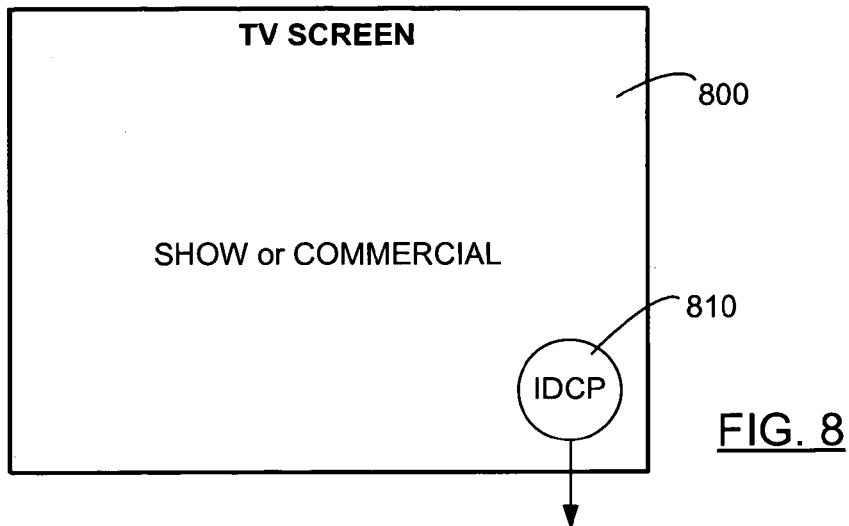
FIG. 8 is a schematic diagram detailing a portion of the present invention, according to an embodiment of the present invention.
Figure 9:
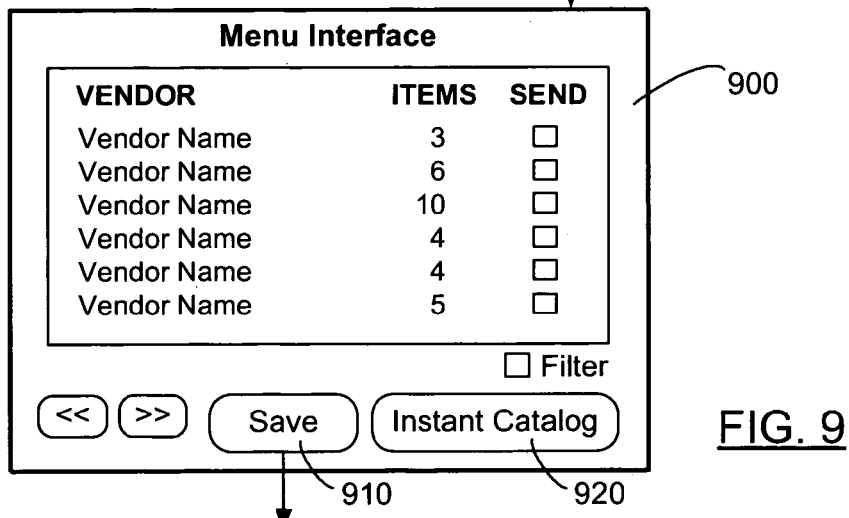
FIG. 9 is a schematic diagram detailing a portion of the present invention, according to an embodiment of the present invention.
Figure 10:
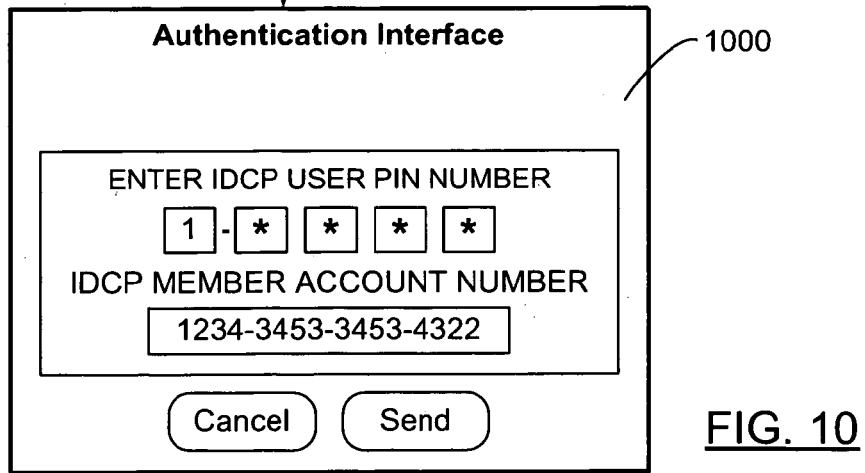
FIG. 10 is a schematic diagram detailing a portion of the present invention, according to an embodiment of the present invention.

With ITV, in the method of the invention as shown in FIGS. 7 through FIG. 10, the User 111 notices the display of the interactive trigger icon 810 on the TV's screen 800, signaling to the User that the services of the IDCP Network 100 are available. The icon may be any graphical symbol or alphanumeric character. FIG. 8 shows the icon 810 as "IDCP" in the bottom right corner. The User simply presses a key on the remote control to request a set-top menu interface 900 with the instant catalog listing of vendors as illustrated in FIG. 9.

The interactive trigger icon 810 is a customizable device that is inconspicuous and readily accepted by the average viewer. Presently, non-interactive icons often appear on television programs to tag the visual portion of the broadcast with a network logo or an advisory relating to the content of the show. The appearance of the interactive icon additionally informs the User 111 that the program has been encoded and enhanced for the IDCP Network 100 of the present invention.

When the User 100 clicks on the IDCP trigger icon, the TV broadcast can either remain playing in the background, with the instant catalog interface transparently overlaid, or the TV broadcast can be shrunk down to a miniature size and moved to a corner of the screen to facilitate the user interface. The list of available catalogs is displayed on the screen 900, with the number of items and a selector box for each. If there is more than a screen full of vendor catalogs, backward and forward navigation buttons are provided. The User then selects which catalogs they desire, and then they click on the "instant catalog" button 920 to enter the authentication screen where they enter the PIN number as shown in FIG. 7 at F. If they are not a regular user of the ITV device or a guest at someone's home, they can enter their IDCP member account number and PIN number 1000 (secure socket layer authentication). The viewer can also "save" the Vendor 910 catalog listing to process at a later time; this can be useful if the User wants to take more time or review it with a friend.

Filtering

As shown in FIG. 9, the User 111 can check the filter option and select "instant catalog" to process all the items through the User account filters. The User can also select only those items that interest them by first selecting the items of interest before initiating the filter option followed by instant catalog request. Filtering can include regional scripting. Regional scripting activates triggers that are uniquely specific to the User's region, which may be any appropriate designation such as country, state, city, county, or zip code. It could also profile only the categories of interest as defined by the User.

Personal Computers with Browsers

Whether using a 'toolbar' component or 'standalone' component, any desktop Web browser can implement the IDCP client services functionality. The component can scan/sniff a loaded Web page to determine if there are IDCP catalog-able items, meaning that the vendor supports the IDCP technology. The User can click on a button to activate this function. The user then can 'right-click' on any of the desired items, which are visually differentiated from other links, to display a menu with the appropriate options to process the request.

If the user is not using a Web browser, but is in, for example, an html formatted 'mail' achievable with most popular email clients, a right-click menu would display the necessary command to process the request.

Optionally, the toolbar could display the User's peer list to enable the User to send the selected catalogs directly to a peer or group of peers instead and or themselves. The peer list would load from the managed ICA 222 peer list. Peers would be identified by their respectively assigned 'nicknames' not their account numbers. The forwarders ICA account number will be called through an anonymous token stored within the Users PC. Prior to forwarding any selections, the User will be prompted to enter their PIN. If there are multiple users of the PC, the component toolbar will accommodate the setup and switching of multiple users from within the same toolbar. The Identifier IDs could be one or more SKUs, or a Vendor Script (running on the Vendor server), that could add one or more items to the catalog list. The right-click function could also be utilized with banner ads on Web pages, allowing the User to collect catalogs from Vendors creating Identifier IDs and incorporating them on the banner ad.

User Settings and Options

In the IDCP Network 100, the CSS 200 coordinates the graphical portion of the interaction between the Vendor 112 and the User 111. The IDCP client also permits one or more Users to set up an IDCP member account on a communication device 120.

Browser Example

Typically, the tools that conventional Web sites typically employ to provide online shopping are "shopping carts" and online order forms. None of these conventional tools offer the option of instantly cataloging specific items for personalized profiling, enhancement and sharing, as provided by the IDCP Network 100 of the present invention.

Most e-Commerce sites allow Users 111 to create personal accounts where selections may be stored, typified by a "wish list," or with a "my folder," as examples. Some of these sites also offer the option to e-mail a selection to a friend. Fewer sites will even go so far as to offer "group services" for specific categories or classes of the site's users. Additionally, these services conventionally require some form of membership. The majority of conventional e-Commerce sites only offer a "buy" link. These same sites usually do not require membership to "window shop," or browse through the site. However, once the site user decides to check out with their purchase, they are required to disclose personal and financial information. Even if the user decides to leave the site without buying anything, or applying for a membership, an identifying tag or "cookie" is saved to recall the user's most recent actions. These activity records are typically saved for tracking and personalizing the User's return session to the site. Although cookies offer convenience, increasing numbers of Users are becoming concerned about this method of tracking actions and the resultant potential for and actual misuses of private information that could result from the tracking of cookies.

The IDCP Network 100 of the present invention restricts the use of cookies. These types of cookies are essentially anonymous in that they do not send data back about a User, but are utilized to simply store the status of the User within the local system.

To use IDCP with any browser, the User 111 must first register and download the IDCP client-side software, which can be auto-installed through the browser of choice, or can be manually installed after download. The User begins browsing from one of the many Vendor 112 sites that are enabled for use in the IDCP Network 100. The User can consult a list of supported sites at any item from the IDCP client menu. The User may browse a Web site page that utilizes a descriptive URL query string in a category that IDCP supports, and a client application menu will pop-up an instant catalog menu. "One-Click" instant cataloging, as provided with the present invention, will forward and process the User's request by simply placing the selected item or items in the User's ICA 222.

Conventional e-Commerce sites utilize a unique product query string within the product URL. The URL of a broadly defined product can be readily "parsed" to generate or "map" a script that includes the Vendor ID 411, and identifier ID. The following is an example of such a product URL:

http://www.vendor.com/cgi-bin/dir/scripts/products/product.jsp?UPC=096898242134

The Vendor 112 maintains control of and monitors each catalog instance without requiring the User 111 to login, signup or disclose personal data. The User is not required to return to the Vendor's site to update their cataloged entries. Web site content such as products, services and information, are not restricted to the Vendor's site, as with conventional online catalogs. Users can leave any Web site with selections being forwarded and managed anonymously by their secured Instant Catalog Assistant (ICA) 222. The use of the ICA extends many value-added services, such as IA enhancing Web services, personalization, peer sharing and Web service applications. Some of the more obvious benefits include comparison-shopping, targeted discounts and promotional offers, cross-selling, up-selling, and cross-profiling. Also, the IDCP model simultaneously extends the effectiveness of these services with participants in the supply chain, therefore exploiting the usefulness of real-time information about the Users' preferences, selections, purchases or deletions.

Banner Advertisements

The present technology dictates that an Internet user is transported to the vendor's Web site whenever a particular banner ad is "clicked" by the user. This is undesirable for most users who do not wish to depart from their current Web page, which can be a great nuisance if the banner ads launch annoying pop-ups or redirects the user to a new site. Often these uncontrolled events make it very difficult for the user to return to the original site from where the banner was first clicked.

For the IDCP Network 100 of the present invention, the User 111 can instantly catalog one or more banner ads from a Web site without being redirected to the Web site of the Vendor 112 when employing an IDCP interactive script, such as an ICS-ID or an IPS-ID, into banner ad's URL. When the User right clicks on an IDCP enabled banner, the ICS-ID or IPS-ID URL is processed through the IDCP client HTML interactive script queue, a click menu option will be provided for the User to forward the URL encoded script representing Vendor Catalog IDs by the banner ad for to the CSS for further processing. The items queued may be reviewed before forwarding to the User's ICA 222. The User could selectively choose from the queued items the Vendor(s) and or names of the products or services being promoted, which the User wants to instant catalog to their ICA. This allows multiple banner advertisements on a single Web site to be instantly cataloged in a "store and forward" methodology. This feature can be part of the browser client download, and can be deactivated at any time by the User.

Smart Phones

For WAP or i-Mode devices, installation, also generally referred to as "Smart Phones", registration and access to the IDCP Network 100 are all easily accomplished through the conventional wireless ISP, for example, with WAP application employing the HDML standard and the i-Mode application employing the cHTML standard. The method of use for these devices can include either the input of inventory and tracking codes manually, or by a scanning module. Alternatively, the use of the WAP or i-Mode devices can include the input of proprietary IDCP Network codes also through either manual keying or scanning modules.

Alternatively, other navigation methodologies could be applied to achieve substantially the same results. i-Mode® developed by NTT DoCoMo® is a proprietary system that uses a subset of HTML, known as cHTML, in contrast to the global WAP standard which uses a variation of HTML, known as WML, which was derived from Phone.com's HDML and is a streamlined version of HTML for small screen displays.

Even though a manual keying-in of visible product codes can be easily achieved, barcode scanning accessories and attachments can also be added to assist PDAs and smart phones to achieve the same results. A currently proposed scanner that interfaces directly with a mobile phone is the AirClic® Inc. Mobile Phone Barcode reader (www.AirClic.com). AirClic Inc. is a Swedish company that provides a tiny scanner that snaps directly onto the phone and works instantly allowing the a user to scan bar codes and get voice response on millions of WAP pages through the AirClic site. It uses the host device or phone to send and receive information, but uses its own storage to hold the barcode. The AirClic Inc. client software integrates its reader with the standard Windows operating system. The software will open a Web browser with the correct information page connected to a product or service. The software can also be used without the reader by manually inputting the barcode number.

Card Readers

The User 111 could receive a member card that would allow the User to check-in and checkout a small handheld scanner as offered by Symbol Technologies® consumer scanners. These units have the ability to store all the items that are scanned for instant cataloging with the present invention. Upon returning the unit, the User will use their issued member card or smart card to authorize the forwarding of the data to their ICA 222 and to the point-of-sale clerk, if desired. If the merchant does not provide consumer-scanners, the point-of-sale clerk can forward the items to the User's ICA upon cashing out. The customer would authorize the instant catalog service with their member card or smart card and a PIN. All of this would remain anonymous. This would allow the User to better manage purchased assets (soft or hard), as well as facilitate faster checkouts, peer sharing or shopping by proxy. PDAs that do not support wireless connectivity may also use the store-and-forward method. Bluetooth® could also be implemented to transfer the data from the device to a retail base station. All of this could happen within a retail or open market environment. The IDCP Network 100 can also utilize membership cards and smart card technologies.

Point-of-Sale, Tradeshows, Expo—Scanning

Each User 111 of the IDCP Network 100 is issued an account number that is anonymous and can be stored or printed on a member card using a barcode or magnetic stripe, a smart card or an Internet appliance.

By utilizing magnetic stripe or barcode scanning with the IDCP Network 100, the User 111 can employ a method of cataloging with the present invention that can serve many industries. With a member card, the User's can employ their IDCP member account at a variety of locations. Some examples include card readers and scanners, client applications, kiosks, over the phone and at point-of-sale. For instance, the User could use a member card when they purchase goods to accumulate a history of purchases that could be utilized in an associated Web service for monthly budgeting, for the vendor to offer coupons, or for instant comparison-shopping for commonly purchased items that may be available from different vendors.

Tradeshow and Expo organizers are typically preoccupied with three key issues: registration, lead-generation based on who came and what was seen, and retention to get attendees to attend the show again. Conventionally, these areas are separately managed, since the information requirements can be very different. The IDCP Network 100 offers the optimal solution for integrating the registration, lead-generation, and instant cataloging so that a single apparatus (such as card reader) manages all the data collection, significantly improving the value and overall experience for both exhibitors and attendees, in real-time, as the expo is taking place. Attendees can catalog any exhibit for later review and personalization through a card reader connected to the IDCP Network 100. Exhibitors, and those involved in relevant portions of the supply chain, will be able to anonymously track the demographic, geographic, and psychographic information of every registered IDCP User attending with the present invention. An added benefit of establishing such a Vendor Channel is that targeted marketing and CRM is continually facilitated long after the event.

Portable Devices

For in-store instant cataloging, the User 111 can utilize a wireless, portable device, such as a personal digital assistant (PDA) or a handheld bar code scanner. The User can either scan an item's UPC or similar code, key in the identifying code into the portable device or allow the portable device to capture the needed information through a short or long-range LAN generated within the store, as typified by Bluetooth®. Once the item is entered, the method of the invention follows the previous examples, with items being cataloged instantly, and forwarded to the User's IDCP account through the ICG 221.

For Consumer Scanners and PDAs, the installation requirements are similar to those of the Smart Phone devices. Installation, registration and access procedures are intuitive, and follow conventional protocols, such as utilizing a Wireless ISP to download applications or relying upon pre-installed, resident software. Proprietary OS' and third-party platforms, such as Palm, Java, or Windows CE, may be compatible with any required client side application.

The method of use for these devices can include either the input inventory/tracking codes through manually, or by a scanning module that can easily be attached to popular PDA brands. Alternatively, the use of the consumer scanners and PDAs can include the input of proprietary IDCP Network codes also through either manual keying or scanning attachments.

Location IDs for retail outlets can also be acquired from consumer scanners and PDAs, enabling the User to locate outlets and locations of any member Vendor 112. The IDCP Network requires capturing and logging of the location or site from which the User is cataloging. The physical location and source medium or platform is a key feature for sales tracking and price monitoring required by the Vendor. It also provides a way to single out a given branch or store, which is part of a chain of stores. The Location ID can be stored in the IDCP User Account as a favorite so that it can easily be recalled.

Conventional Landline Telephone

The User 111 can also instant catalog using a conventional "Landline" Telephone, which could also include any wireless device intended to make voice calls to the public switched network. The service could be set up with a toll-free number so the User would not be discouraged from making an instant catalog transaction. The interface to the CSS 200 would occur through a commonly available Private Branch Exchange (PBX) commercial telephone system, programmed for voice response or touch-tone response, to enable the User to conduct instant catalog transactions from any conventional telephone.

Internet Kiosks

Stores or tradeshows could employ the use of Internet Kiosks, which are simply PCs with either touch-screen technology or conventional keyboard/mouse technology for User input. A Kiosk is intended to be a public device that is simple and intuitive to use, and offers connectivity to the Internet for specific tasks. The User 111, therefore, could access a Kiosk with or without a supporting card reader, at a retail or public place in order to conduct an instant catalog transaction.

As an example, in a tradeshow setting where a Vendor would provide a kiosk for Users to catalog their items, the User would be able to select from a directory "tree" of Vendor products/services, so they could pick any single or group of products for their catalog. As they select items, a separate window would provide a list of selected items in "real-time." When the User is finished, they would click on a 'send' button to acquire the catalog items.

Peer Sharing

An additional and important advantage of the IDCP Network 100 of the present invention is the efficient use of cataloged information and the sharing of this information. This sharing is referred to herein as "peer sharing." Peer sharing, as defined for the present invention, allows one person to pass specific cataloged data to another person in real-time, with or without a personalized profile. One way to understand this sharing is to liken it to instant messaging. Instant messaging, simply put, is a software tool that allows the User 100 to see which friends or colleagues are "online," or currently on the Internet. The User can send a message that immediately pops up on the addressee's screen, and two or more Users can have an interactive discussion.

The purpose of peer sharing is to allow those associate Users that are trusted for advice, approval, or who share a common interest or task, to communicate conveniently and effortlessly in real-time, so as to influence or steer the other to make a better choice or decision. A brief message can be sent with any shared catalog item. Peers can use their IDCP account number, name or nickname to selectively identify themselves when forwarding information to other peers. Upon receiving a shared catalog item, the recipient User may be prompted to immediately rate the item with a "peer approval rating." This would provide immediate feedback to the sending User, and add a new twist to "window shopping."

An improvement on the conventional instant messaging tool can be employed with the present invention to facilitate real-time instant cataloging. When the User sees or buys a product that the User feels that one or more peer Users would like to review or buy, the first User forwards to the second peer User one or more catalog items via the ICA "Sharing" view. The same can be achieved through any of the device applications, for example set-top box, smart phone, PDA, or PC, as already discussed. Again, the targeted recipient User may choose to catalog the item or simply offer an opinion using an ICA "rating" to give the item an approval rating. This interaction could all take place in real-time, just as with instant messaging. It is not always necessary for one peer to manually forward a catalog item. If mutually agreed on, two or more peer sharing partners can authorize unfettered access to one or more catalog categories on a continuous basis. This would enable any User to search another User's selections without the need to manually intervene or assist. This aspect of the present invention could also be used to facilitate "shopping by proxy." The second User could access the first User's catalogs while either is shopping in real-time. This would allow catalog groupings to move freely from one account or device to another. Of course, enabling these features would require a mutual agreement between Users to share personalized catalog selections.

Instant Catalog Exchange

For the present invention, this form of peer sharing service allows Users 111 to anonymously share catalog items or groupings in an open exchange (public or business), based on a particular theme, similar to a chat room. This "Open Catalog Exchange" could be characterized by anonymous "peers," who pursue similar interests. These peers are Users that request through the IDCP Network 100 to share the catalog data amongst themselves, thus expanding their search potential exponentially, and possibly reducing their individual costs of purchasing when combining their purchasing power as a group, similar to a traditional "Co-op." The Users could define the parameters to which this information is accepted. This service is especially useful when looking for items to catalog that center around a similar theme or subject matter, such as niches, hobbies, activities or hard to find imports. Similarly, an alternative version of this IDCP Open Catalog Exchange, can focus on "B2B" within business settings using business related rules.

Proxy Shopping

Proxy shopping is a common practice that allows people to buy items at the request or for the benefit of spouses, children, and friends. For example, by accessing the personalized catalog instance from a peer, proxy shopping would provide the User 111 with the exact brand or size of an item to buy as profiled by the sender. The User would never have to guess or mistakenly choose the wrong item. This type of service would almost exclusively be used among family members and very close friends. However, the need to share a personal catalog instance with a business colleague may arise. In this case, the single catalog item being shared can be accompanied by the sender's personalized instance, in a "one-off" approach.

Basic User Profiles

A central feature of the IDCP Network 100 is personalization to the User 111, as provided by a User Catalog Data Store (UCD) 254, which produces an active "common" profile, as opposed to an "instance" profile. The UCD is personalized by the User via the ICA 222, and accessed much like a conventional e-mail client inbox with a hierarchical format branching out from broad categories of products or information containing specific, narrowly defined sub-classes.

The IAs can be utilized for both common and instance profiling. Common profiling is defined as a set of global preferences for a particular User 111, such as favorite color or shoe size. Instance profiling is limited to a single catalog selection or momentary preference, such as a smaller shoe size to account for bare feet, or perhaps a profile of another person for whom the User is shopping for.

Enhanced Profiles and the Enhance Profile Data Store

Specific Web services can create "enhanced" profiles in the Enhanced Profile Data Store (EPD) 262, when requested. This feature is especially useful when the item being cataloged involves complex profiles.

An illustrative example is a "Golf Caddie" Web service for use in the IDCP Network 100. This particular Web service would process and produce a hole-by-hole course management commentary of ways to play the ball based on the skill profile of the User 111. Besides offering the expected information to the instant catalog Assistant (ICA) 222, pertaining to normal content, such as tee times, course characteristics, membership fees and contact, the cataloging of a golf course for more intelligent interaction would require additional details. For this Golf Caddie example, the ICA provides the option of profiling the User's player skill set. The ICA would ask the average distance the player can hit the ball with a specific club, stroke tendency (such as hook, slice, straight, left or right handed), and short game characteristics (such as putting, chipping, short wedge, and player handicap). This profile would then be saved as an Enhanced Profile (EP) in the Enhanced Profile Data Store (EPD) 262. The next time the User catalogs a golf course, the ICA will apply the same parameters. If the User tweaks the profile settings for that course, a new instance of the enhanced profile will be dynamically created and stored. The User's profile would be analyzed by the course profile, with such information as yardage, par, tee locations, design, slope, and rating for entire the course or a particular hole. The course profile would be profiled and stored as a CPT 400, and managed in the IID 255.

In another example of an Enhanced Profile (EP), the present invention has the similar ability to catalog various fashions and lifestyle accessories, based on a User's 111 own "body profile" as stored in the EPD 262. The EP would enable size matching for clothing and accessories, color preferences, etc., allowing the User to locate nearby stores with suitable choices. The a Web service "fashion assistant" could, for example, coordinate the User's clothes for the new school year by parsing all catalog groupings and even peers' selections to provide a rich information view, listing or report of all the items found, their cost, store location, and any other pertinent information desired.

Preference Filtering

Preference Filtering allows the User to create personal parameters that will automatically "filter" catalogs when they are viewed by the ICA. For instance, a User could have their geographic location as a filter element that would preclude any items that are not available in their area. Another example could include a Web Service that would shop and compare items according to the User's profile, filtering out items that would not be of use or interest to the User. The valuable data with respect to what was not used is just as important as what was used. The preference factor would be able to provide information back to a Vendor possible reasons why their item was not selected.

Interactive Television

Interactive services provide extensions to the cable system to provide a new class of services. There are almost an infinite number of possible interactive services. Some examples are home shopping, home banking, e-mail, Web access, electronic games and stock tickers.

Interactive services use local processing in the set-top combined with data communications services provided by the cable network to deliver new services via the television receiver. Moreover, interactive services can be integrated with broadcast television to provide enhanced television services, such as interactive advertising. With this promise, why are interactive services not already widely deployed on cable systems?

Although cable operators have experimented with interactive services in trials and limited deployments for many years, cable operators have yet to deploy, in volume, an application platform that supports interactive services.

Interactive services have yet to prove their capability of generating real revenues in large-scale deployment. There is no single "killer application," so a suite of interactive services is required. Television viewing is fundamentally a passive mode of interaction for most television viewers.

Nevertheless, this situation is ripe for change with the introduction of digital services. A digital cable system already has many of the necessary resources to support interactive services, and the emergence and acceptance of the Internet are educating customers to expect more from their television sets.

"Enhanced Television" is a term used for any service that takes an existing streaming media service and enhances it with a related interactive service. Enhanced TV applications are deployed on ATVEF™, ATVF™, DASE™, DVB™/ MHP™ and OpenCable™ standards. Some popular set-top integrators and software providers include: AOLTV™, WebTV™, OpenTV™, PowerTV™, RespondTV™, Wink Communications™, ACTV™, Liberate™, MetaTV™, Metabyte™, and NDS™. If network operators have been searching for ease-of-use applications regarding ITV solutions, IDCP enhanced TV services will undoubtedly fill the void with respect to instant cataloging.

The TV set-top box has conventional features that include the decoding of an incoming digital signal, verification of access rights and security levels, display of cinema-quality pictures to the Users 111, outputs of digital surround sound, and processing and rendering of Internet and interactive TV services. Set-tops in an "advanced services" category functionally resemble a multimedia desktop PC. Such set-top boxes can contain more than ten times the processing power of a low-level broadcast TV set-top box, and are sure to gain popularity as such devices are reduced in size and price while gaining in computing power. Enhanced capabilities in conjunction with the high-speed back channel can be used to access a range of Internet and interactive services at very high speeds. Most of the set-tops in this category allow a subscriber to add a hard drive, if wanted. Such boxes can include high-speed interface ports, which will allow them to be used as telecommunication centers in the homes of the future. Future set-top technologies such as these, will also offer wireless gateways to the Internet. They will communicate with other devices and Web appliances through short-range networks or LANs, possibly by employing currently offered technologies, such as Bluetooth™.

The Enhanced TV Broadcast Servers 700 broadcast to the set-top device 720. As shown in FIG. 7, in the broadcasting of an enhanced TV program, broadcast servers stream the encoded interactive trigger icon 810 for the set-top box to display on the User's television screen 800. The TV set-top box is connected to the CSS via a set-top return path that is provided by the ISP, utilizing the dial-up or broadband connection. In addition to receiving input from a remote control 710, the set-top box can receive input from any standard input device, such as a mouse or keyboard.

ITV Technology Background

The development of advanced interactivity conventionally involves the addition of special instructions called "triggers" into a broadcast stream. The broadcast stream is a programming feed, which is typically generated by the Enhanced TV Broadcast Servers or station for viewing by the general public or by Users 111. The programming often contains commercials. However, consumer goods and items of interest often pass without giving the viewer the opportunity to study that item to the desired level of detail. Without the ability to note items of interest for further review, many potential sales opportunities are lost. In visual broadcasting media, both the User and the Vendor 112 of the commercial goods can benefit from providing the User with the ability to interactively select consumer-oriented products, services and information groupings presented on any particular program, all with the instant cataloging method provided by the present invention.

Advanced Television Enhancement Forum (ATVEF) is a standard for creating enhanced, interactive television content and delivering that content to a range of television, set-top, and PC-based receivers. ATVEF defines the standards used to create enhanced content that can be delivered over a variety of media, including analog (NTSC) and digital (ATSC) television broadcasts, and a variety of networks including terrestrial broadcast, cable, and satellite. "Triggers" are used to choreograph the sequence of events within a TV channel. The ATVEF specification has defined a trigger as a real-time event that is comprised of a URL, a name, an expiration date, and script attributes.

When the interactive icon appears on the TV screen of the User 111 that User knows that the program being viewed is optimized for interactivity. The User presses a button on their remote control to enter the Vendor display. Another button is selected for the User to enter their ITV prefix and ICA account PIN before forwarding the interactive catalog script identifier (ICS-ID) to that User's ICA account after being processed by the ICG 221.

The standard trigger for the present invention is an onscreen Web link, such as that denoted by an interactive icon. This graphical icon triggers a link that points to the CSS 200 through the ICG 221. The browser, running within the ITV set-top device, is connected to the ICG through the Transport Network 130 as shown in FIG. 1. This connection to the ISP could be either through a conventional dial-up Internet connection or a broadband return path. As shown in FIG. 7, which diagrams a method of the present invention, the trigger, when activated by the User 111, sends an Interactive Program Script ID (IPS-ID) via the return path to the CSS 200.

The ICS-ID represents one or more catalog identifiers (Catalog IDs), which are listed within the script of the trigger. The IDCP processes the ICS-ID and sends a menu back to the User's Set-Top device. The menu is can be a short listing of items represented by the User selected ICS-IDs. Individual catalog items are not displayed, but rather the particular Vendors to whom they belong are displayed 900 on the User's view screen as shown in FIG. 7 at D.

Besides defining how ATVEF-defined content is displayed and how the "receiver," or User's set-top device, is notified of new content, the ATVEF specification also defines how content is delivered. Because a particular television or set-top device may or may not have an Internet connection, the ATVEF specification describes two distinct models for delivering content. These two content delivery models are commonly referred to as "transports," and the two transports defined by ATVEF are referred to as transport "Type A" and "Type B."

Transport Type A refers to ATVEF receivers that maintain a connection to the Internet. This connection, as used in the present invention, is referred to as the return path. Generally, this network type of connection is provided by a dial-up modem, but may also be provided by any type of bi-directional access channel. The method of Type A delivers only triggers, without additional content. Because there is no content delivered with transport Type A, all data must be obtained over the back channel using the URL(s) passed with the trigger as a pointer to the content.

Transport Type B provides for the delivery of both ATVEF triggers and the associated content via a broadcast network. In this model, the broadcaster pushes content to the receiver, or User Device, which will store it in the event that the User 111 chooses to view it. Transport Type B uses announcements sent over the network to associate triggers with content streams. An announcement describes a content stream, and may include information regarding bandwidth, storage requirements, and language. Since a Type B receiving device will most often need to store any content that will be displayed, it employs announcement information to make content storage decisions. For instance, if a stream requires more storage space than a particular receiver has free, the receiver may elect to discard some older content, or it may elect not to store the announced stream. A drawback of the Type B model is that if a User chooses to start watching a show near its end, there may not be time for the content to be streamed to the receiver, and the User will not be able to view some or any of the content.

The two types of ATVEF data are triggers and content. If the receiving User' set-top device has a back channel to the Internet, Transport Type A will broadcast the trigger only and content will be pulled over the Internet. If the receiving device doesn't have an Internet connection, Transport Type B allows both the triggers and content to be delivered over the broadcast channel.

An alternative enhanced television standard to ATVEF, known as "Broadcast HTML," could be utilized in the present invention. Broadcast HTML was created from ATSC-related work to develop the DTV Application Software Environment (DASE). Broadcast HTML is a combination of an XML-based subset of HTML 4.0, along with a Java Virtual Machine and Sun's Personal Java API.

Participants

The present invention offers substantial benefits to conventional interactive television (ITV), both to the subscribers, developers, broadcasters or operators, and especially to the advertisers employing the ITV medium. As an example, Microsoft® TV Server is the server component of the Microsoft TV Platform Adaptation Kit (TVPAK). Its suite of software components instantly gives network service providers the tools to provision, manage, and operate a large-scale, commercial-grade interactive TV service. It has been optimized to work with digital set-top boxes that use the Microsoft TV client software. Microsoft is just one of several companies creating interactive TV technologies.

Subscribers

Subscribers to IDCP-enabled enhanced TV services benefit by being able to instantly catalog at their convenience while watching television. The instant catalog process is quick and efficient, minimizing the blocking effect of the dialog windows that appear over the broadcast show, enabling them to make rapid choices and send them to their ICA for later review, enhancement and dissemination.

Broadcasters and Network Operators

Currently, network operators and broadcasters are seizing the market potential of enhanced TV. They are using this new methodology to create compelling content that complements the underlying video and background audio. This reinforces branding and develops a competitive advantage. Enhanced TV also helps to differentiate programming offerings from other broadcasts, thereby retaining and engaging viewers. Broadcasters can also implement a new revenue model with advertisers, because the IDCP Network provides an audit trail of catalog activity that can be directly associated with a specific broadcast at a specific time in a specific geographic location. This enables a commission to be paid for all sales derived from customers who catalog from the broadcast, plus any sales arising from peer-shared copies of the catalog activity from the broadcast.

Advertisers

Advertisers will be able to target their potential customers more accurately and directly, because the relationship is closer to a one-to-one connection rather than a one-to-many broadcast. This one-to-one relationship is more dynamic and interactive, thus advertisers are able to track instant cataloging activity (although it is completely anonymous) as the broadcast occurs, and then monitor response rates with full accuracy rather than through statistical inference based on past surveys. Based on previous interests, advertisers will be able to target recommendations to certain specific customers, without violating their privacy. Advertisers will also be able to structure a new role with broadcasters through a commission-based revenue model. This can occur by virtue of the fact that anonymous customers who instant catalog from a broadcast, and then subsequently purchase an item from that catalog, can be tracked and a commission paid to the broadcaster by the advertiser. This is beneficial to the advertiser because expenditures can be more tightly coupled to actual sales responses to an advertisement, rather than a "gamble" that a certain proportion of a target audience will eventually respond to the advertisement and purchase the item(s).

Product Placement

Product placement, also known as "embedded" advertising, takes place when a product or brand gains exposure apparently incidentally. This can occur, for example, in a film or a photograph, or even in an advertisement for a different product. The IDCP Network is primarily an instant cataloging system. It does not rely on product placement. The items or services cataloged by the User 111 do not have to be embedded in the program for the IDCP system to function. However, the present invention can facilitate product placement, and it offers a far more flexible model that will provide a wide variety of Vendors 112 with the opportunity to present their catalog data in a complementary manner.

Any User 111 watching a program or commercial who is a registered User of the IDCP Network 100 can instantly catalog one or more products or services represented in the broadcast, or complementing the program's topic or theme through the User's set-top device. The Vendor's 112 product does not necessarily have to be an item represented in the program. For example, the User can be viewing a show or commercial about windows and instantly catalog curtain products by selecting window shades because associated or related products can be incorporated in the scripting.

The functionality of the Interactive Catalog Script IDs (ICS-ID) 600 and the Interactive Program Script IDs (IPS-ID) 610 facilitates this activity. As discussed above, if there is only one Vendor, preferably the ICS-ID is implemented, and if there are multiple Vendors participating, the IPS-ID is implemented. Television broadcasters, advertisers, and sponsors (Vendors) can all participate. It is critical for the CSS 200 to identify the participants in the process to ensure that each party may receive compensation. Creating scripts is quick and efficient using the Interactive Script Manager (ISM) 236 process via the VCA 223. After selecting the catalog groupings to include products, services and information from the CSS 200, these groupings are stored in the Interactive Scripts Database (ISD) 256 and sent to the User's set-top device by way of a broadcast stream in the form of an interactive trigger accommodating the Interactive Script ID. Even if there is one Vendor, the IPS-ID is used by the broadcaster to assemble the entire list of Vendor scripts for a specific interactive program in one broadcaster authored Interactive Program Script (IPS-ID).

The present invention provides the Vendor 112, and the affected members of the supply chain with the truly unprecedented ability to simultaneously aggregate a vast array of User 111 cataloging and purchase behavior through a variety of mediums and devices, without violating the privacy/anonymity and security of the User. Furthermore, the IDCP customizable back-end empowers Vendors to pursue their target market with precise, directed campaigns.

Enhanced Programming Guides

In an alternative embodiment of the present invention, an Enhanced Programming Guide (EPG) can also provide instant cataloging services. If the User 111 wishes to instantly catalog a television program's content one week in advance, the User can accomplish this through the EPG. In other words, an alternative method of the present invention can employ the EPG for activating the CSS 200 when watching TV. The IDCP member account number would be entered manually and stored in memory using the EPG setup screen, this is similar to storing a security PIN for EPG control. Using the EPG method would allow the User to instantly catalog Vendor scripts saved in the ISD 256 for the particular program, prior to viewing the program. Advanced EPGs will undoubtedly require a return path or back channel to facilitate two-way interaction.

Market Example—RespondTV

RespondTV™ and Catalina Marketing Corporation are partnering to provide a targeted interactive TV advertising and paperless "couponing" system. This system will integrate Respond TV's transaction processing capabilities with the Catalina Marketing Network specifically in the consumer packaged goods (CPG) industry.

With RespondTV™ viewers are able to interact with TV commercials and receive coupons for participating offers. Coupons are stored for virtual retrieval as needed when payments are processed by merchants, facilitating these transactions with loyalty cards in which viewers request coupons with their TV remote control and the coupons are automatically stored in the consumer's loyalty card account. For example, the consumer could go to a grocery store checkout line, have the loyalty card scanned, and be credited for the coupon amount.

IDCP Example—Member Couponing

The IDCP Network 100 approach to couponing would not restrict the User 111 or viewers from accessing coupons from ITV alone. The present method would permit multiple Vendors 112 to reward or distribute coupons through instant cataloging of products, services and information, at anytime and from anywhere. The next time they go shopping, the IDCP member account will alert the point-of-sale clerk to credit the of the User's account for the coupon amount. If the User stores the catalog item, the User will be eligible to receive coupons directly via the Vendor Channel. The incentive is to keep the item cataloged so the User never misses a coupon offer. This allows the Vendor to cultivate an ongoing relationship with a customer, for as long as the customer retains that Vendor's catalog, by offering coupons or relating other products over time. In addition, Vendors can selectively distribute coupons on a localized aggregate basis. For example, all those who have cataloged the item for more than one month will receive discounts or incentives, such as 10% off their next purchase. instant catalog coupons are also another way to redeem the value at the point-of-sale.

IDCP and Third-Party Web Service Application Vendors

Interactive Web service applications can be hosted within the CSS 200, or hosted externally. The external Web service applications would take the form of "third-party" services whereby a Vendor or ISV would incorporate the facilities of the CSS within the context of their Web service application.

Figure 3:
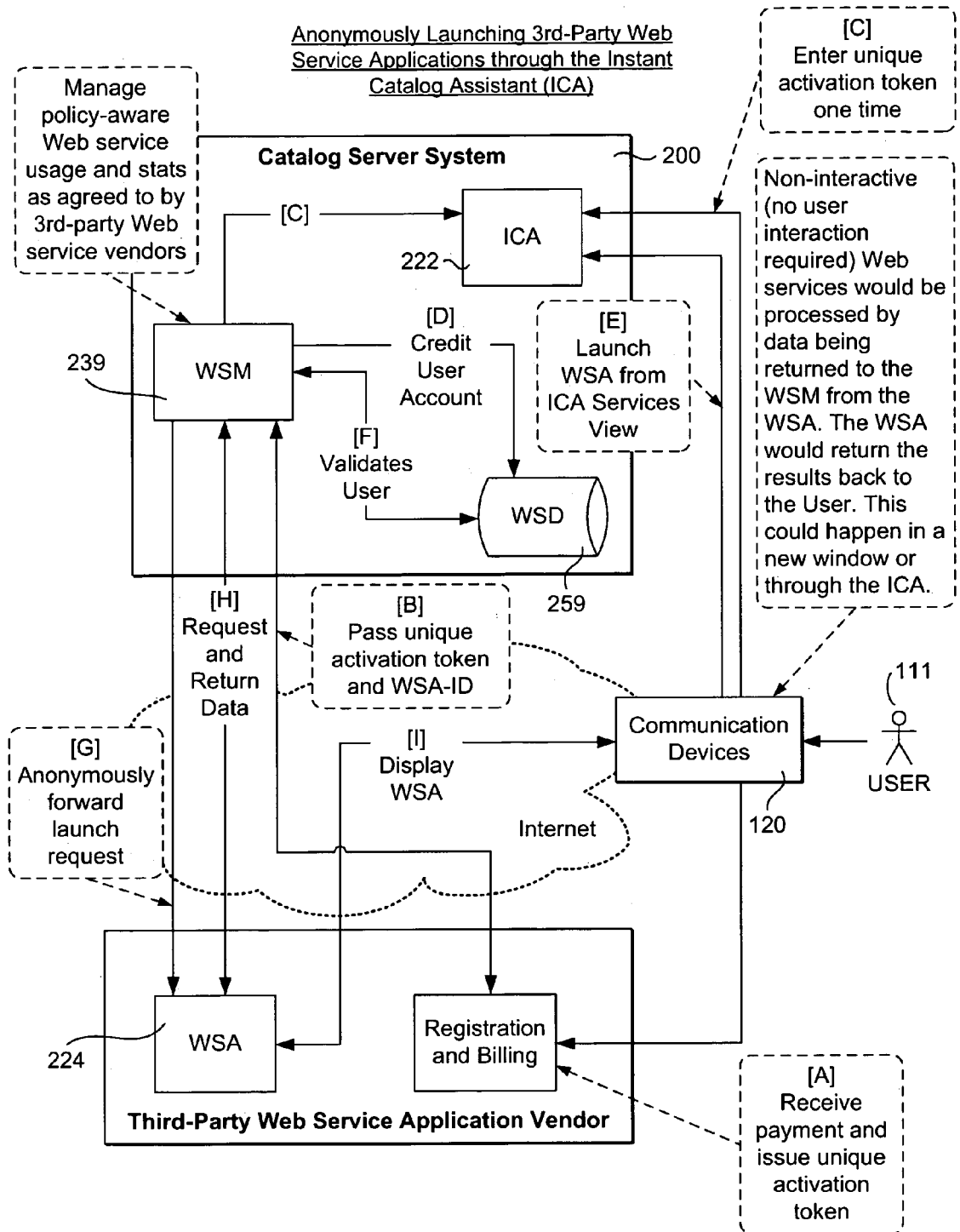
FIG. 3 is a schematic diagram detailing a portion of the present invention, according to an embodiment of the present invention.

In order to preserve the anonymity of the Users while allowing them to subscribe to a third-party Web Service Application (WSA) 224, a sequence of events will have to be observed. Third-party WSA receives payment and issues a unique activation token to the User 111 as shown in FIG. 3 at [A]. The WSA passes the activation token and Web service application ID (WSA-ID) to the WSM 239 as shown in FIG. 3 at [B]. Users enter the activation token once to activate the WSA 224 as shown in FIG. 3 at [C]. The WSM credits the User's account by way of the WSD 259 as shown in FIG. 3 at [D]. The user launches the third-party Web service application as shown in FIG. 3 at [E] from the ICA "Services" view. The WSM validates the User's request to launch the WSA as shown in FIG. 3 at [F]. The WSM anonymously forwards the launch request to WSA 224 as shown in FIG. 3 at [G]. WSA and the WSM request and return data as needed as shown in FIG. 3 at [H]. The User has access to the WSA over the Internet as shown in FIG. 3 at [I].

The IDCP Network 100 can be implemented on industry standard platforms such as Windows®, Linux, Unix, etc., which also includes complete interoperability. Therefore, Web services that are constructed to the IDCP schema specifications and activated within the IDCP Network are fully interoperable with other Web service applications designed to take advantage of the CPT 400 logic of the ICA 222. Interoperability between Web services can create, for the first time, true collaborative relationships between all Vendors and customers. In this way, a fully participating marketplace can arise that is much more than a sum of its component parts.

The present invention can complement and extend the value and usefulness of Customer Relationship Management (CRM) across multiple Vendor catalogs. For example, Dell® Computer could anonymously search through the IDCP Network 100 members' ICA 222, for software and hardware catalogs prior to suggesting a product. Dell would parse the appropriate CPTs (software, printers, monitors, MP3 players, digital cameras, scanners, etc.) analyzing the catalog specifications that will assist Dell in presenting the most appropriate computer solution that will complement and support the items selectively cataloged by the anonymous User. This would all take place through Web service specifically programmed to enforce Dell's business rules.

The IDCP Network 100 can play a role in creating an entirely new layer of customer service that is currently non-existent. Because IDCP is XML-based and all data is created and maintained in a standard format, Web services can be constructed by product Vendors to analyze a customer's current configuration (of a computer for example, although this could apply to any type of product, even a person's house) as defined in the User's ICA 222. It would query their personal needs, desires and objectives, and make specific purchase recommendations that takes into account their software requirements and future role of the product(s). This approach can enrich the entire sales cycle from the customer's perspective, giving the Vendor a competitive advantage over others without a Web service that can take advantage of the IDCP environment.

Through the use of Enhanced Profiles (EP), a customer could apply a cataloged item, such as a quantity of paint, to a specific room in their home, described by the "structural profile" of their house. A Web service could be constructed to enable the vendor to view the usage of their product in the customer setting without having to know whom or exactly where that customer is located.

Enriching the purchase experience for the customer has intangible benefits as well, particularly in developing trust and brand loyalty. Studies show that a Web site's ability to provide a personalized service, such as remembering a User's name and preferences, encourages repeat business. If a Vendor 112 can go beyond simply remembering a customer's name and address, adding an active level of collaboration that incorporates as its basic premise customer satisfaction, a business's key objectives can be realized: This can help Vendors' to persuade non-customers to become customers, persuade existing customers to remain customers, and to make all customers better customers. The IDCP Network 200 can entirely support this notion, while maintaining User anonymity at all times, because it provides a personalized, constructive service to the User, without using the personal data of the User.

Any of the Web service applications may be accessed and launched from the ICA "Services" view. The ICA "Services" view exposes the products and services as profiled by the User. The ICA stores and manages instant catalog data. This data can be analyzed and enhanced by Intelligent Agents (IA), Web Services and Web Service Applications.

These personalized results, provided to the User 111 by the IDCP Network 100, are powerful tools. A "build-to-order" Web Service Application for "Structural" profiling illustrates well one use for the ICA 222. The BTO model is detailed in co-pending U.S. patent application Ser. No. 09/632,383, filed on Aug. 3, 2000. In the rich and variable reporting format of the present invention, results can come in all shapes and sizes. Each Web service application can be programmed to provide its own unique result to the User. IAs and Web service applications are employed to intelligently process catalog content linked to complex profiles such as an entire structure and all its component parts as provided by the Enhanced Profile Data Store (EPD) 262. Users are able to address instantly each component part of a structure by applying various catalog choices.

The "Structural" profiling Web services for "build-to-order" and "remodel-to-order" are two such scenarios. Choices or selections made by the User 111 can also be seen simultaneously by the Vendor 112 and the other related participants in the supply chain. Other Web services can function as add-on modules that interlink to create one seamless "project assistant." The modules of the interlinked "project assistant" could include Home Plans; Furnishings and Décor; Real Estate; Service Matching; Financial Services; and a Home Manager. Each Web service would focus on a particular aspect of the build-to-order or remodel-to-order process.

Other potential Web service application uses that would be ideal for use with the IDCP Network 100 include: a Grocery Planner, a Travel Planner, a Music Cataloger; to name a few.

Photography Web Service Application Example

For an example of how a Photography Web service could quickly display a series of questions to compile a consumer report or guide of all the catalog groupings that revolve around buying, servicing, or educating the consumer. For this photography example, the ICA 222 could ask: "What type of photography interests you?" The User 111 might be given three choices to choose from: macro, standard or wide angle. Macro photography is taking close-up pictures of small things. Standard photography captures subjects of medium size. Wide Angle photography is ideal for capturing large objects or scenes. Based on the type of photography specified, each subcategory would provide the appropriate selections form self-selected catalog groupings, peer shared catalog groupings, or Vendor catalog groupings in that order of priority. The User would make selections from the lists presented. Additional information such as where to purchase the items, additional online resources such as a "how-to" Web sites, product comparisons, and consumer reviews that augment the catalog selections can all be aggregated and delivered in a single report that is easily customized by the User. A final report would provide a complete summary of all the User's selections, preferably in a "tree" or hierarchical metadata category structure.

Music Industry Web Service Example

Through peer sharing and instant cataloging, the IDCP Network 100 essentially functions as a digital storage library of catalog groupings collected by the User 111. A further example of how catalog storage can work is with the growing popularity of "MP3" format and song swapping. The User can instantly catalog a music CD with a User communication device 120 and listen to the music with the aid of a Web service, such as a "Music Jukebox Cataloger." The Music Jukebox Cataloger Web service is specifically configured to stream the music file to a PC, Internet appliance, such as an Internet Radio/Receiver, high-speed wireless smart phone or an Internet-enabled public jukebox. Broadband streaming would be provided by each of such Vendors directly, to ensure the best-effort quality of service. Alternatively, the User can share an instantly cataloged music CD or song with a peer, as in peer sharing. This type of Web service application would require a monthly membership fee, to access the catalog-able music library anytime, anywhere. The User would have the option of purchasing one or all the songs of any CD cataloged via "micro payments."

Micro payments can be provided by a Web payment service from Trivnet®, Inc., Saratoga, Calif., (www.trivnet.com). Trivnet specializes in premium digital content that is billed to an Internet service provider (ISP), telephone company or credit card accounts. Trivnet uses patented technology that recognizes a User online, so there is nothing to download and no password to remember. If the merchant uses the credit card facility, the credit card information has to be entered one time. Trivnet supports micro payments and charges the account at the end of the month.

Upon payment, the Web service would unlock the selected songs, typically in .MP3 format, for downloading. The IDCP method of the present invention provides personal radio listening through any Internet enabled streaming device at a nominal membership fee and a legal outlet for individual songs to be selectively purchased and downloaded directly from the Vendor rather than an unauthorized distributor. This is not a true distributive peer-to-peer sharing network, such as provided by Napster®. The IDCP Music Jukebox Cataloger Web service can offer Internet streaming or selective purchasing of songs from a CD, such as through EMusic.com. With the present invention, the User 111 can access any CD or song, which is also instantly cataloged, from wherever the User is located. The Vendor (or the music distributor) controls what music is offered; unlike the model Napster was offering. The User can also instantly catalog music from multiple mediums, such as ITV, print, PC, or retail store.

Similar to a radio station paying the music labels a royalty for the right to play their music over the airwaves, the IDCP Network 100 essentially brokers the same opportunity to individual Users 111 by way of a Web service, as described above. This type of Web services will also enhance the way people select and compare music genre, artists, songs, and formats. All this and more can be exploited through a single cataloging environment, the IDCP Network 100. Another way to describe this feature is "listen-on-demand," anytime, anywhere. Echo.com provides subscribers a quick and easy way to listen to and even create their own radio stations. For those who want a little more control over what they program, Live365.com or Shoutcast.com may be better options. MusicMatch.com is another example of creating play lists for personalizing with one's very own "MP3 Radio."

However, these services do not allow someone to build a stream-on-demand user-selectable play list through instant cataloging of music CDs nor does it address a novel approach to peer sharing music selections, through legitimate channels, as outlined in this patent. Friskit.com is another site that allows listening to an artist or songs to be streamed on-demand. However, it too does not address the rich customization, enhancement, and peer sharing innovations presented by the IDCP Network 100. There are other music subscription services being developed now that the IDCP Network could complement. These services include MusicNet® and PressPlay®, both of which are working on various ways to promote a subscription, based music service.

Cross-Vendor Catalog Web Service Example

Corporate Intranet and Extranet environments may also take advantage of these same enhanced services, as provided by the IDCP Network 100. The only difference is that the focus will serve the business-to-business needs of a company. Most Vendors 112 underestimate the importance of catalog content, but it is becoming the standard by which all e-Commerce initiatives will be measured. It has been suggested that those e-Commerce initiatives failing to develop strategies to effectively manage and maintain catalog content, in corporate or B2B settings, over time will suffer a low level of user acceptance. This low acceptance quickly results in lost sales for suppliers, ineffective and costly purchasing decisions for buyers, and reduced traffic for e-Markets. Most conventional catalog descriptions consist of the common attributes of the product or material. This is adequate for speed searching, but it far from guarantees a match. Product differentiation is severely limited. The supplier can't show why its product fits the exact specifications of the particular user, including whether it is the best buy. Catalog data is often homogenized into the database to fit the restrictions of the format. IDCP Web services can augment and enhance the instantly cataloged clusters. This is where WIZNET®™ and the IDCP Network 100 part ways. Both parties understand the importance of rich catalogs, but the IDCP method of achieving that goal is quite different. WIZNET approaches the challenge by deploying a full content approach with a three-tier content data model. Level one of the WIZNET model includes typical parameters such as part number, price, availability, and some limited information on the company. Level two includes photographs, lengthier descriptions, and sizing data, and level three provides line and mechanical drawings, installation notes and maintenance.

The WIZNET®™ Technology vision is to be the industry standard for aggregating and managing unabridged catalog and other supplier content on the Internet. In contrast, the vision for the IDCP Network 100 is to be the industry standard for making multi-vendor products, services and information interoperable by way of catalog-able clusters that seamlessly interact with IAs and third-party Web service applications to augment and enhance their value when performing specialized tasks utilizing a variety of platforms and mediums. Employees will be able to instantly catalog from various "business-to-business" (B2B) catalogs for procuring such items as office and manufacturing supplies and raw commodities. Additionally, the same catalog data served to the retail market could be made available to the business community. Instead of displaying retail pricing, wholesale prices would be displayed.

With the aid of an IDCP Web service businesses would be able to share information about their goods and services more intelligently by supplementing, broadening and enhancing instant catalog groupings. A B2B catalog exchange would similarly benefit by intelligently address each party's business rules and specifications. Expansions to Europe, Asia, Latin America, and elsewhere will require companies to develop strategies for managing catalog data in multiple languages as well as incorporating local currencies, taxes, and tariffs, all of which IDCP can do, and could be incorporated within the present invention.

IDCP and Developing Technologies

In the near future, store shelves and products will have new types of security packaging comprised of digitally encoded information utilizing technology such as Radio Frequency Identification (RFID), security inks, security threads and micro particles. These technologies will allow encoding of hundreds of characters of information into the product packaging or shelving to serve inventory control, forecasting and numerous other business purposes. These technologies could enable a consumer, or User 111, to instantly catalog their 'shopping lists' at the point-of-sale. The User could also catalog from the shelf or display, providing the User with novel ways to automatically monitor their own spending patterns. These novel and automatic methods include providing Vendors 112 with enhanced, real-time feedback and analysis of spending patterns. Additionally the Vendors can reward customer loyalty by helping customers save money with special pricing abilities and more useful discount programs; all of these features encompassing a new way for the Vendors to deliver better value to the User.

For instance, Rolltronics® (www.rolltronics.com) is creating roll-to-roll form technology to embed entire computer systems within a flexible material that can be made part of packaging or media products such as 'digital' newspapers. It is recognized that these technologies can play an important role in promoting the use and adoption of the IDCP Network 100 to extract the appropriate product identifier, or any other Identifier used by the IDCP Network.

Texas Instruments, Inc. is also planning to add technology to its programmable digital signal processors for 2.5G and 3G wireless phones that will turn a wireless phone into a remote control. By adding location-based technology from GeoVector® to its DSPs using its proprietary OMAP™ architecture. The technology will turn smart phones into virtual remote control devices, giving new meaning to the term point-and-click. The technology will enable the User 111 to point at items they see on the street. Using location-based technology, the system then can provide information related to that location, such as menus for restaurants, movie times and, eventually, streaming audio and video such as movie trailers. This type of service could easily be complemented by and enhanced through the IDCP Network 100. IDCP Vendors could assign their Catalog IDs 401 (products, services, and information) using interactive scripts (IPS-IDs 610 or ICS-IDs 600) to the location-based positioning data generated by the wireless phone, enabling the items being pointing at to be instantly cataloged to the User's ICA 222.

Within a retail store environment, outlet, or the equivalent, the Bluetooth™ technology discussed above has the potential to automatically "know" the location of the retail outlet. This locating ability can provide the IDCP Network 100 with the information required to establish the Location ID, and allow the User 111 to key-in or scan product codes with the User's communication device 120.

User and Vendor Benefits

Each User 111 of the IDCP Network 100 is provided with a number of substantial benefits. The permission based security features and overall anonymity provided, make the system of the present invention safe, secure and beneficial to the User without the loss of privacy.

All Vendors 112 across the many interrelated marketing and sales "segments," or categories, could immediately benefit from the technology of the present invention. These benefits include exponential marketing possibilities with powerful peer sharing and targeted personalization through the use of aggregate patterns. The following are additional benefits:

Virus Free Environment

With the present invention there would be little concern regarding viruses, since there are no file attachments generated by the User 111 or Vendor 112 as an intrinsic part of the IDCP Network 100. The CSS 200 is a "buffered linkage" between the User and the Vendor. Conventional e-mail is not employed as an active exchange medium within the IDCP Network. The e-mail free operation of the CSS avoids mainstream virus issues.

Vendor Channel

The implementation of IDCP instant cataloging also allows the participants in the supply chain to receive, simultaneously, the same information the Vendor 112 receives. This feature of the present invention will significantly affect the concepts of "real-time" and "just-in-time" by removing them from sequential information channels. They now become accurate terms, because these supply chain members are informed at the very same time, concurrently and simultaneously, as when the User 111 makes a selection, or catalogs a choice. Yet either the User or the Vendor, and even some of the supply chain members can be taken out of this loop dependent upon certain 'permission based' authorities beginning with the User.

The "Personalized Interactive Digital Catalog Profiling Network" will provide transactional information to everyone, such as the members or components of existing supply chains, which are all effected by the transaction. This transactional information is supplied instantly as a function of time, simultaneously as a function of process, and anonymously as a function of privacy.

The present invention adds the ability to break down the transactional information into its relevant parts for everyone in the supply chain. Additionally, it also provides structural or component information up the chain to the User 111, such as a homebuilder, or a manufacturer, or an airline fuel management company.

All of the transactional information, which is now available with the present invention, becomes usable by all of these members of the supply chain, which is now better described as a "supply wheel," in real-time. This saves immense expenses for each member, both User 111 and Vendor 112, to receive the information in its present day format of sequential presentation; and, without tremendously expensive marketing and statistical research with its associated margins of error.

Catalog Management

With the IDCP Network 100 of the present invention, Vendors 112 are be able to update product catalog data as it resides in the CSS 200, and particularly in the Vendor's IDCP Item Data Store (IID) 255. This catalog data is an anonymous and intermediary depository of Vendor data available to the User 111 on demand. With the Vendor's access to the IDCP Network, their catalog data can be updated when needed by the Vendor and any changes instantaneously visible to Users. This gives the Vendor opportunities to instantly update and adjust sales techniques, including pricing, features' and availability, to all Users who have cataloged that particular Vendor item.

User-cataloged entries may be personalized for targeted promotions, discounts, cross selling, up selling, and support. Peer sharing would extend the exposure and advertising life cycle of Vendor catalogs exponentially, as explained above. This results in accurate, real-time market analysis through demographics, exposure and individual selections, and facilitates a more synchronous relationship between the Vendor and the User. Catalog vendors will have access to cataloging statistics, which will provide heretofore unknown methods of gauging consumer interest measured in actual (not estimated) and real-time (not delayed) numbers. Such statistics will provide a new ability for vendors, including paper or hard-copy catalog vendors, to monitor consumer interest and to respond immediately with traditional market tools proactively, instead of reactively. Currently, vendors often are forced to publish their next hard-copy catalog before statistics have been gathered and analyzed for the vendor's last catalog. The present invention creates new market analysis tools for vendors.

Content Management

The ongoing management of Web content can be challenging for any size organization, especially when the nature of that content is much more than simply HTML or word processing documents. Current Content Management Systems (CMS) provide an infrastructure to initiate, create, house, and publish an organization's internal or external information, all conducted under specific business rules and internal approval procedures, defined by the organization. The cost and setup of a CMS can be significant, often running in the hundreds of thousands of dollars.

The technology of the IDCP Network 100 can simplify and streamline CMS architecture because it is a standardized form of information packaging, with customizable multi-tier subschema views; it is media-rich, enabling incorporation of any type of file; and it allows instantaneous updating of information. The IDCP instant catalog platform also enables sophisticated acquisition of information because of the built-in cataloging function; Users 111 have an efficient online tool with the ICA 222; and cataloging can occur with almost any device and channel regardless of the geographic location of the User.

Catalog Migration

The IDCP Network 100 can also facilitate the transfer of assets, or a company's 'goodwill' in the form of cataloged activity. Users 111 that hold current catalogs from a Vendor 112 can be transferred to another Vendor without invoking privacy/litigation action, because every customer is anonymous. For example, a company presently filing bankruptcy cannot sell its database of customers, but in the IDCP Network, the transfer of cataloged activity can be sold, providing the company with an additional asset. This is also useful in cases where a Vendor no longer plans to carry a certain product line. Rather than leaving those consumers to search for a new Vendor, they can be picked up by another Vendor who will carry the item. A Vendor can pass anonymous customers to another Vendor if desired; because no personal identities are being released only the catalogs of goods and services, which in turn are associated with individual account activities. No personally identifiable information is involved or required.

Anonymity and Security

Privacy is an important feature of the IDCP Network 100 and is addressed and uniquely handled at several levels. There are many conflicting conventional opinions concerning privacy issues and the priority they must have. Privacy should be addressed and all issues resolved before the development of any new software system. For the present invention, privacy is a primary and foremost concern, but handled without complex programming and protocols. The simplicity of the system security for the IDCP Network makes it easy to monitor and maintain.

For the present invention, Vendors 112 are not able to monitor individual IDCP account numbers within the Catalog Server System 200 nor will they be able to push unsolicited products, services, and or information to the User 111 without the explicit consent of the User. They will, however, be able to uniquely identify and segregate those items cataloged and purchased from those, which are simply cataloged by way of the Personal Asset Data Store (PAD) 258. The CSS 200 keeps the User's identity anonymous by not merging the IDCP account number with any PII. ICA accounts numbers are strictly presented and interacted with through an aggregate model. If a company captured the customer's name and address from the credit card at the point-of-sale, they could map it to the User's IDCP account number, but it would not give them any more control or power than they already have, and there would be no added advantage. If a User pays with cash, they too would not be giving away any personally identifiable information, because the IDCP account number does not store nor reveal personal identifiable information. The IDCP account number only represents personalized selections, but no name, address, email or contact information is kept in the account. The User may use a third-party authentication service, such as Microsoft Passport, to make purchases and reveal personal information if or when necessary. This does not affect the IDCP anonymity because it happens at the Vendors site.

Flexibility and Scalability

The IDCP Network 100 of the present invention is composed of core, proprietary technologies as discussed herein and off-the-shelf electronic commerce and database solutions. With most software and content development projects, labor costs are the largest expense item associated with producing systems that address a variety of interactive and personalized tools. This invention's architecture is distributed and modular, thus more efficient from a development perspective. The IDCP Content Management methods are also simple and flexible, because they are standardized and can be built with existing technologies. The IDCP Network addresses e-Commerce, enhanced personalized profiling, reporting, and mobility. The IDCP Network at its fundamental implementation allows the User 111 to capture, store, and manage catalogs for a variety of enhancing agents that effectively deliver personalized output, anonymously. A multiple of different applications, which conventionally would require separate platforms, can operate simultaneously within the IDCP Network of the present invention (including, but not limited to e-Commerce, personalization, CMS, CRM, market research, Web services, digital advertising and publishing). A single network can interact with Users to accomplish a wide variety of tasks and operations in a wide variety of input and output formats, and hardware as described above. The particular mode of interaction with the IDCP Network is not critical. Instead, the process of providing instant cataloging, which the present invention accommodates, is an action common to any embodiment of the invention and considered unique. Also, through the addition of Web services applications, IDCP catalogs can become fully interoperable, allowing the User to relate instantly cataloged items across multiple Vendors and industries.

An additional aspect of the present invention provides for 'proprietary' IDCP codes issued for the benefit of Vendors 112 without a coding system for their products, or for items that are not classified as products but that may be cataloged, such as product brochures. IDCP codes could even become an industry 'standard' that would be used like the ubiquitous UPC code but providing the vastly more powerful features of the IDCP Network 100. With the IDCP scripts universally applied, the IDCP Network has the potential of becoming a universal catalog of goods and services, available for use in any region of the globe and in any language.

Filtering catalog groupings based on preset preferences is one way the User will be able to ensure that only Vendors of choice are processed into their ICA. If the User prefers to catalog from one or more Vendors in particular, they will be able to exclude all other Vendors with the exception of those they have selected. The same operation could be applied in reverse. In other words, if the User prefers to catalog from all Vendors except one or more Vendors, they will be able to include all Vendors and exclude one or more. In addition to Vendor filtering, one could also identify product, service, or information type filtering. If one never wants to catalog frozen foods, one will be able to exclude that type of catalog data from being solicited.

The IDCP Network 100 of the present invention provides a better way to accomplish these value-added services. The User 111 is able to catalog and organize selections with the assistance of the instant catalog Assistant (ICA) 222. The third-party configuration of the CSS 200 provides personalization while maintaining privacy and User anonymity. However, the User's membership or affiliation with a consumer-buying group can be made available to the Vendor 112, especially at the request of the User. The User can selectively control what personal information is made available to certain Vendors, often required for such benefits as wholesale pricing, business discounts and cross-vendor promotional programs. For wholesale sales and related Vendor supply activities within the IDCP Network, the User may be in turn, acting as the Vendor for the end User, or another intermediate member of the supply chain, all fitting under the broad definition of "User," as employed for the present invention. It is important to note that non-Vendor ICA 222 accounts collect no PII, Vendor ICA accounts would for obvious reasons, would be associated back to the Vendor 112 information.

Supply Chain Relationships

This is an alternative form of the open catalog exchange that allows business Users 111 of the IDCP Network 100 to anonymously share catalog cluster or clusters in an open exchange based on "business-to-business" B2B exchange themes and rules. Any business User can freely exchange B2B related catalog groupings with other businesses at anytime. The same catalog data served to consumers could be made available to businesses, but instead of displaying retail pricing, wholesale pricing would be displayed. Businesses would be able to share information about their goods and services more intelligently by supplementing, broadening, and enhancing e-Catalog content by way industry specific IAs and Web Services Applications.

Embodiment of FIGS. 14–17

Figure 14:
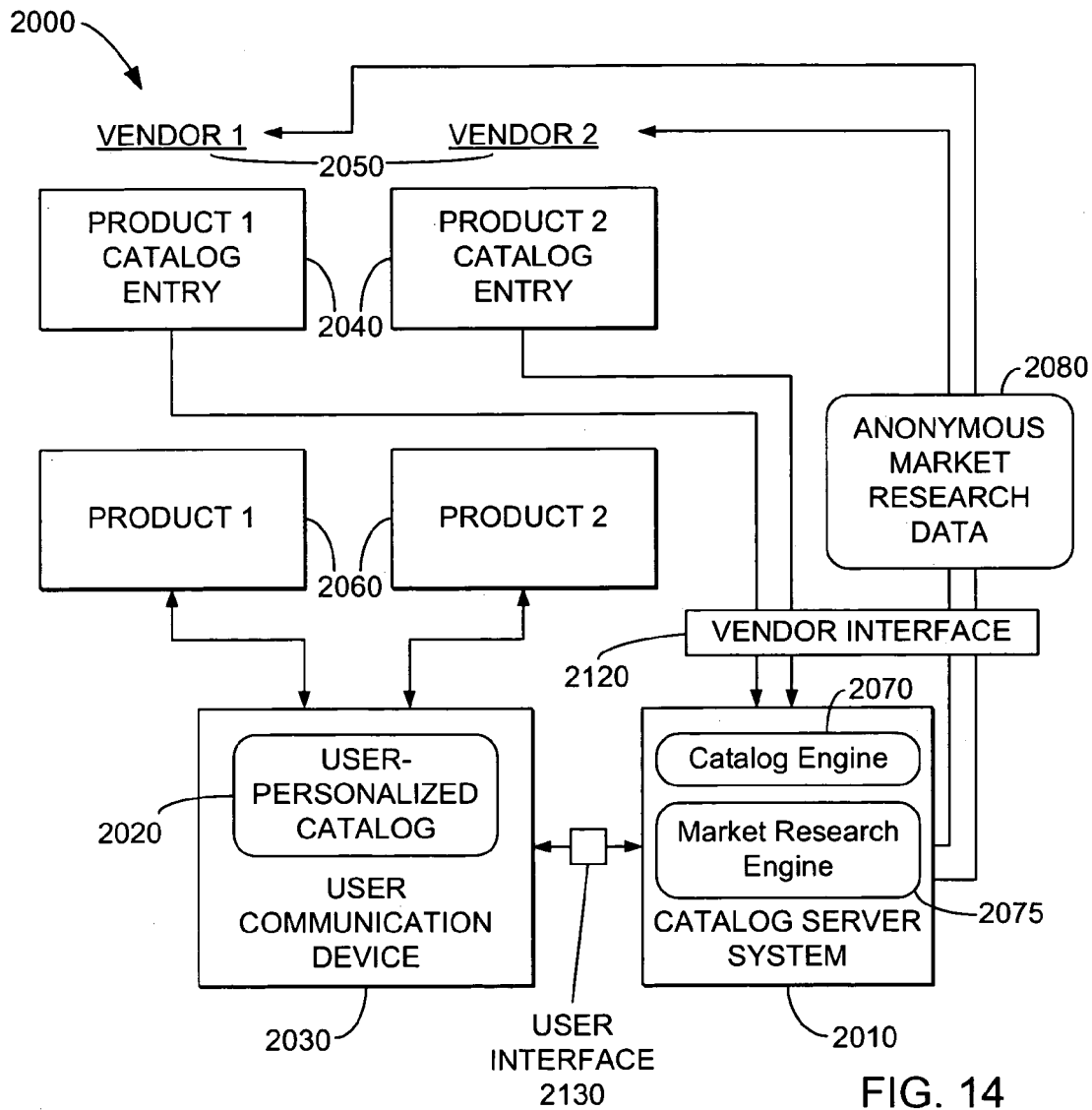
FIG. 14 is schematic diagram of a system for cataloging product information according to another embodiment of the present invention.
Figure 15:
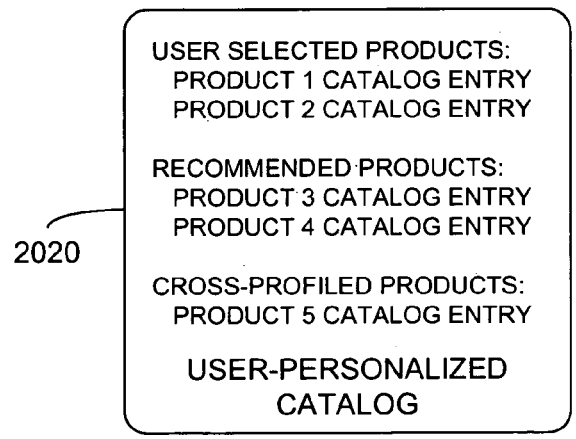
FIG. 15 is a schematic diagram of a user personalized catalog of the system of FIG. 14.

Referring to FIG. 14, a system according to another embodiment of the invention is shown generally at 2000. System 2000 typically includes a catalog server system 2010 (numbered 200 in previous figures) configured to create and serve a user personalized catalog 2020 to user communication device 2030. The catalog server system typically is configured to receive product catalog entries 2040 from vendors 2050, the product catalog entries being related to a plurality of products 2060 offered by the vendors. The catalog server system includes a catalog generation engine 2070 configured to create the user personalized catalog 2020 with product catalog entries of products selected by the user, as well as products recommended by a catalog generation engine, as shown in FIG. 15. The user personalized catalog may also include products suggested by the user's peers and/or web service applications to which the user has subscribed, as discussed below.

In addition, catalog server system 2010 includes a market research engine 2075 configured to generate anonymous market research data 2080 based on user profiles of users of system 2000, and transmit that anonymous market research data back to vendors 2050, in a manner that does not reveal the identity of the user.

Figure 16:
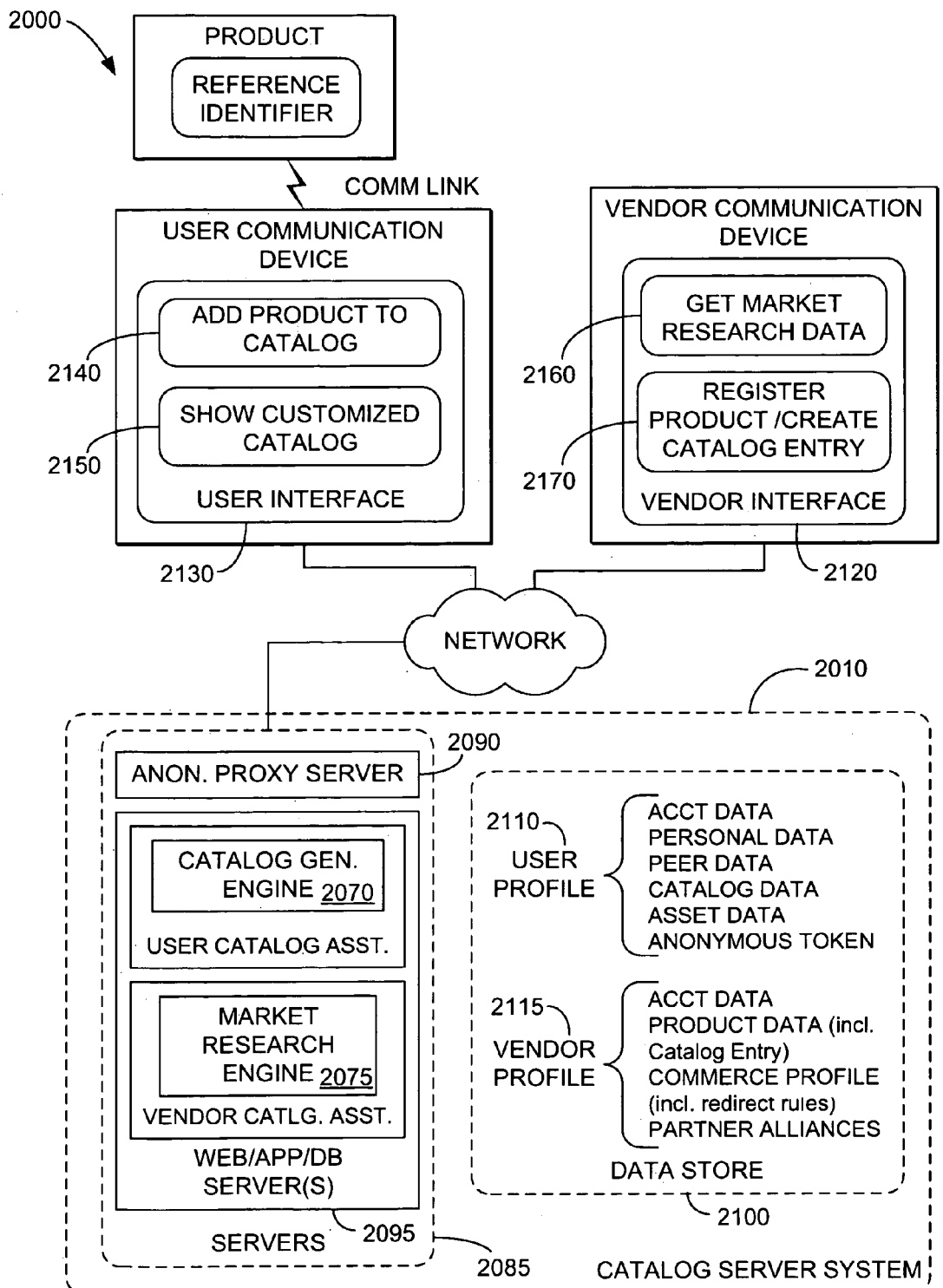
FIG. 16 is a detail schematic diagram of the system of FIG. 14.

As shown in FIG. 16, the catalog server system typically includes one or more servers 2085, including an anonymous proxy server 2090. The anonymous proxy server is configured to generate an anonymous token for each user and store the anonymous token in data store 2100 as part of user profile 2110. Servers 2085 typically includes web servers, application servers, and/or database servers 2095, or other servers configured to serve a vendor interface 2120 and user interface 2130 for vendors and users to interact with catalog server system 2010.

User interface 2130 is typically displayed on user communication device 2030 and is configured to enable a user to input a command for a cataloging action related to one or more of the product catalog entries. The user interface may include an "add product to catalog" selector 2140, via which a user adds a product catalog entry for the selected product to a user personalized catalog. The user interface may also include a "show customized catalog" selector 2150 for displaying the user personalized catalog on the user communication device.

The servers 2085 typically are configured to execute the catalog generation engine 2070 and market research engine 2075. The catalog generation engine is configured to generate the user-personalized catalog 2020 in response to the user's command. The user-personalized catalog 2020 typically contains information on products selected by the user, and may also contain information on products recommended by catalog generation engine 2070, based on related or linked product attributes, as well elements of the user profile, such as personal data (personal attributes of the user), asset data (information on personal assets of the user), catalog data (information on the user's personalized catalog), and peer data (information related to which of a selected group of user peers may view the user personalized catalog).

Typically, upon generating the user personalized catalog, the catalog generation system is further configured to update the user profile based on the user-personalized catalog, that is, to store the user personalized catalog in the user profile on the data store.

Market research engine 2080 typically is configured to create anonymous market research data based on the user profile data. The vendor interface is typically configured to share the anonymous market research data with vendors in an anonymous manner that does not reveal a user's identity. For this purpose, vendor interface 2120 typically includes a "get market research data" selector 2160. Vendor interface 2120 also typically includes a "register product/create catalog entry" selector 2170 configured to enable a vendor to create and register a product 2060 with catalog server system 2010, by creating a catalog entry 2040 and storing the catalog entry in vendor profile 2115 on data store 2100.

Vendor profile 2115 also typically includes a commerce profile including rules for redirecting a transaction upon selecting an option in a vendor's product catalog entry. For example, a vendor may specify that its products may be purchased through a particular retailer for North American customers, and another retailer for Japanese customers. Thus, the commerce profile may include settings that redirect a client browser to an appropriate retailer website upon selecting a "purchase" option in the catalog entry. Or alternatively, the commerce profile may include offline contact information such as an address, telephone number, facsimile number, or other contact mechanism via which the user may contact a designated retailer for the product.

Vendor profile 2115 may also include a plurality of partner alliances which include other entities such as retailers, manufacturers, or suppliers with which a particular vendor is aligned. This information may be used by the catalog server system, for example, when recommending products for user personalized catalog 2020. For example, the catalog server system may be configured to tend to make recommendations of products of other suppliers that are included in a particular vendor's partner alliance.

Of course, it will be appreciated that whether or not a vendor has indicated particular partner alliances, catalog server system 2010 is typically configured to recommend products for user personalized catalog 2020 based on interrelated product attributes by way of Web service applications. The Web service applications may include program logic for correlating interrelations among various product attributes of products stored in the user personalized catalog. For example, the catalog server system may be configured to recommend tires to fit rims that have been cataloged by a user, irrespective of whether a vendor alliance exists between the vendor of the rims and the vendor of the tires. In this case the vendor of the rims and the vendor the tires typically agree on a common program logic for interrelating the tires to the rims via the catalog server system.

In addition, it will be appreciated that the user profiles may be used as content for Web service applications, such as a travel planner, a grocery advisor service, music cataloger, etc. Thus a Web service application may be configured to read a particular user's profile, should the user select to publish the profile to the Web service application. Upon reading the user profile, the Web service application may be configured to customize itself based on the personal data, peer data, asset data, and catalog data contained in a user's profile. For example, if a user profile includes information that the user has cataloged several hotel packages in Hawaii recently, shared this hotel catalog information with several peers, and recently purchased a snorkel and pair of fins for size 9 feet, then a travel planner web service application may be able to recommend airline tickets and car reservations for the user and his peers, as well as new bathing suits, etc., of appropriate sizes for each of the user and the peers creating a travel guide that is personalized through catalog profiles. Thus, a user profile may be transmitted to a task-specific application, and the output of the task-specific application may be customized based on the user profile.

Figure 17:
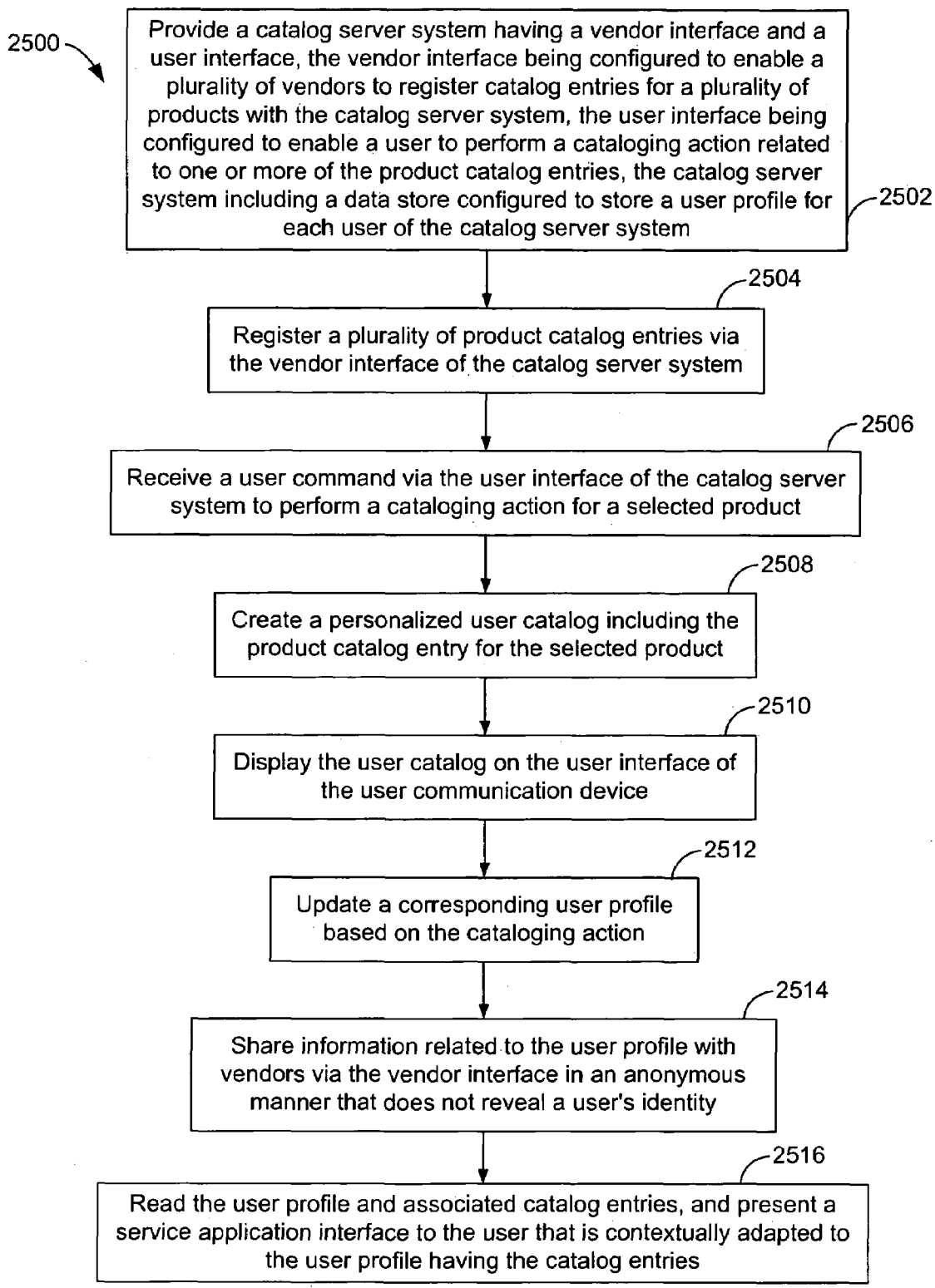
FIG. 17 is a flowchart of a method according to one embodiment of the present invention.

FIG. 17 shows a method 2500 in accordance with one embodiment of the present invention. Method 2500 typically includes, at 2502, providing a catalog server system having a vendor interface and a user interface. Typically, the vendor interface is configured to enable a plurality of vendors to register catalog entries for a plurality of products with the catalog server system, and the user interface is configured to enable a user to perform a cataloging action related to one or more of the product catalog entries. The catalog server system also typically includes a data store configured to store a user profile for each user of the catalog server system. Typically, information such current sales data, product attribute data, partner alliance data, catalog scripting data, channel management logistics data, etc., related to a particular product is accessible via the vendor interface by manufacturers, suppliers, and retailers of the product.

At 2504, the method typically includes registering a plurality of product catalog entries via the vendor interface of the catalog server system. Typically each catalog entry includes product attributes that are cross-referenced with product attributes of products of other vendors.

At 2506, the method typically includes receiving a user command via the user interface of the catalog server system to perform a cataloging action for a selected product. The user command may be made at the point of purchase of a product. For example, the user command may be made by scanning a product reference identifier into the user interface of the user communication device at the point of purchase. In addition, the user command may be made by selecting a selector on an interactive audiovisual site, such as a web site or interactive television site.

At 2508, the method typically includes creating a personalized user catalog including the product catalog entry for the selected product. The method may further include determining recommended products to appear in the user personalized catalog, based on the product attributes and the user profile, as described in the tire and rim example above. In addition, the method may further include transmitting the user profile to a task-specific service application, and personalizing the output of the task-specific service application based on the user profile, as described in the travel planner example above.

At 2510, the method typically includes displaying the user catalog on the user interface of the user communication device. The user communication device may be a computing device such as a portable computing device, and may include a wireless transceiver and/or a scanner. It will be appreciated that the step of receiving a user command to catalog a product may include scanning a reference identifier on a product. As used herein, the term "scanning" may refer to optical scanning by via visible or nonvisible light, including by a infrared scanner, laser scanner, digital camera equipped with image recognition software, radio frequency identifier scanner, etc. It will appreciated that the scanned reference identifier may be stored temporarily in the user communication device and forwarded at later time to the catalog server system. For example the user communication device may be used to scan items in a retail store, and later transmit scanned data from these items to the catalog server system when the device is connected to a computer network.

At 2512, the method typically includes updating a corresponding user profile based on the cataloging action. At 2514, the method typically includes sharing information related to the user profile with vendors via the vendor interface in an anonymous manner that does not reveal a user's identity. At 2516, the method may include reading the user profile, and presenting a service application interface to the user that is contextually adapted based on the user profile. Typically, this is accomplished at a third party vendor to which the user has opted to release (anonymously) user profile information.

The method may further include identifying peers of a user, and providing the peers access to at least a portion of the user personalized catalog. The method also may include storing peer data for each user of the catalog system. The peer data typically includes a list of a user's peers and settings specifying which, if any, of the user personalized catalog entries to share with a user's peers. Further, the method may include sharing information related to the peer data with third parties in an anonymous manner that does not reveal a user's identity.

The method may further include receiving and storing personal data of a user in a corresponding user profile. The personal data may include user attributes selected from the account, product profiles and data stores, which describe the user demographically but do not reveal the identity of the user. For example, the personal data may include age, gender, country, and zip code for each user. The user catalog may be created at least in part based on the personal data in the user profile.

In addition, the method may include receiving and storing asset data for the user in the user profile. The asset data includes information regarding assets owned or purchased by the user. The user catalog may be created at least in part based on the asset data in the user profile. Typically, at least a portion of the asset data is determined from purchase records related to the user. In addition, at least a portion of the asset data may be related to assets already owned by the user, which are input into the catalog server system by the user.

The invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with "ordinary skill in the art" will appreciate that other embodiments and variations of the invention are possible, which employ the same inventive concepts as described above. Therefore, the invention is not to be limited except by the following claims, as appropriately interpreted in accordance with the doctrine of equivalents.

I claim:

1. A method for creating and managing anonymous end user electronic catalogs comprising:
   a. receiving at a catalog server system over a computer network catalog data from a plurality of different vendor organizations;
   b. storing said catalog data by said catalog server into a domain-independent catalog database, wherein the catalog data represents a minimal data set used to uniquely identify information about a product residing in one or more databases among a plurality of independent electronic network domains, wherein schema mapping based on each said catalog data creates a catalog profile template, said catalog profile template comprising a list of multi-tiered attributes derived from supply chain values, said catalog profile template being interrelated based on relationship rules established by said plurality of different vendor organizations, wherein a pre-sales digital receipt as initiated by a cataloging action is created by said catalog server system based on a stored catalog profile template, and said pre-sale digital receipt being stored therein to said domain-independent catalog database, wherein said domain-independent catalog database is latent in that said catalog profile templates are not presented in a generic, publicly accessible catalog directly to end users but are used by said catalog server system to create one or more anonymous end user electronic catalogs through one or more said pre-sale digital receipts by end users that are accessible through end user accounts;
   c. establishing said end user accounts at said catalog server system, each end user account accessible by an end user, wherein said end user account is anonymous to said plurality of different vendor organizations;
   d. initiating cataloging actions by said end user or through a web service application through said end user account, thereby creating one or more anonymous end user electronic catalogs, said cataloging actions comprising (1) creating a personalized profile instance through said cataloging action using multi-channel reference identifiers and storing said personalized profile instance as a pre-sale digital receipt through said anonymous end user account into said one or more anonymous end user electronic catalogs, (2) modifying a value of an attribute for a personalized profile instance, (3) organizing a personalized profile instance into a classification scheme based on said multi-channel affiliate reference identifiers associated with said personalized profile instance, (4) linking one or more personalized profile instances with one or more anonymous purchase transactions, (5) linking one or more personalized profile instances with a commerce profile that defines a channel and mode of commerce in which a personalized profile instance can be tracked and purchased, (6) associating a personalized profile instance with a contextual web service application, (7) interrelating a plurality of personalized profile instances for compliance based on interoperable attribute values, and (8) sharing by said end user through mutual agreement permissions one or more personalized profile instances with one or more peer users in communication with said catalog server system using said computer network, wherein said one or more peers each have said end user account managed by said catalog server system; and e. receiving a request at said catalog server system by said end user to anonymously track said cataloging actions and tracking said cataloging actions.

2. The method of claim 1, further comprising, an option by said end user, adjusting a preference setting associated with said end user account, to enable one or more of said plurality of different vendor organizations to send information to said end user account in which a personalized profile instance of a product is stored.

3. The method of claim 1, wherein a product recommendation includes information about a recommended use of a product for which a personalized profile instance is stored in said end user account.

4. The method of claim 1, wherein a product recommendation includes information on a different product that is compatible with one or more said personalized profile instances currently stored in said end user account.

5. The method of claim 1, wherein a plurality of said cataloging actions are received from an end user communication device, wherein said catalog actions include at least one multi-channel affiliate reference identifier associated with a product.

6. The method of claim 5, wherein the information regarding said cataloging actions are sent to said catalog server system from said end user communication device substantially contemporaneously with the occurrence of said cataloging actions.

7. The method of claim 6, wherein said cataloging action through a point-of-sale authority triggers a point-of-sale user request with said catalog server system to anonymously record a purchase status of one or more purchased products.

8. The method of claim 5, wherein said cataloging actions are stored in said end user communication device and anonymously sent to said catalog server system a period of time after the occurrence of said cataloging actions.

9. The method of claim 5, wherein said end user communication device includes a keyboard, the method further including receiving input of at least one multi-channel affiliate reference identifier for one or more products from said end user communication device using the keyboard, and sending an anonymous request to said catalog server system to create a personalized profile instance.

10. The method of claim 5, wherein said end user communication device includes a screen configured to display a hyperlink associated with a product, the method further including receiving an end user selection of the hyperlink, and in response sending an anonymous request to said catalog server system to create a personalized profile instance for said product from said end user communication device.

11. The method of claim 5, wherein said end user communication device comprises a scanner the method further comprising scanning a multi-channel affiliate reference identifier of a product.

12. The method of claim 5, wherein said end user communication device is configured to receive said multi-channel affiliate reference identifiers via RFID signals.

13. The method of claim 1, wherein said cataloging actions comprise purchase records related to said plurality of different vendor organizations that are compiled and anonymously routed to said catalog server system.

14. The method of claim 1, wherein said personalized profile instance includes content provided by one or more of said plurality of different vendor organizations that are sources for purchasing a product associated with said personalized profile instance.

15. The method of claim 1, wherein said personalized profile instance includes content provided by one or more said plurality of different vendor organizations selected from different tiers in a chain of commerce related to a product represented in said personalized profile instance.

16. The method of claim 15, wherein said different tiers are manufacturing, distributing, and retailing of said product.

17. The method of claim 1, further comprising:
identifying by one or more peers of an end user to said catalog server system said end user;
prompting said end user to allow mutual agreement permissions; and
sharing information regarding personalized profile instances stored in said end user's personalized electronic catalog.

18. The method of claim 1, further comprising:
providing information regarding stored personalized profile instances and non-personally identifiable demographic information of said end user to at least one of said plurality of different vendor organizations, in an anonymous manner and without revealing the identity of said end user.

19. The method of claim 1, further comprising:
communicating a catalog data update from at least one of said plurality of different vendor organizations to said catalog server system over said computer network to update a previous version of catalog data received by said catalog server system, wherein said catalog data update represents a change in catalog data in at least one tier of at least one catalog profile template as compared with a previous version of said at least one catalog profile template;
storing said change in catalog data in said at least one tier of at least one catalog profile template; and
instantly updating each end user's personalized electronic catalog containing at least one or more pre-sale digital receipts based on the at least one catalog profile template that was changed.

20. An interactive cataloging method comprising:
a. providing a catalog server system connected to a computer network wherein said catalog server system is accessible by third-party vendors and end users using electronic interfaces;
b. registering by a plurality of said third-party vendors with said catalog server system over a computer network, a plurality of catalog data corresponding to products sold from said third-party vendors operating through a plurality of different catalog channels;
c. receiving at said catalog server system over a computer network said catalog data;
d. storing said catalog data by said catalog server into a domain-independent catalog database, wherein the catalog data represents a minimal data set used to uniquely identify information about a product residing in one or more databases among a plurality of independent electronic network domains, wherein schema mapping based on each said catalog data creates a catalog profile template, said catalog profile template comprising a list of multi-tiered attributes derived from supply chain values, said catalog profile template being interrelated based on relationship rules established by said third-party vendors, wherein a pre-sales digital receipt as initiated by a cataloging action is created by said catalog server system based on a stored catalog profile template, and said pre-sale digital receipt being stored therein to said domain-independent catalog database, wherein said domain-independent catalog database is latent in that said catalog profile templates are not presented in a generic, publicly accessible catalog directly to end users but are used by said catalog server system to create one or more anonymous end user electronic catalogs through one or more said pre-sale digital receipts by end users that are accessible through end user accounts;

e. creating said end user accounts at said catalog server system, an end user account having an associated end user profile wherein said end user account is accessible by said end user authorized by said catalog server system to access and store personalized profile instances into said end user's personalized electronic catalog, and wherein said end user account is anonymous to said third-party vendors;

f. receiving commands from said end user using said electronic interface, creating one or more of said personalized profile instances stored into said end user's personalized electronic catalog, wherein attributes of said personalized profile instances are alterable by said end user;

g. communicating information about said attributes of the said personalized profile instances from said catalog server system to one or more third-party vendor electronic interfaces in an anonymous manner that does not reveal the identities of said end users; and h. communicating information to update each end user's personalized electronic catalog after one or more personalized profile instances have been created in said each end user's personalized electronic catalog, wherein said information is an update from one of said third-party vendors as compared with a previous version of one of said catalog data communicated by said one of said third-party vendors.

21. The method of claim 20, further comprising:

adapting a previously cataloged personalized profile instance based on attributes of a later cataloged personalized profile instance.

22. The method of claim 20, further comprising:

adapting a later cataloged personalized profile instance based on attributes of an earlier cataloged personalized profile instance.

23. The method of claim 20, further comprising:

identifying one or more end user's peers by said end user, each end user's peer being an end user having said end user account managed by said catalog server system;

sharing by said end user through mutual agreement permissions one or more personalized profile instances with said one or more end user's peers in communication with said catalog server system using said computer network.

* * * * *